United States Patent
Oe et al.

(10) Patent No.: US 7,450,977 B2
(45) Date of Patent: Nov. 11, 2008

(54) MOBILE COMMUNICATION TERMINAL

(75) Inventors: Yutaka Oe, Tokyo (JP); Nobuyuki Enomoto, Kyoto (JP); Fuji Asada, Kyoto (JP); Shigetaka Kanai, Kyoto (JP); Tomoko Mori, Tokyo (JP); Manabu Shimizu, Tokyo (JP)

(73) Assignee: Vodafone K.K., Tokyo (JP)

( * ) Notice: Subject to any disclaimer, the term of this patent is extended or adjusted under 35 U.S.C. 154(b) by 306 days.

(21) Appl. No.: 10/978,416

(22) Filed: Nov. 2, 2004

(65) Prior Publication Data

US 2005/0164745 A1    Jul. 28, 2005

Related U.S. Application Data

(63) Continuation of application No. PCT/JP2004/008353, filed on Jun. 15, 2004.

(30) Foreign Application Priority Data

Jul. 31, 2003  (JP)  ............................ P2003-284561
Aug. 27, 2003  (JP)  ............................ P2003-302891

(51) Int. Cl.
*H04M 1/00* (2006.01)

(52) U.S. Cl. .............. 455/575.3; 455/550.1; 455/575.1; 455/90.3

(58) Field of Classification Search .............. 455/550.1, 455/556.1, 575.1, 575.3, 90.3, 566, 412.2
See application file for complete search history.

(56) References Cited

U.S. PATENT DOCUMENTS

| | | | | |
|---|---|---|---|---|
| 6,069,648 | A * | 5/2000 | Suso et al. | 348/14.02 |
| 6,396,924 | B1 * | 5/2002 | Suso et al. | 379/433.13 |
| 6,549,789 | B1 * | 4/2003 | Kfoury | 455/550.1 |
| 6,975,273 | B1 * | 12/2005 | Choi | 343/702 |
| 6,999,802 | B2 * | 2/2006 | Kim | 455/575.1 |
| 7,003,318 | B2 * | 2/2006 | Kota et al. | 455/556.1 |
| 7,069,043 | B2 * | 6/2006 | Sawamura et al. | 455/550.1 |
| 7,084,919 | B2 * | 8/2006 | Shibata et al. | 348/333.06 |
| 7,106,357 | B2 * | 9/2006 | Fukuda et al. | 348/14.02 |
| 7,117,009 | B2 * | 10/2006 | Wong et al. | 455/556.1 |
| 7,151,911 | B2 * | 12/2006 | Matsumoto | 455/90.2 |
| 2001/0004269 | A1 * | 6/2001 | Shibata et al. | 348/333.06 |
| 2003/0064758 | A1 * | 4/2003 | Mizuta et al. | 455/566 |
| 2003/0228847 | A1 * | 12/2003 | Matsumoto | 455/90.3 |
| 2004/0014488 | A1 * | 1/2004 | Sawayama et al. | 455/550.1 |
| 2004/0058715 | A1 * | 3/2004 | Taniguchi et al. | 455/566 |

(Continued)

FOREIGN PATENT DOCUMENTS

EP     1111919 A2 *  6/2001

(Continued)

*Primary Examiner*—Matthew Anderson
*Assistant Examiner*—April S Guzman
(74) *Attorney, Agent, or Firm*—Kratz, Quintos & Hanson, LLP

(57) ABSTRACT

A mobile communication terminal having a digital camera and which is comprised of a first section and a second section. There are four structural states realized by folding up of the mobile communication terminal and rotation of a display section with respect to a base section of the second section. In each of the four structural states, the mobile communication terminal automatically allocates operations modes of camera mode and non-camera mode. Also, the mobile communication terminal can automatically change the operating mode as required.

19 Claims, 39 Drawing Sheets

U.S. PATENT DOCUMENTS

| | | | | |
|---|---|---|---|---|
| 2004/0075620 A1* | 4/2004 | Tanaka et al. | ............... | 345/1.1 |
| 2004/0203527 A1* | 10/2004 | Matsumoto | ............... | 455/90.3 |
| 2004/0204064 A1* | 10/2004 | Ikeda et al. | ............... | 455/556.1 |
| 2006/0003817 A1* | 1/2006 | Lee et al. | ............... | 455/575.3 |
| 2006/0063570 A1* | 3/2006 | Nishimura | ............... | 455/575.3 |

FOREIGN PATENT DOCUMENTS

| | | |
|---|---|---|
| JP | 2001-169166 | 6/2001 |
| JP | 2002-94629 | 3/2002 |
| JP | 2002-171319 | 6/2002 |
| JP | 2003-163824 | 6/2003 |

\* cited by examiner

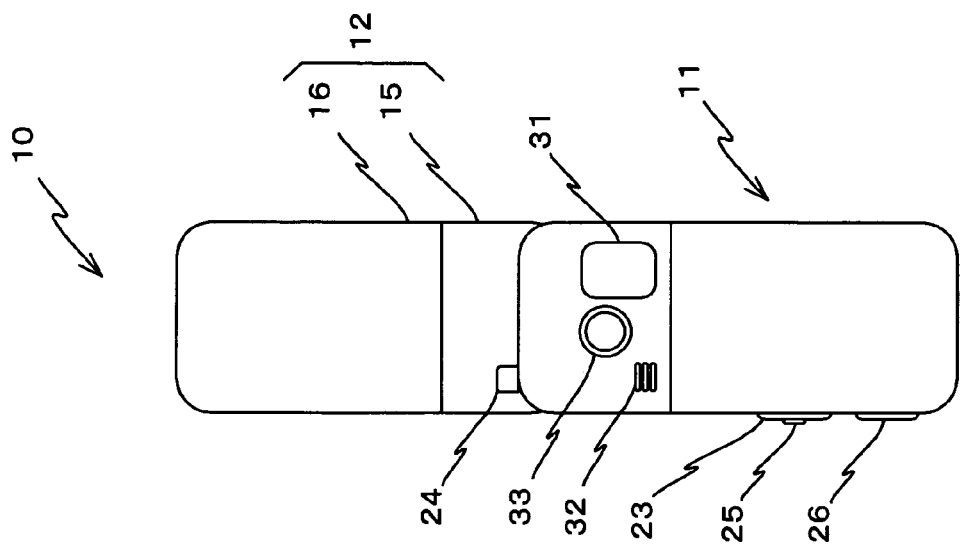
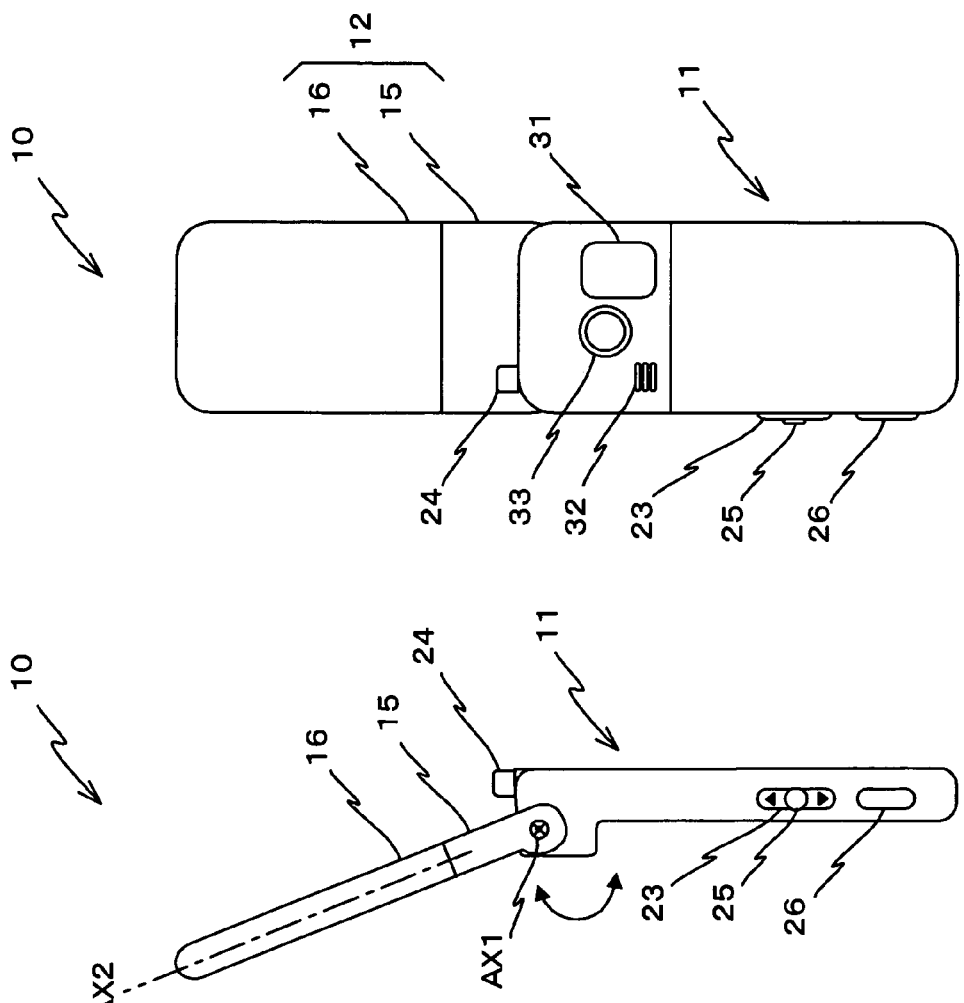
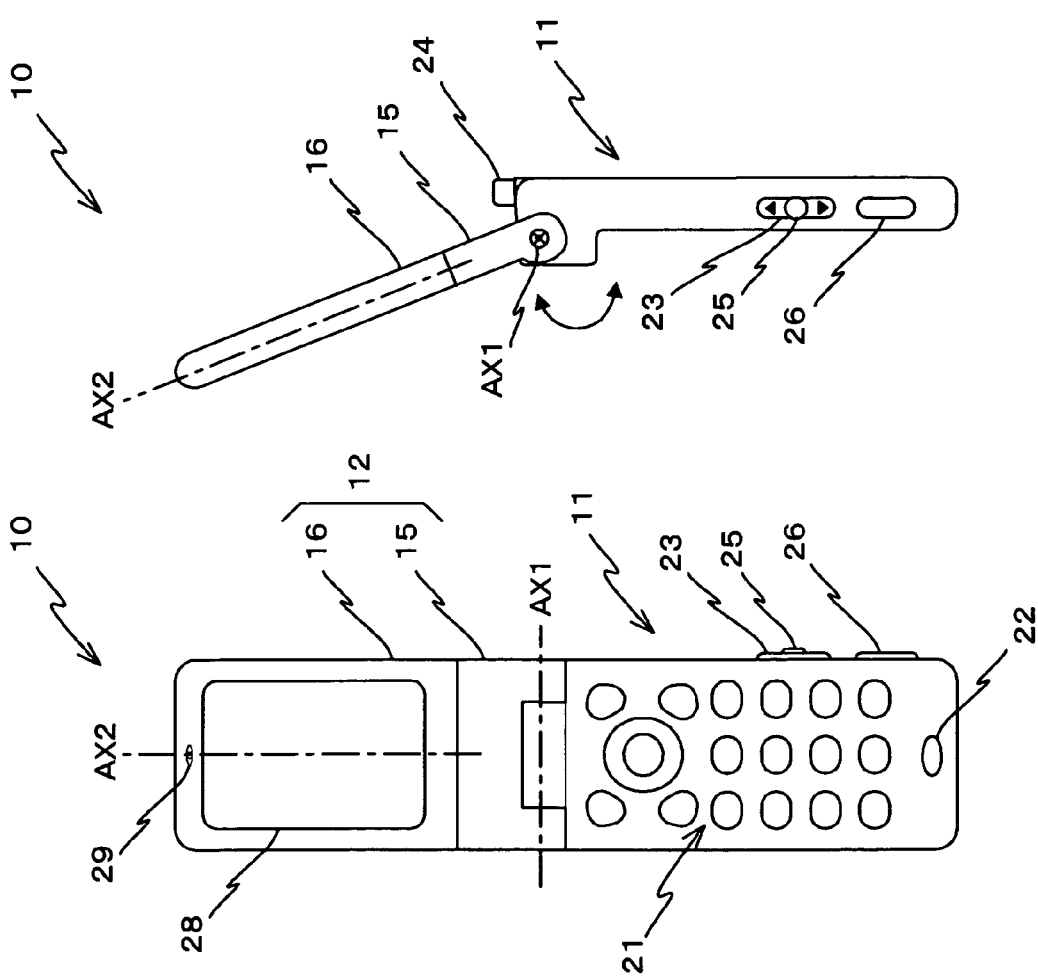

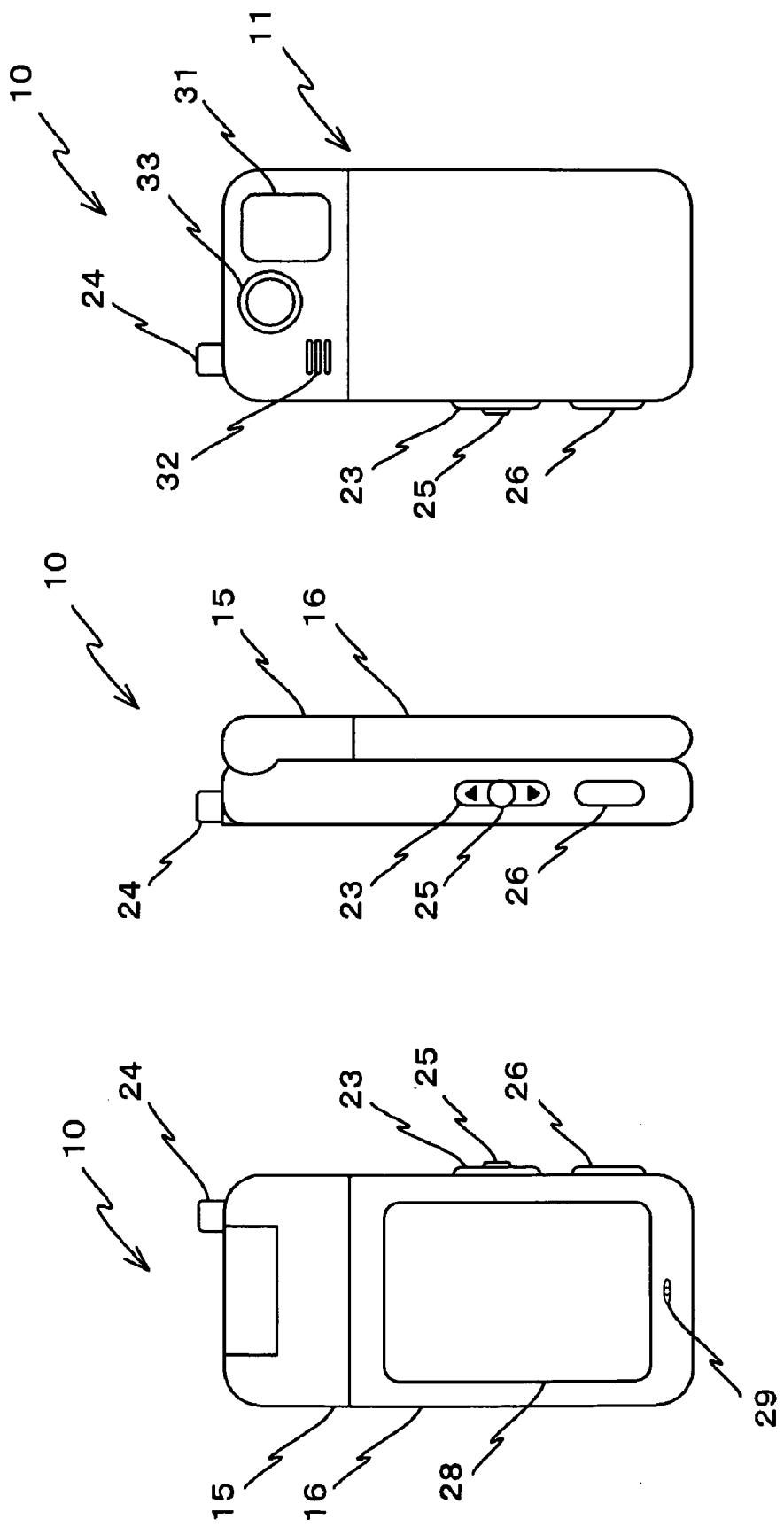

*1: fold mobile telephone 10
*1: open up mobile telephone 10
*3: rotate display section 16 with respect to base section 15
*4: camera mode setting using key operation
*5: communication setting using key operation
Solid line arrows: other than at the time of call receive processing
Dotted line arrows: at the time of call receive processing

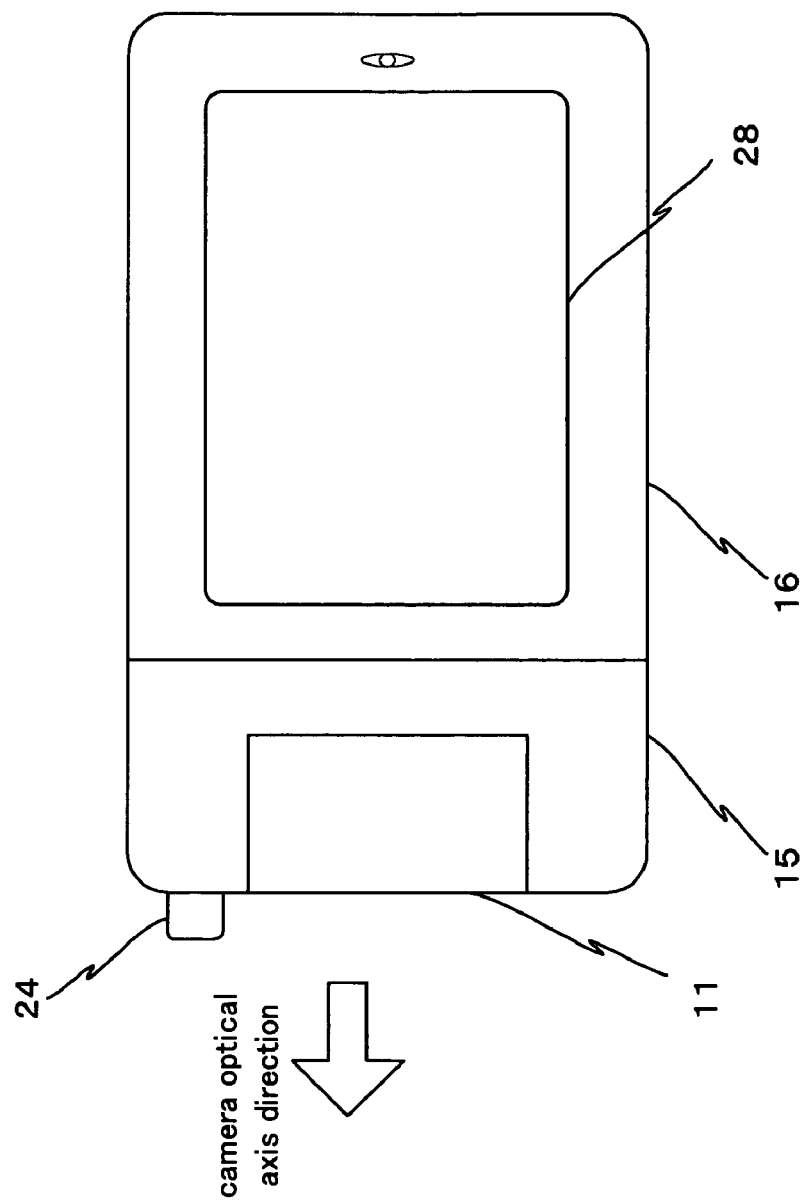
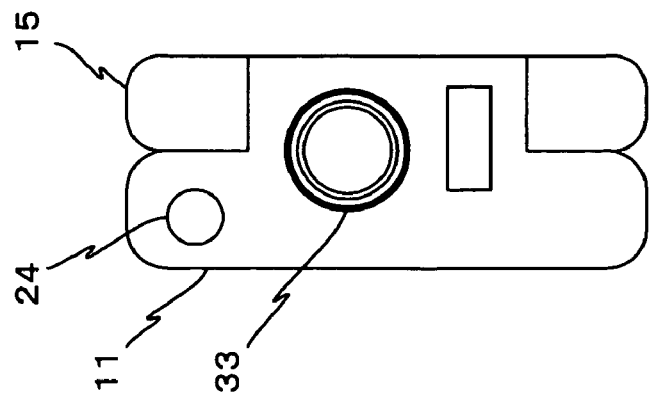

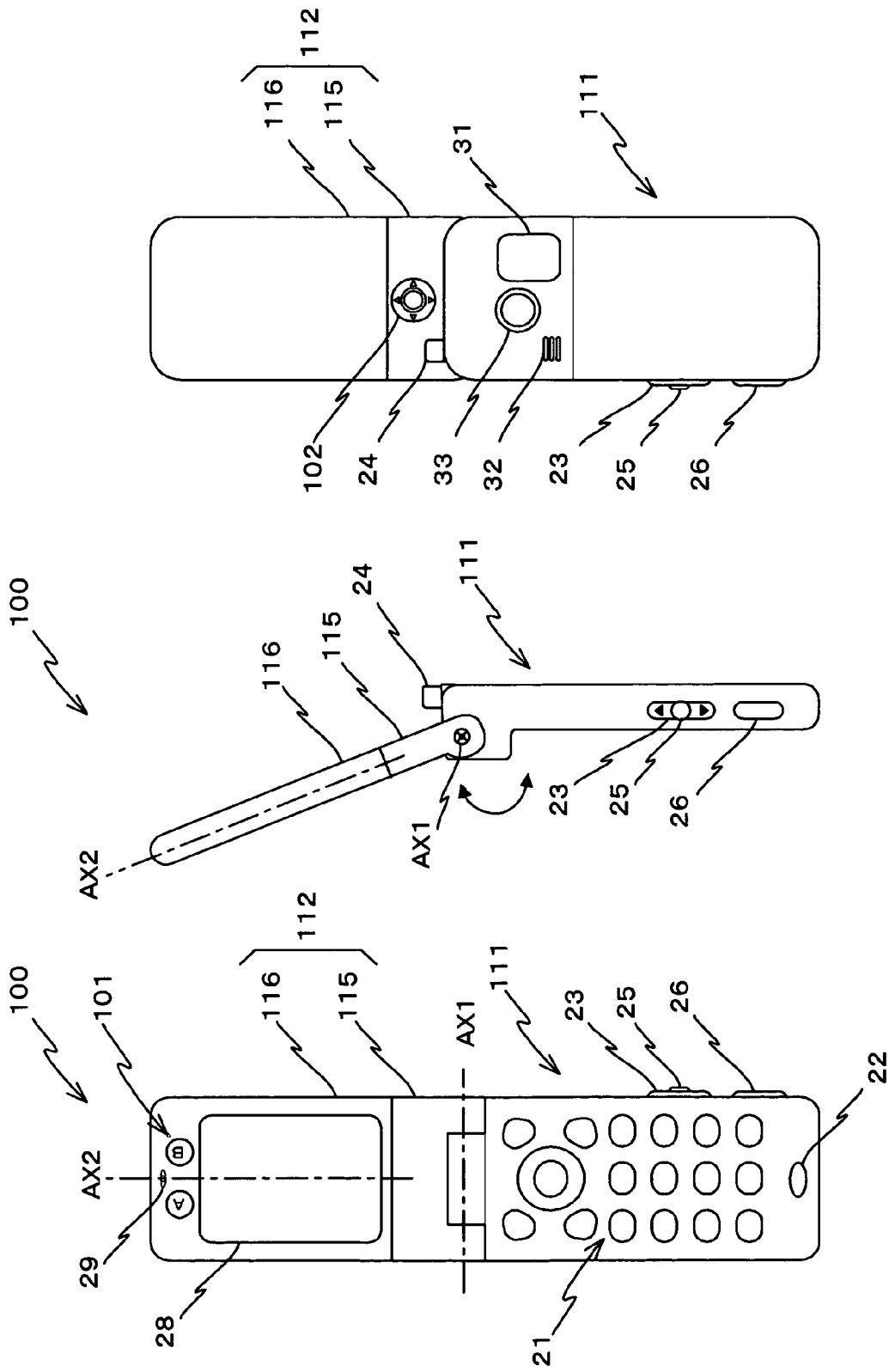

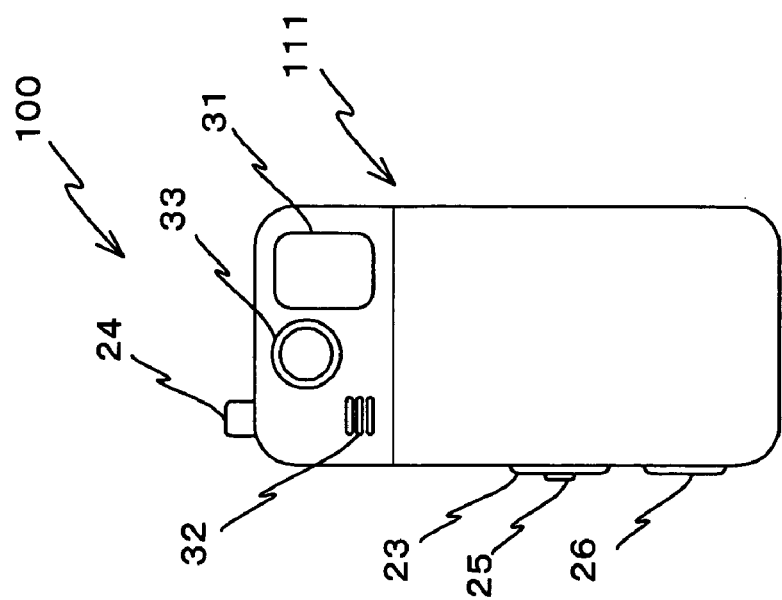
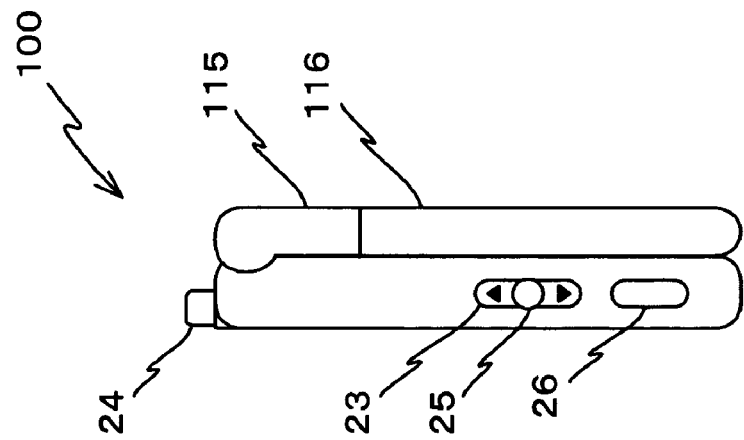
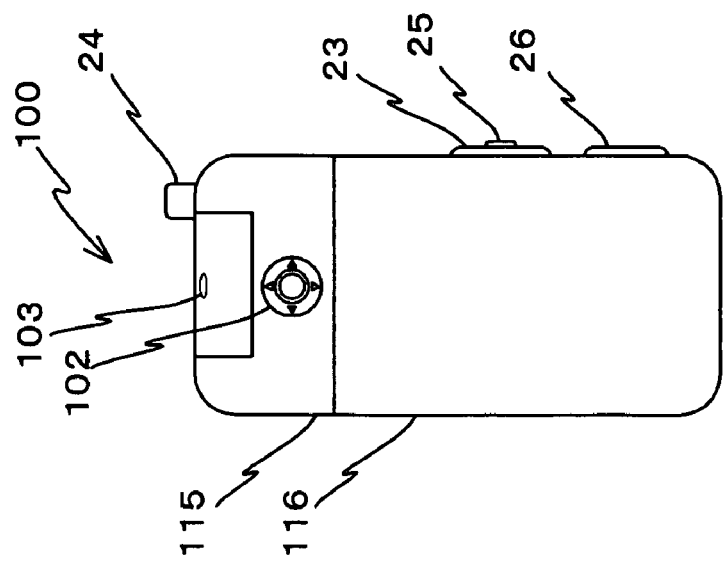

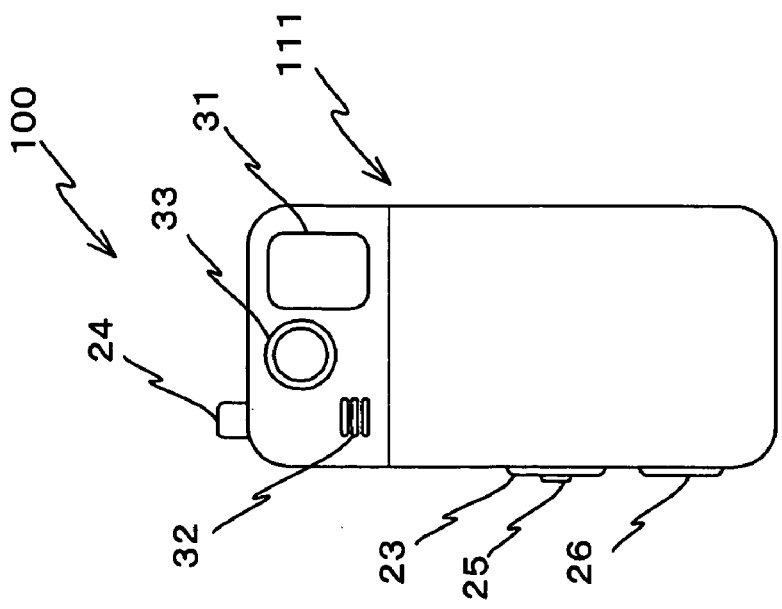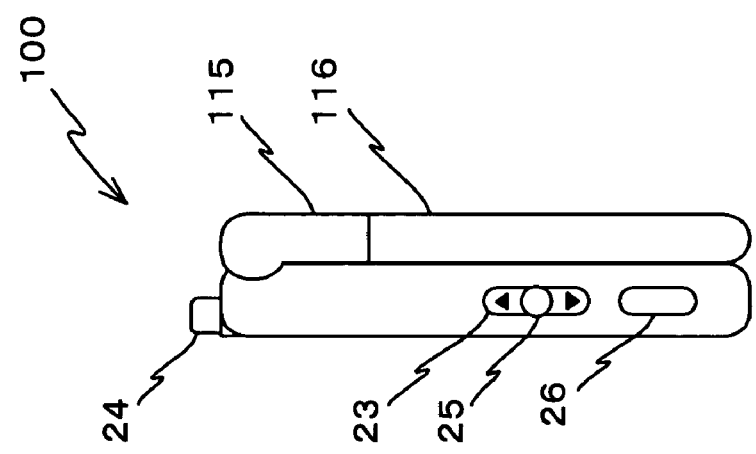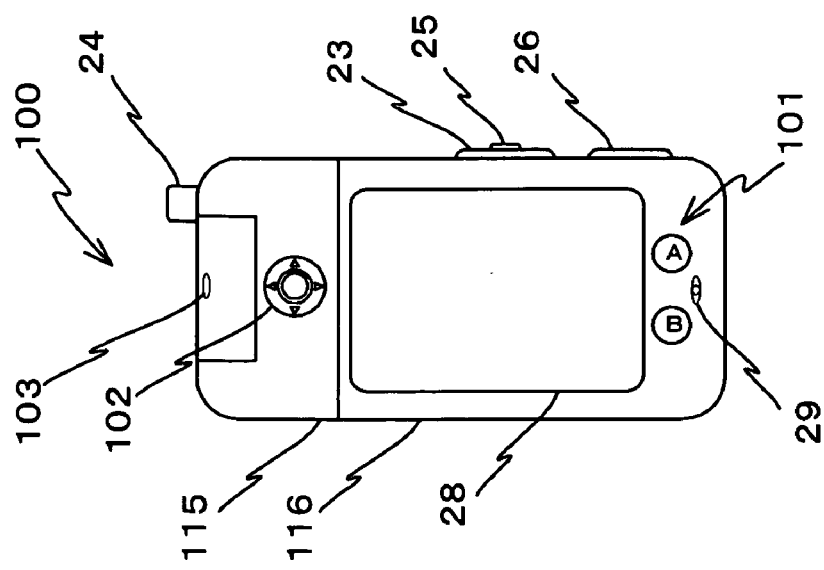

MOBILE COMMUNICATION TERMINAL

This is a continuation application of international patent application No. PCT/JP2004/8353 filed with Application date: Tuesday, Jun. 15, 2004.

BACKGROUND OF THE INVENTION

1. Field of the Invention

The present invention relates to a mobile communication terminal. In more detail, the present invention relates to a foldable mobile communication terminal having a digital camera.

2. Description of the Related Art

In the related art, mobile communication terminals such as mobile telephones etc. are widespread. There have been impressive improvements in the functions and performance of these types of portable communication devices, and in addition to a call function and an email receiving function, which are basic functions of a portable communication terminal, devices having a digital camera function have also started to appear. Mobile telephones having such a digital camera function typically have a first section with an operation section such a numeric key pad, and a second section having a display section including an LCD (Liquid Crystal Display) unit etc.

As a portable telephone with a digital camera function, there is a revolver type device (hereafter referred to as "related art example 1"), in which, while keeping an operation surface having a ten key pad arranged on an operation section and a display surface of a display section parallel to each other, a first section and a second section are overlapped or opened out by turning the second section with respect to the first section on an axis that is perpendicular to the two surfaces as a rotational axis. In this revolver type portable telephone with a digital camera, the camera optical system is arranged on an opposite side to the operation surface of the first section. If a digital camera mode is then set, the display surface of the display section functions as a viewfinder, and an image captured by the optical system of the camera is displayed on the display surface. Also, in a state where the first section and the second section are overlapped in order to enable normal call receipt and making of calls using jog dial, some function keys etc. are arranged on the second section.

Another portable telephone having a digital camera function provided with a first section and a second section is a clamshell type (hereafter referred to as "related art example 2"); in which the second section is turned relative to the first section on an axis that is parallel to both the operation surface and the display surface as a rotational axis. Similarly in a clamshell type portable telephone with a digital camera, the camera optical system is arranged on an opposite side to the operation surface of the first section, or on an opposite side to a surface on which a main display of the second section is arranged. If a digital camera mode is then set in a state where the second section is folded over with respect to the first section, the display surface of the sub-display arranged on a surface opposite to the arrangement surface for the main display of the second section functions as a viewfinder, and an image captured by the optical system of the camera is displayed with a longitudinal direction of the display surface of the sub-display as a width direction. This clamshell type of mobile telephone with a digital camera function is also capable of taking pictures using the camera function while the second section is opened up with respect to the first section. In this case, the display surface of the main display functions as a viewfinder.

With the mobile telephones with a digital camera function of the above described related art 1 and related art 2 examples, in a state where the first section and the second section are overlapping, the lens for the optical system of the camera is arranged to one surface side, while a display surface of a display is arranged to another surface side. Therefore, if the phone is placed on a desk, for example, in a state where the first section and the second section are overlapping, in a stable state, the lens of the camera optical system or the display surface of the display will come into contact with the surface of the desk. Even if the lens of the camera optical system and the display surface of the display are protected by glass, contact with other surfaces causes dirt to stick to the protective glass and becoming tarnished etc. Dirtying and tarnishing of the protective glass etc. has a detrimental effect on the observation of photographed and displayed images.

Also, with the mobile telephone having a digital camera function of related art example 1, it is normally possible to see the display surface from outside. It is therefore difficult to secure confidential information, such as information relating to communication and a wallpaper design set according to the individual taste of a user, which is personal information, compared to a clamshell type mobile telephone. Further, in the case where the first section and the second section are overlapped, in order to enable normal call receipt and making of calls using a jog dial feature, some function keys are arranged on the second section. For this reason, when the first section and the second section are not overlapping in order to operate the numeric key pad, operation keys are arranged divided across the first section and in the second section it is difficult to achieve good operability.

Also, with the mobile telephone having a digital camera function of related art example 2, in a state where the second section is folded over with respect to the first section, the telephone normally functions a digital camera, but in that case, a display surface of a sub-display arranged on an opposite surface to a main display functions as a viewfinder. This sub-display is generally inferior with respect to the size of a display region, display resolution and response for moving pictures compared to a main display used in a state where the mobile communication terminal is opened up. It is therefore difficult to give sufficient viewfinder display characteristics to determine an image to be photographed when functioning as a digital camera in a state where the portable communication terminal is folded up.

SUMMARY OF THE INVENTION

The present invention has been conceived in view of the above-described situation, and an object of the invention is to provide a mobile communication terminal with a digital camera function capable of improving user-friendliness for a user.

Taking a first point of view, the present invention is a mobile communication terminal with a digital camera function constructed so as to be capable of folding up, by connecting a first section and a second section so as to be capable of rotating with respect to each other with a first axis as a rotational axis.

Here, the first section is provided with a camera optical system, and an operation input section, having an operation surface which is facing the second section when folded up and is parallel to the first axis. Also, the second section is provided with a base section provided with a section connected to the first section in a rotatable manner, and a display section having a display device, connected to the base section capable of rotating at least 180 degrees with respect to the base section with a second axis parallel to a display surface of the display device as a rotational axis, the second section being connected to the first section at at least two places on both outer sides along the first axis of the first section.

In this mobile communication terminal, by respectively combining two states relating to two types of rotation, namely rotation of the second section about a first axis with respect to the first section, and rotation of the display section with respect to the base section of the second section about a second axis, mechanically four states are realized.

Specifically, this mobile communication terminal is capable of four states, being a state 1 where the mobile communication device is not folded and the display section is not rotated (display section is oriented facing a operation section when the mobile communication device is folded up), a state 2 where the mobile communication device is folded up and the display section is not rotated, a state 3 where the mobile communication device is not folded up and the display section is rotated (the a surface opposite the display surface is oriented facing the operation surface when the mobile communication terminal is folded up), and a state 4 where the mobile communication device is folded up and the display section is rotated.

Therefore, in the respective four states, while considering transition between states, it is essentially possible to automatically allocate a camera mode and a non-camera mode, including states such as "receiving" and "in call" as operating modes, or appropriately change operating mode as required, which makes it possible to keep the operation mode setting to be carried out by a user to a minimum.

Also, in the above described state 2, since it is possible to rotate the display section, it is possible to have a structure where a sub-display device is not arranged on a surface opposite the display surface of the display device or on the base section. As a result, when placed on a desk, for example, if that surface comes into contact with the desk surface, parts for the optical system or for display, or protective parts for these components, can be prevented from becoming dirty or tarnished due to contact with the desk surface.

Also, since the first section and the second section can be folded up with the clamshell type of telephone, all of the communication operation keys can be arranged on the operation surface of the first section, and it is possible to maintain operability at the time of operation.

Also, since it is possible to realize the above described state 2 where the display section does not constitute the outer surface, it is possible to secure confidential information, such as information relating to communication and a wallpaper design set according to the individual taste of a user, which is personal information.

Also, the second section is connected to the first section in at at least two places on both outer sides along the first axis of the first section, which means that a section of a second section for connection to the first section can be made of sufficient width in the first axis direction. Consequently, it is possible to keep sufficient strength in the second section, and it is also possible to provide more functions in the second section.

Here, with the mobile communication terminal of the present invention, it is possible for the second axis to be perpendicular to the first axis.

Also, with the mobile communication terminal of the present invention, the first section can further comprise a projection section, which projects in a direction perpendicular to the operation surface, for housing the camera optical system. In this way, by ensuring a space for housing a larger camera optical system in a projection section projecting in a direction perpendicular to the operation surface using a connection part of the first section to the second section etc, it is possible to provide a high performance camera.

Also, with the mobile communication terminal of the present invention it is possible for the optical axis of the camera optical system to be parallel to or perpendicular to the operation surface.

Here, in the case where the camera optical axis is perpendicular to the operation surface, the mobile communication terminal can be provided with a display section rotation state detector for detecting a rotation state of the display section with respect to the base section with the second axis as a rotational axis. It is also possible to provide a control section such that when it is detected a change to a rotated state where the display section is oriented not facing the operation surface, the operation mode is set to camera mode. In this case, although not suitable for communication operations carried out by operating the keys of the communication operation section performed while looking at the display of the display section, the state 3 or the state 4 where the display device constitutes an outer surface and can efficiently function as a viewfinder can be detected by the display section rotation state detector. The control section that has received the result of this detection automatically sets a camera mode using the display section as a viewfinder as the operating mode.

Also, this mobile communication terminal can be further provided with a folded state detector for detecting a folded state with the first axis as a rotational axis, or an opened up state where the device is opened up. In this case, when the display section rotation state detector detects the state 3 or the state 4, the folded state detector detects either the state 3 or the state 4. When the state 3 is detected, the display surface of the display device and the camera optical axis being oriented in the same direction, terminal operation is in a camera mode for taking a picture of oneself. Also, when the state 4 is detected, the display surface of the display device and the camera optical axis being oriented in opposite directions, terminal operation is in a camera mode for taking pictures of other people.

Here, when the folded state detector detects a change to an opened up state, being a display section rotation state, it is possible to perform guidance display with a direction perpendicular to the first axis as the vertical direction. Also, when the folded state detector detects a change to a folded state, being a display section rotation state, it is possible to perform guidance display with a direction perpendicular to the first axis as the horizontal direction. Further, in response to a user command, it is possible to change a direction perpendicular to the first axis as the vertical direction or the horizontal direction of the guidance display. Here, "guidance" includes display for assisting in user operations displayed on the display device, and event guidance displaying such as incoming call display and email receipt display. In the event that the mobile communication terminal is used in camera mode, whether the guidance display is used as the horizontal direction is essentially set from the shape of the mobile communication terminal, but can ultimately be set by the user. It is therefore possible, in response to a user command, for a control section to change the orientation of the guidance display, and it is possible to maintain operability.

Also, while operating in camera mode, it is possible for the control section to display guidance transparently on the display device. In this case, when operating in camera mode it is possible to use the entire display screen as a viewfinder, and in addition the viewfinder display image is not significantly impaired, making it possible to display guidance desired to be conveyed to the user on the display section.

Also, the control section can also notify the user of the fact that a mail has been received while operating in camera mode, and displays contents of the mail in response to a user instruction. In this case, even when operating in camera mode, when receiving mail is detected, the fact of a receiving mail notified to the user and it is possible to confirm the content of the received mail as a result of user judgment, which means that the user can easily take appropriate action for the received mail.

The control section can also notify the user of an incoming call while operating in camera mode. In this case, even when operating in camera mode, when an incoming call is detected, the fact of an incoming call is notified to the user, which means that the user can immediately take appropriate action for the received call.

Also, when the power supply is turned on in the opened up state and in a display non-rotated state where the display surface is oriented facing the operation surface, the control section can set the operating mode to non-camera mode. In this case, when the mobile communication terminal is in the state 1, if the power supply is turned on the terminal operates not in camera mode, but in non-camera mode. Here, "non-camera mode" means a mode other than camera mode, and includes not only "awaiting receipt" and "call in progress" states, but also a state where an application such as mail or a game is being executed.

Also, in the case of operating in camera mode in the display section rotated state and the opened up state, the control section can display a reversed image in the left-right direction. In this case, for photographing oneself, left-right reversal of the display device screen is carried out, and a photographing screen that is easy for a user to perceive is provided by displaying objects on the right side on the right side, and objects on the left side on the left side, like a mirror.

Also, the control section sets the operation mode to non-camera mode when the folded state detector detects a change to the folded state while in a display section non-rotation state. In this case, when a change to the state 2 has been detected by the display section rotation state detector and the folded state detector, it is in a non-camera mode.

Here, when the folded state detector detects a change to the opened up state as a result of the mobile communication terminal being opened up from the folded state non-camera mode with the first axis as a rotational axis, the control section sets the operation mode to non-camera mode. In this case, when a change from the state 2 to the state 1 is detected by using the display section rotation state detector and the folded state detector, the control section switches operation mode from the folded state non-camera mode to an opened up state non-camera mode which uses the display device for communication.

This mobile communication terminal can also be provided with a folded operation section for carrying out operations when folded, at a rear surface of a surface facing the operation surface at the base section when folded up. In this case, even in the folded state, since it is possible to carry out operations, it is possible for a user to more easily carry out operations without opening up the mobile communication terminal.

Further, in the case of the display section rotated state and the folded up state, control of voice communication is carried out in response to user commands via the folded operation section. In this case, the user can make a call while still in the folded state.

Also, this mobile communication terminal is provided with a display surface operation section on a display surface side of the display section, and the control section executes a game function in response to a user command via at least one of the folded operation section and the display surface operation section when in the display section rotated state and the folded state. In this case, this mobile communication terminal is also provided with a display surface operation section that a user can operate at a display surface side of the display section, and a user can use the game function by operating the display surface operation section and the folded operation section.

The control section also sets operation mode to camera mode when the display section rotation state detector detects a change to a display section non-rotation state while in operating camera mode of the opened up state. In this case, when a change has been detected from the state 3 to the state 1 by using the display section rotation state detector and the folded state detector, the control section switches operation mode from the state 3 camera mode for taking pictures of oneself to a state 1 camera mode for taking pictures of other people, where the display surface of the display device and the observation surface of a camera imaging section are oriented in opposite directions.

Also, in the event of a change to the display section non-rotated and opened up state camera mode, it is possible to perform guidance display with a direction perpendicular to the first axis as the vertical direction. Further, while in the display section non-rotated state and opened up state camera mode, in response to a user command, the control section changes the direction perpendicular to the first axis to the horizontal direction of the guidance display. In this case, in the event that the mobile communication terminal is used in camera mode, whether the guidance display is used in the horizontal direction is essentially set from the shape of the mobile communication terminal, but can ultimately be set by the user. It is therefore possible, in response to a user command, for a control section to change the orientation of the guidance display, and it is possible to maintain operability.

Also, in the display section non-rotated state, and in the event that a call is received while operating in opened up state camera mode, operation mode is set to non-camera mode in order to allow communication process for the received call, and after call processing has been completed, the control section can set operation mode to camera mode. In this case, even if an incoming call is detected while operating in the state 1 camera mode and the user has responded, once communication has been completed, user mode reverts back to camera mode is returned to, which means that the user can continue carrying out operations in camera mode.

Taking a second point of view, the present invention is a mobile communication terminal with a digital camera function constructed so as to be capable of folding up, by connecting a first section and a second section so as to be capable of rotating with respect to each other with a first axis as a rotational axis.

Here, the first section is provided with a camera optical system, and an operation input section, having an operation surface which is facing the second section when folded up and is parallel to the first axis. Also, the second section is provided with a base section with a section connected to the first section in a rotatable manner, and a display section having a display device, connected to the base section capable of rotating at least 180 degrees with respect to the base section with a second axis parallel to a display surface of the display device as a rotational axis. Operation mode is also switched according to a state where the first section is rotated with respect to the second section, and a state where the display section is rotated with respect to the base section.

In this mobile communication device, similarly to the first point of view, in order to mechanically realize four states from the state 1 to the state 4, by allocating an appropriate operation mode according to each state it is possible to provide a more user-friendly mobile communication terminal.

It is also possible to further provide a display section rotation state detector for detecting a rotation state of the display section with respect to the base section with a second axis as a rotational axis, a folded state detector for detecting a folded state with a first axis as a rotational axis or an opened up state where the device is opened up, and a control section for setting operation mode to camera mode when the folded state detector has detected a change to the folded state while in a display section rotated state with the display surface oriented not facing the operation surface.

In this case, using the display section rotation state detector or the folded state detector it is possible for the mobile communication terminal to recognize changes in the four mechanical states. Further, when a change to the folded state is detected while in the display section rotated state, that is, a a change from the state 3 to the state 4 is detected, the control section sets the operation mode to camera mode where a display surface outside is used as a viewfinder. Therefore, it is possible for a user to immediately use the device as a camera by only changing the mechanical shape of mobile communication terminal.

Also, the control section can set the operation mode to camera mode when the display section rotation state detector detects a change to the display section rotated state. In this case, camera mode is set in the case of changing to the state 3 without changing to the state 4. When the viewing direction of the camera imaging section and the display surface direction of the display section are the same, it is possible to quickly use the camera to take pictures of oneself.

Also, the control section sets the operation mode to non-camera mode when the folded state detector detects a change to the folded state while in a display section non-rotation state where the display surface is oriented facing the operation surface, and the control section sets the operation mode to non-camera mode when the folded state detector detects a change to the opened up state while in a display section non-rotation state.

The control section also sets the operation mode to camera mode when the display section rotation state detector detects a change to a display section non-rotation state where the display surface is oriented facing the operation surface while operating in camera mode of the opened up state. In this case, when a change to the first state is detected while operating in camera mode of the state 3, the control section sets to or maintains camera mode without setting to non-camera mode. Therefore it is possible to continue use in camera mode without resetting the camera mode.

BRIEF DESCRIPTION OF THE DRAWINGS

FIG. 1A-FIG. 1C are drawings schematically showing the external structure of a state 1 of a mobile telephone with a digital camera function of a first embodiment of the present invention;

FIG. 6A-FIG. 6C are drawings schematically showing the external structure of a state 4 of a mobile telephone with a digital camera function of the first embodiment of the present invention;

FIG. 26A and FIG. 26B are drawings showing a second modified example of a state 4 when an optical axis of a camera optical system is perpendicular to an operation surface;

FIG. 27A-FIG. 27C are drawings schematically showing the external structure of a state 1 of a mobile telephone of a second embodiment of the present invention;

FIG. 29A-FIG. 29C are drawings schematically showing the external structure of a state 2 of a mobile telephone of the second embodiment of the present invention;

FIG. 31A-FIG. 31C are drawings schematically showing the external structure of a state 4 of a mobile telephone of the second embodiment of the present invention;

DETAILED DESCRIPTION OF THE EXEMPLARY EMBODIMENTS

First Embodiment

The following is a description with reference to FIG. 1A to FIG. 16 of a first embodiment of the present invention.

Figure 2:
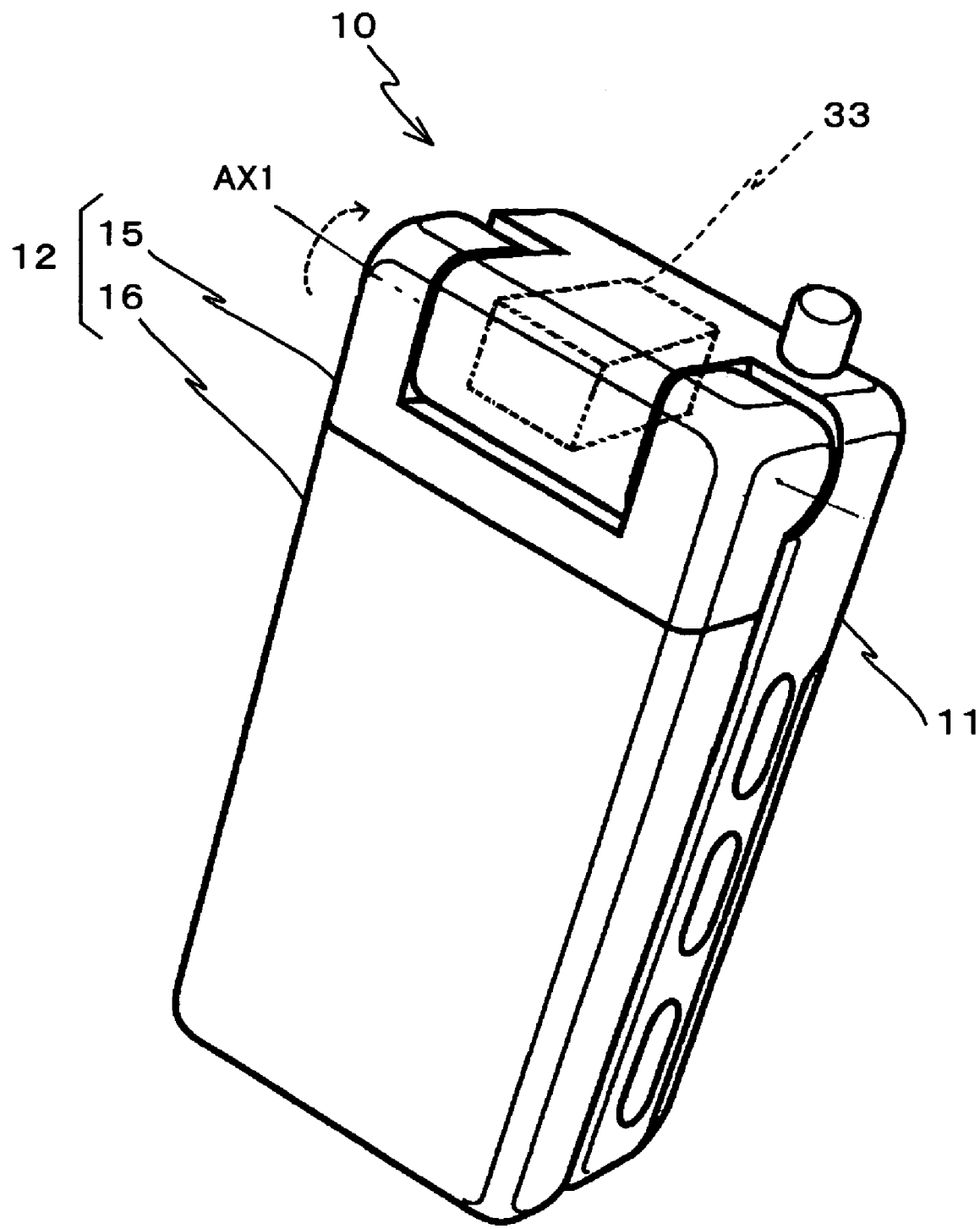
FIG. 2 is a drawing showing a camera optical system being housed in a projecting section of a mobile telephone with a digital camera function of the first embodiment of the present invention.
Figure 3:
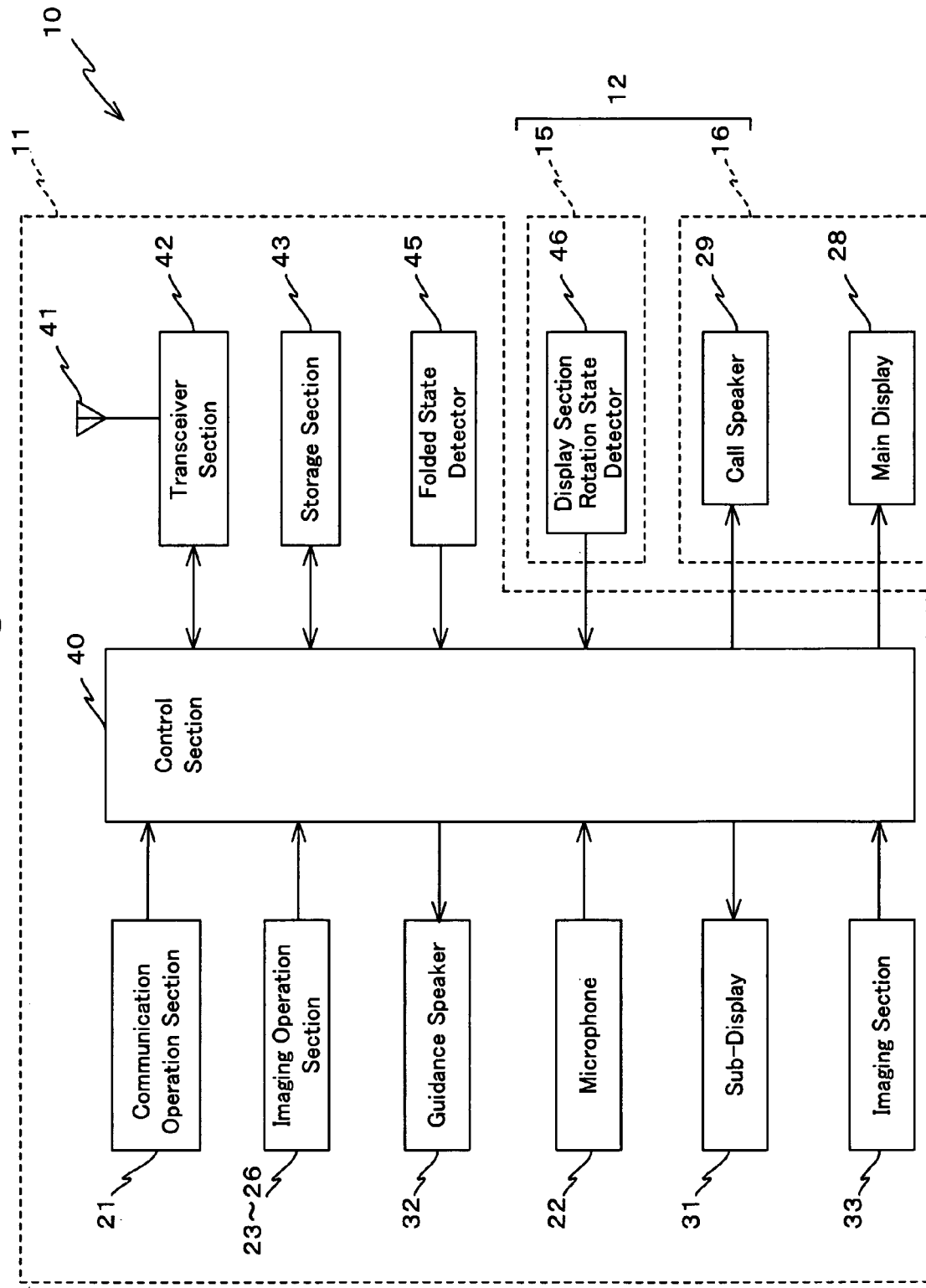
FIG. 3 is a functional block diagram of a mobile telephone with a digital camera function of the first embodiment of the present invention.

FIG. 1A-FIG. 3 schematically show the structure of a mobile telephone 10, being a mobile communication terminal of the first embodiment. FIG. 1A to FIG. 1C show the external structure of a state 1 configured as will be described later. An external front view of the mobile telephone 10 is shown in FIG. 1A, an external right side view of the mobile telephone is shown in FIG. 1B, and an external rear view of the mobile telephone is shown in FIG. 1C. Also, a functional block diagram of the mobile telephone 10 is shown in FIG. 3.

In FIG. 1A to FIG. 3, as is comprehensively shown the mobile telephone is provided with a first section 11, and a second section 12 capable of rotating with respect to the first section 11 on a first axis, namely axis AX1, as a rotational axis. Also, the second section 12 is connected in a rotatable manner to the first section 11 at two places of the first section 11 on both sides along the axis AX1.

The second section 12 has a base section 15 arranged at the first section 11 side, and a display section 16 capable of rotating with respect to the base section 15 with a second axis namely axis AX2, as a rotational axis.

First, (a) a communication operation section 21 having operation keys such as a ten key pad or function keys arrayed, and (b) a microphone 22 for input of voice when making a call are arranged at the operation surface side of the first section 11 shown in FIG. 1A. Here, the communication operation section 21 is provided with an origination key for, when a call or email is originated, instructing start of origination processing and instructing start of call processing when a call is received, and an end call/power supply key for instructing call termination as a result of being pressed down for a short time during a call, and instructing turning on or turning off of a power supply as a result of being pressed down for a long time. If the call terminate/power supply key is pressed down for only a short time between a call being received and a call starting, a simple message recording is carried out.

Also, (c) a camera operation section, comprising a camera vertical direction key 23 for effecting operations when operating in camera mode, a camera decision key 25 and a shutter key 26 are arranged on the right side surface shown in FIG. 1B when the operation surface of the first section 11 is the front surface. Also, (d) a camera horizontal direction dial 24 for effecting operations when operating in camera mode is arranged on the upper side surface when the operation surface of the first section 11 is the front surface. Also, as shown in FIG. 1C, (e) a sub-display 31 for carrying out auxiliary display in a structural state 1 (refer to FIG. 4A-4C) that will be described later where a main display, also described later, does not constitute an outer surface, (f) a guidance speaker 32 for generating ringtone and guidance sound, and (g) an imaging section 33 for imaging a scene in the field of view of the camera optical system, are arranged on a rear surface of the operation surface of the first section 11. As shown in FIG. 2, which is a perspective view of the mobile telephone 10 in a structural state 2 that will be described later, the imaging section 33 is housed in a projecting section of the first section 11 formed in order to connect to the second section 12.

As shown in FIG. 3, in addition to the above described elements, the first section 11 is provided internally with (h) a control section 40 for unified control of overall operation of the mobile telephone 10 provided with a central processing unit (CPU) and a digital signal processor (DSP), (i) a built-in antenna 41 for transferring radio signals to and from a base station, (j) a transceiver section 42 for transmitting and receiving communication signals via an antenna 41 and (k) a storage section 43 for storing programs and data. Also, the first section 11 is further internally provided with (l) a folded state detector 45 for detecting a folded state of the mobile telephone 10. Here, the folded state detector 45 detects the folded state when the mobile telephone 10 is completely folded up, and when the mobile telephone 10 is not completely folded up, detects an opened up state.

Also, as shown in FIG. 1A, the display section 16 of the second section 12 is provided with a main display 28 for displaying results of operation of the communication operation section 21 in response to instructions of the control section 40, and a call speaker 29 for reproducing a speech signal transmitted from another party during a call.

Likewise, as shown in FIG. 3, the base section 15 in the second section 12 is further provided internally with a display section rotation state detector 46 for detecting a rotation state of the display section 16 with respect to the base section 15. Here, the display section rotation state detector 46 notifies the fact of a display section non-rotated state, where the positional relationship between the base section 15 and the display section 16 in FIG. 1A-FIG. 1C, that is, a positional relationship where an operation surface and a display surface of the main display 28 are opposed when the mobile telephone 10 is folded up, to the control section 40. Also, the display section rotation state detector 46 notifies the fact of a display section rotation state to the control section 40 when the display section 16 is in a display section rotation state rotated by 180 degrees about the axis AX2 from the display non-rotation state.

From the display section non-rotation state to the display section rotation state, the display section rotation state detector 46 notifies the control section 40 of a display section non-rotation state. Also, from the display section rotation state to the display section non-rotation state, the display section rotation state detector 46 notifies the control section 40 of a display section rotation state.

Figure 4C:
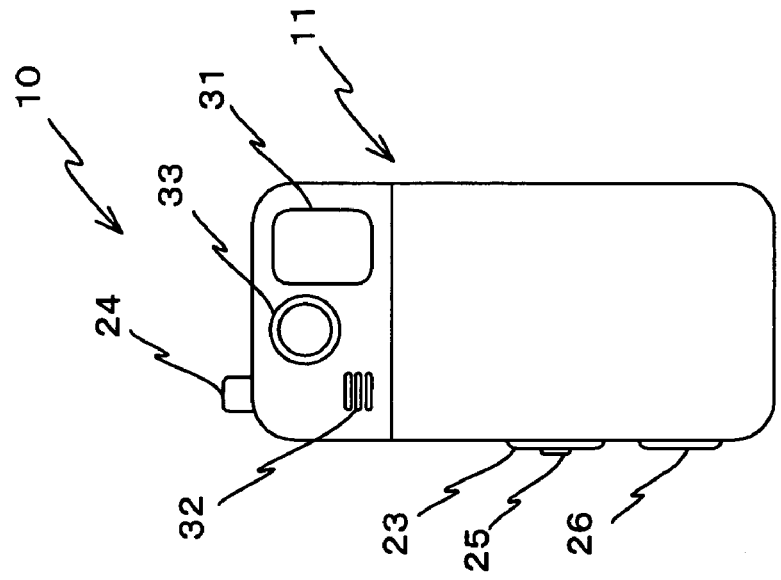
FIG. 4A-FIG. 4C are drawings schematically showing the external structure of a state 2 of a mobile telephone with a digital camera function of the first embodiment of the present invention.
Figure 4B:
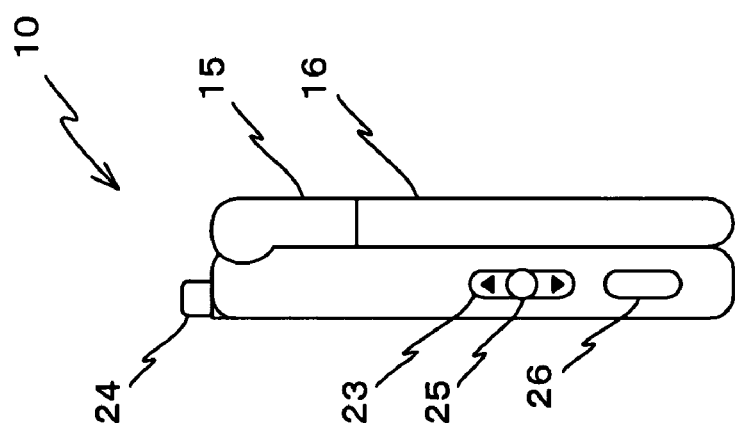
Figure 4A:
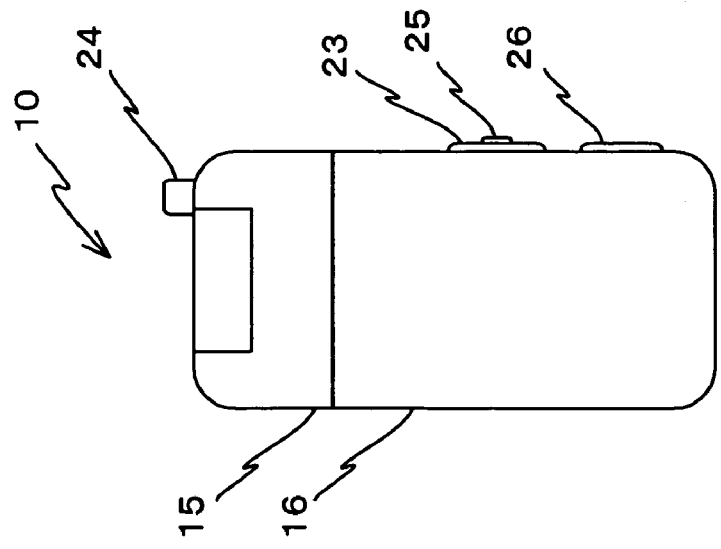
Figure 5C:
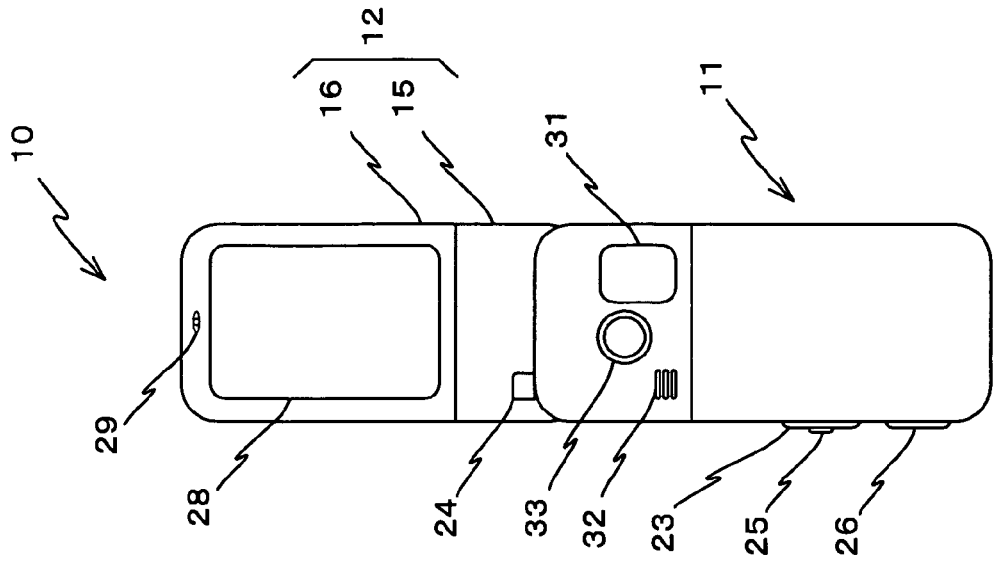
FIG. 5A-FIG. 5C are drawings schematically showing the external structure of a state 3 of a mobile telephone with a digital camera function of the first embodiment of the present invention.
Figure 5B:
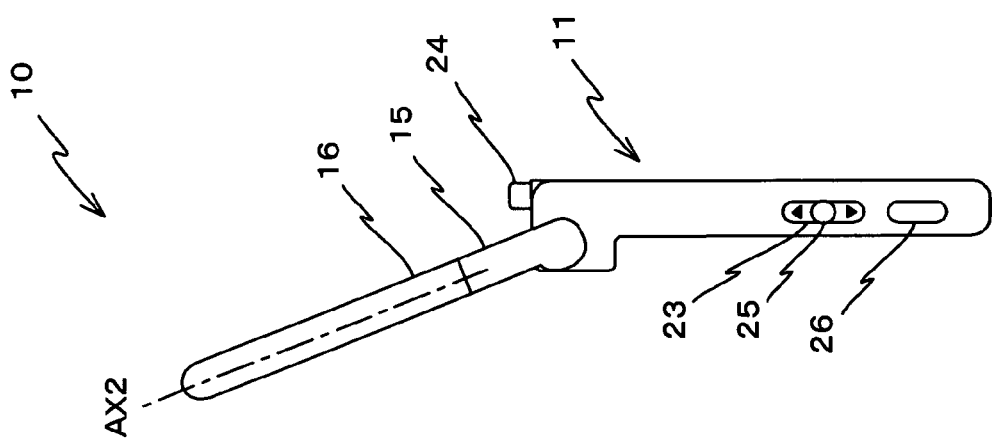
Figure 5A:
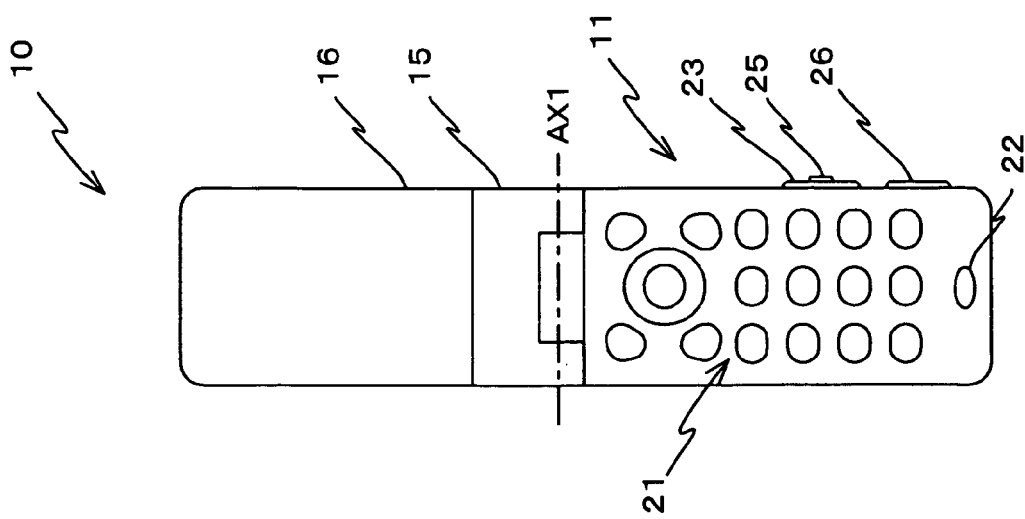
Figure 7:
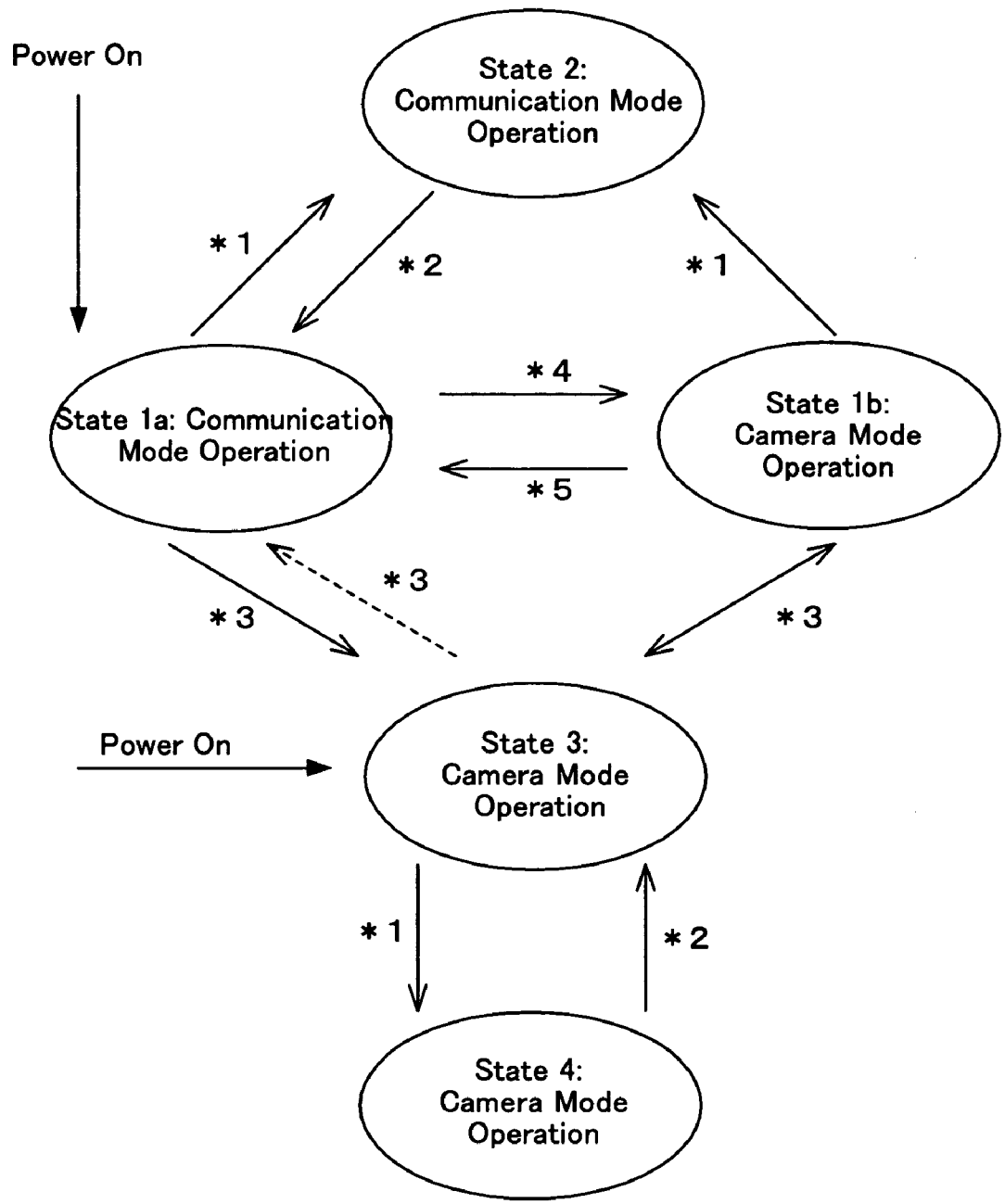
FIG. 7 is a drawing for describing transition among the states of the first embodiment of the present invention, together with functional transition.

With the mobile telephone 10 having the above described structure, four states are structurally obtained, these state being (i) as exemplified in FIG. 1A-1C, the structural state 1 where the mobile telephone 10 is in the opened up state and the display section non-rotation state, (ii) as exemplified in FIG. 4A-4C, a structural state 2 where the mobile telephone 10 is folded up in the display section non-rotation state, (iii) as exemplified in FIG. 5A-5C, a structural state 3 where the mobile telephone 10 is in the opened up state and in the display section rotation state, and (iv) a structural state 4 where the mobile telephone 10 is folded up in the display section rotation state.

Here, in the structural state 2, as shown in FIG. 4A-4C, the display surface of the main display 28 and the communication operation section 21 are hidden away inside. Taking this fact into consideration, the control section 40 sets the operating mode of the mobile telephone to communication mode, which is a non-camera mode, if the structural state 2 is recognized. In this communication mode, each key of the above described camera operation section is effectively subjected to key lock. In the second section 12, since a surface on which components having an optical function is never arranged constitutes an outer surface (refer to FIG. 4), even if the mobile telephone 10 is placed on a desk or table that would come into contact with this surface, the display surface having an optical function, the camera optical system of the imaging section 33 and or transparent protective members are not damaged or dirtied.

Also, in the structural state 3, as shown in FIG. 5A-5C, the display surface of the main display 28 and the communication operation section 21 are shown facing outwards, but are oriented in opposite directions. Therefore, it is not possible to operate the communication operation section while looking at the display surface of the main screen 28. On the other hand, with the structural state 3, in a state where the user is looking at the display surface of the main display 28, the field of view direction of the imaging section 33 is oriented towards the user, giving a state where it is possible to take pictures of oneself with the display surface of the main display 28 as a viewfinder. Taking this fact into consideration, the control section 40 sets the operating mode of the mobile telephone 10 to the state 3 camera mode, where a guidance display of the main display 28 has the direction of axis AX2 as the vertical direction, if the structural state 3 is recognized. This guidance display orientation can be set to the direction of axis AX2 being the horizontal direction, as a result of the user operating the camera operation section. Also, in this state 3 camera mode, results of taking pictures using the camera optical system are displayed on the main display reversed in the left-right direction. In the state 3 camera mode, keys of the communication operation section, except for the call terminate/power supply key, are effectively subjected to key lock.

Also, in the structural state 4, as shown in FIG. 6A-FIG. 6C, the display surface of the main display 28 faces outwards, but in a state where the user is looking at the display surface of the main display 28, it is the same format as a normal digital camera, where a field of view direction of the imaging section is oriented in a direction opposite to the user side direction. Taking this fact into consideration, the control section 40 sets the operating mode of the mobile telephone 10 to state 4 camera mode, where a guidance display of the main display 28 has the direction of axis AX2 as the horizontal direction, if the structural state 4 is recognized. Similar to the case of state 3 camera mode, this guidance display orientation can be set to the direction of axis AX2 being the vertical direction, as a result of the user operating the camera operation section. With this state 4 camera mode, results of taking pictures using the camera optical system are displayed on the main display not reversed in the left-right direction.

In the structural state 1, as shown in FIG. 1A-1C, the display surface of the main display 28 and the communication operation surface of the operation section 21 are both facing up. Therefore, it is possible to operate the communication operation section while looking at the display surface of the main screen 28. Also, with the structural state 1, in a state where the user is looking at the display surface of the main display 28, the field of view direction of the imaging section 33 is oriented towards a side opposite to the user, giving a state where it is possible to take normal pictures (take pictures with the field of view direction of the user being the photographing direction) with the display surface of the main display 28 as a viewfinder. Taking these facts into consideration, the control section 40 can set operation to either a communication mode where sending and receiving operations are possible or a camera mode where the display surface of the main display is used as a viewfinder, if the structural state 1 is recognized. In the state 1 camera mode, orientation of the guidance display is with the axis AX2 direction as the vertical direction. Similarly to the case of state 3 and state 4 camera modes, this guidance display orientation can be set to the direction of axis AX2 being the vertical direction, as a result of the user operating the camera operation section. With the state 1 camera mode, results of taking pictures using the camera optical system are displayed on the main display not reversed in the left-right direction.

In the following description, in the structural state 1*a* state when operating in communication mode is also called a "state 1*a*", and a state when operating in camera mode is called a "state 1*b*".

Next, state transition between each of the states described above will be described with reference to FIG. 7.

Turning the power supply on or off is only possible the structural state 1 or state 3 where operation of the communication operation section 21 is possible. In the event that the power supply is turned on in the structural state 1, the folded state detector 45 and the display section rotation state detector 46 detect the opened up state and the display section non-rotated state of the structural state 1. The control section 40 receiving this detection result sets the operating mode to communication mode. Specifically, the unit enters the state 1a. On the other hand, in the event that the power supply is turned on in the structural state 3, the folded state detector 45 and the display section rotation state detector 46 detect the opened up state and the display section rotated state of the structural state 3. The control section 40 receiving this detection result sets the operating mode to camera mode.

In the event that the mobile telephone 10 is folded up from the state 1a, the folded state detector 45 and the display section rotation state detector 46 detect the folded up state and the display section non-rotated state of the structural state 2. The control section 40 receiving this detection result sets the operating mode to communication mode. Also, in the event that the mobile telephone 10 is opened up from the structural state 1, the folded state detector 45 and the display section rotation state detector 46 detect the opened up state and the display section non-rotated state of the structural state 1. The control section 40 receiving this detection result sets the operating mode to communication mode.

Also, in the event that the display section 16 is rotated from the state 1a with respect to the base section 15, the folded state detector 45 and the display section rotation state detector 46 detect the opened up state and the display section rotated state of the structural state 3. The control section 40 receiving this detection result sets the operating mode to camera mode. Then, if the second section 12 is folded up with respect to the first section 11 from the structural state 3, the folded state detector 45 and the display section rotation state detector 46 detect the folded up state and the display section rotated state of the structural state 4. The control section 40 receiving this detection result sets the operating mode to camera mode.

In the event that the mobile telephone 10 is opened up from the structural state 4, the folded state detector 45 and the display section rotation state detector 46 detect the opened up state and the display section rotated state of the structural state 3. The control section 40 receiving this detection result sets the operating mode to camera mode. Then at the time of call arrival processing, in the event that the display section 16 is rotated from the structural state 3 with respect to the base section 15, the folded state detector 45 and the display section rotation state detector 46 detect the opened up state and the display section non-rotated state of the structural state 1. The control section 40 receiving this detection result sets the operating mode to opened up communication mode. Specifically, the unit enters the state 1a.

On the other hand, except at the time of call arrival processing, in the event that the display section 16 is rotated from the structural state 3 with respect to the base section 15, the folded state detector 45 and the display section rotation state detector 46 detect the opened up state and the display section non-rotated state of the structural state 1. The control section 40 receiving this detection result sets the operating mode to camera mode. Specifically, the unit enters the state 1b. Then, in the event that the mobile telephone 10 is folded up from the state 1b, the folded state detector 45 and the display section rotation state detector 46 detect the folded up state and the display section non-rotated state of the structural state 2. The control section 40 receiving this detection result sets the operating mode to communication mode.

Also, between the state 1a and the state 1b, the structural state does not change, but as a result of operation of the communication operation section 21 it is possible to have transition between states. Specifically, in the state 1a, if a camera mode operation instruction is issued as a result of operation of the communication operation section 21, the control section 40 receiving this instruction sets camera mode in the operation mode. As a result, a transition of state from the state 1a to the state 1b is achieved.

On the other hand, in the state 1b, if a communication mode operation instruction is issued as a result of operation of the communication operation section 21, the control section 40 receiving this instruction sets communication mode in the operation mode. As a result, a transition of state from the state 1b to the state 1a is achieved.

In the above described states which transit between states, with this embodiment, sending operations to the network are only possible in the state 1a. In the state 1a, in accordance with operation of the communication operation section 21 carried out by the user while looking at the communication section screen displayed on the main display 28, call sending and receiving and email transmission are performed. Also, it is only possible to create email for transmission, display received email and execute a browser function etc., which are carried out while looking at the communication display of the main display 28, in the state 1a.

Also, a photographing function is only possible in the state 1b, the state 3 or the state 4. In the state 1b, camera function setting or change, such as zoom, is carried out by operation of the communication operation section 21. Also, in the state 3 or the state 4, setting or change of camera function are carried out by operation of the camera operation section performed while looking at guidance displayed on the main display 28.

Figure 8A:
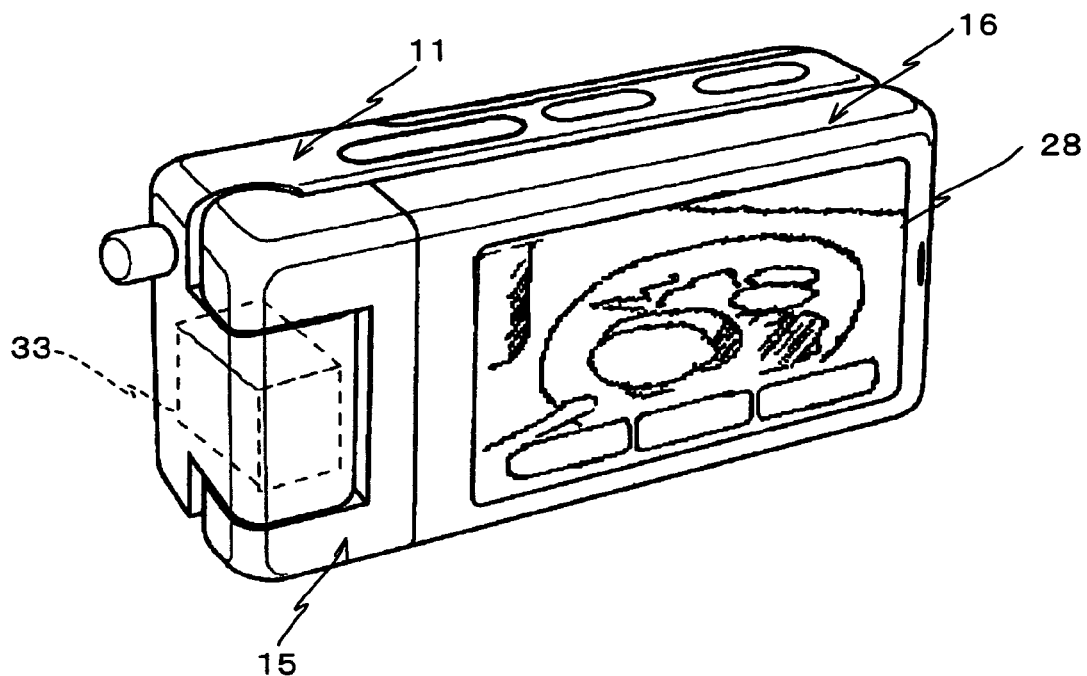
FIG. 8A and FIG. 8B are drawings for describing guidance display for camera mode of the state 4 of the first embodiment of the present invention.
Figure 8B:
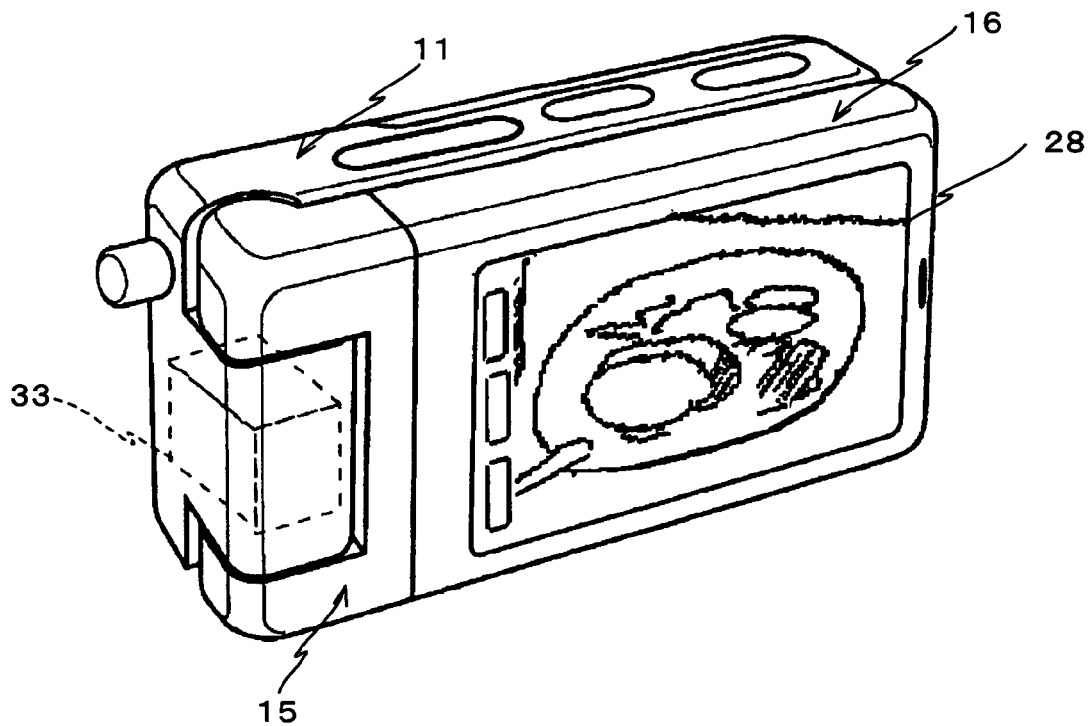

Also, as previously described, in the event that the structural state of the mobile telephone 10 is changed and the state after change is a camera mode, the control section 40 determines whether the guidance display displayed on the main display 28 has the direction of axis AX2 as the horizontal direction or the vertical direction, and displays guidance. Here, it is possible for the user to change the orientation of the guidance display by operating the camera operation section. In describing an example for the case of a change from the structural state 3 to the state 4, as shown in FIG. 8A and FIG. 8B, the controller 40 that has recognized the change from the state 3 to the state 4 performs guidance display on the main display with the axis AX2 direction as the horizontal direction, as shown in FIG. 8A. As a result of the user operating the camera operation section and performing a command to display guidance with the axis AX2 direction as the vertical direction, it is possible to switch to the guidance display shown in FIG. 8B where the axis AX2 direction is the vertical direction.

Guidance for setting or change of camera functions displayed on the main display 28 in this manner is displayed transparently on the viewfinder image using the full range of the display screen of the main display 28.

After camera function setting or change, it is possible to take pictures by operating the shutter 26. The results of taking pictures are then stored in the above-described storage section 43.

Notification processing for incoming calls and processing for received email is possible in all of the above described states. Here, these receiver processes are carried out mainly by the control section 40.

Of these processes, first of all a description will be given of processing related to incoming calls started by notification processing of an incoming call.

Figure 9:
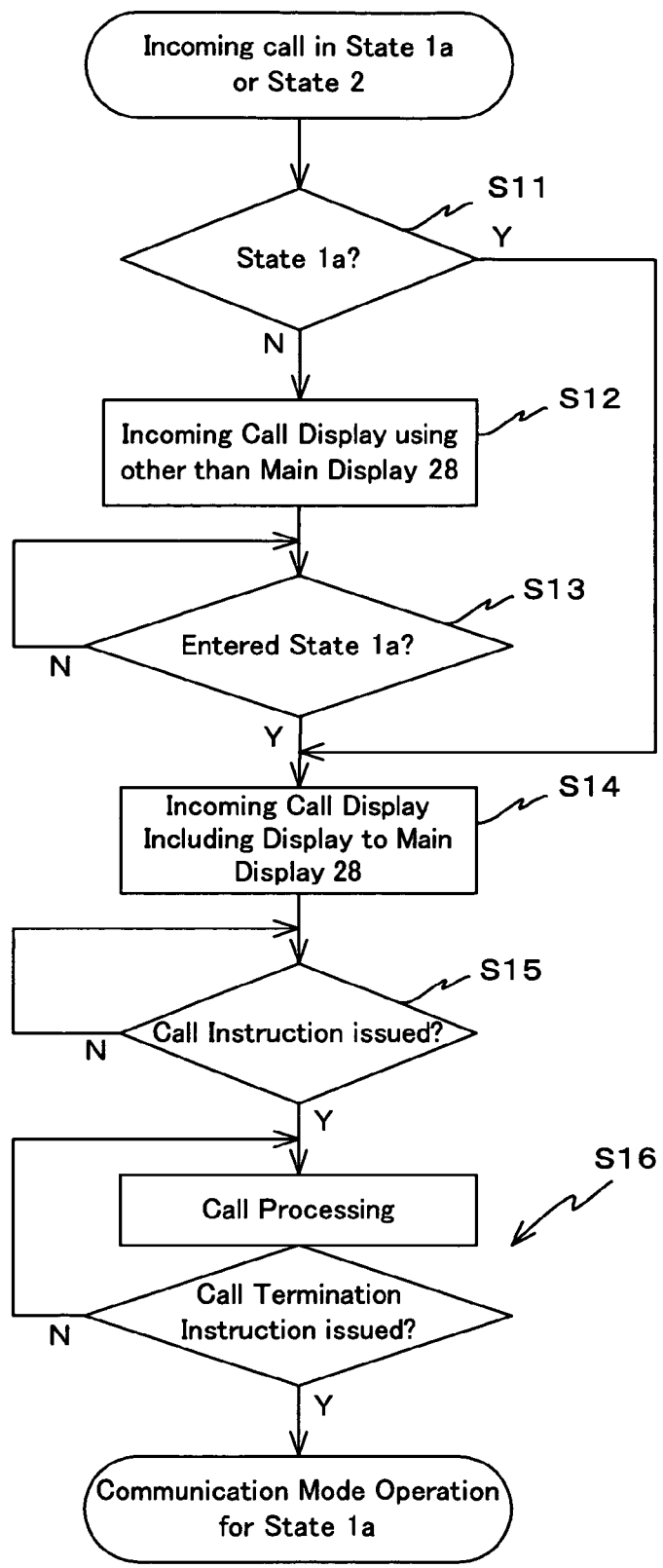
FIG. 9 is a flowchart for describing processing for call receipt at the time of communication mode, which is a non-camera mode, of the first embodiment of the present invention.

Processing for when a call is received during communication mode operation of the above described state 1a or state 2 will be described with reference to FIG. 9. In this case, first of all, in step S11 it is determined whether or not the current state is the state 1a. If this determination is affirmative, processing transfers to step S14.

On the other hand, if the current state is the state 2, and the determination of step S11 is negative, processing transfers to step S12. In this step S12, incoming call display is performed using other than the main display 28. Specifically, a beep is emitted from the guidance speaker 32, and incoming call is displayed on the sub-display 31. Instead of emitting a beep using the guidance speaker, it is also possible to vibrate the mobile telephone 10.

Continuing on, in step S13, it is determined whether or not the state 1a is transited from the state 2 by opening up the second section 12 with respect to the first section 11. While this determination is negative processing of step S13 is repeated. Then, once determination in step S13 is affirmative, the processing transfers to step S14.

In step S14, incoming call display is performed, including display to the main display 28. As a result, as well as display to the main display 28, incoming call display is performed by emitting a beep from the guidance speaker 32, etc.

Next, in step S15, it is determined whether or not a call instructed as a result of the user pressing down the transmission key. While this determination is negative, processing of step S15 is repeated. Then, once determination in step S15 is affirmative, the processing transfers to step S16.

In step S16, a call processing is carried out and a call between the user and another party is established. In this step S16, in parallel with the call processing, it is determined whether or not a call termination is instructed as a result of the user pressing down the end call key. While this determination is negative, processing of step S16 is repeated.

Then, once determination in step S16 is affirmative, the call processing is stopped. Then, the the mobile telephone 10 is in the communication mode of the state 1a, as the same as before the call.

Next, processing for when a call is received during camera mode operation of the above described state 1b will be described with reference to FIG. 10. In this case, first of all in step S21, incoming call display is performed, including display to the main display 28. As a result, as well as display to the main display 28, incoming call display is performed by emitting a beep from the guidance speaker 32, etc.

Continuing on, in step S22, it is determined whether or not a call is instructed as a result of the user pressing down the transmission key. If this determination is negative, processing transfers to step S23. In step S23, it is determined whether or not a simple message recording is instructed as a result of the user pressing down the end call/power supply key for a short time. If this determination is negative, processing transfers to step S22. Then, processing of step S22 and step S23 is repeated until an affirmative determination in step S22 or step S23.

If determination in step S22 is affirmative, processing transfers to step S25. In step S25, call processing is carried out and a call between the user and another party is established. In this step S25, in parallel with the call processing, it is determined whether or not a call termination is instructed as a result of the user pressing down the end call key. If this determination is negative, processing of step S25 is repeated.

If determination in step S25 is affirmative with respect to whether or not a call termination is instructed, call processing is stopped. Camera mode processing of the state 1b, the same as before the call, is then started again.

On the other hand if determination in step S23 is affirmative, processing transfers to step S24. In this step S24, simple message recording processing to perform answer phone recording and display representing that there is a message recorded for recording completion (for example, display of a pictogram representing that there is a message recorded) is carried out. If this simple message recording processing is completed, camera mode processing of the state 1b, the same as before the call, is then started again.

Next, processing for when a call is received during camera mode operation of the above described state 3 will be described with reference to FIG. 11A. In this case, first of all, in step S31 incoming call display is performed, including display to the main display 28. As a result, as well as display to the main display 28, incoming call display is performed by emitting a beep from the guidance speaker 32, etc.

Figure 12:
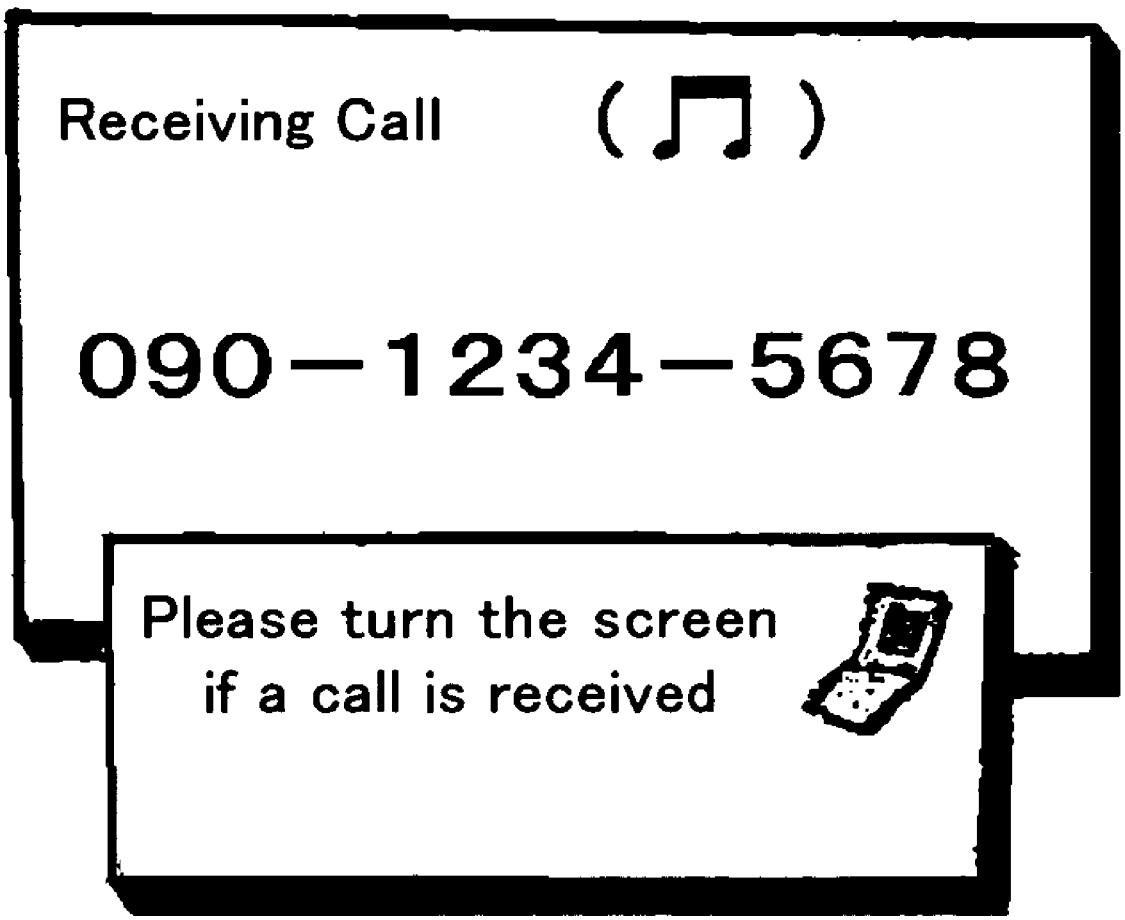
FIG. 12 is a drawing showing a display example at the time of call receipt of the state 3 camera mode of the first embodiment of the present invention.

Continuing on, in step S32, in addition to the above described incoming call display, guidance for the call processing is displayed on the main display 28. This guidance display, as shown in FIG. 12, shows the necessity of rotation of the display section for picking up the call together with the other party telephone number. It is also possible to display guidance to press down the end call/power supply key for a short time in order to carry out simple message recording. This guidance display is displayed transparently on the viewfinder image using the full range of the display screen of the main display 28.

Next, in step S33, it is determined whether it is the state 1a where the display section 16 has rotated by 180 degrees with respect to the base section 15 by the user, that is, whether or not the user is making a call. If this determination is negative, processing transfers to step S34. In step S34, it is determined whether or not a simple message recording is instructed as a result of the user pressing down the end call/power supply key for a short time. If this determination is negative processing transfers to step S33. Then, processing of step S33 and step S34 is repeated until an affirmative determination in step S33 or step S34.

If determination in step S33 is affirmative, processing transfers to step S36. Step S36 will be described as call processing of the state 1a, with reference to FIG. 11B. In step S71 in FIG. 11B, it is determined whether or not a simple message recording is instructed as a result of the user pressing down the end call/power supply key for a short time. If this determination is negative, processing transfers to step S72.

In step S72, it is determined whether or not a call is instructed as a result of the user pressing down the transmission key etc. If this determination is negative, processing returns to step S71, and the processing of step S71 and step S72 is repeated. If the determination of step S72 is affirmative, processing transfers to step S73, call processing is carried out and a call is established between the user and another party. Here, similarly to step S25, it is determined in step S74 whether or not a call termination instruction is issued.

When the determination here is negative, call processing continues, and the processing of step S73 and step S74 is repeated. If determination in step S74 is affirmative, call processing is stopped and S36, being the call processing of the state 1a, is completed. On the other hand, if the determination at step S71 is affirmative, simple message recording processing similar to that of the above described step S24 is carried out. If the simple message recording processing is completed, S36, being the incoming processing of the state 1a, is completed.

If the state 1a incoming processing of step S36 is completed, returning to FIG. 11A, the situation is the communication mode of the state 1a. On the other hand if determination in step S34 is affirmative, the processing transfers to step S35. In this step S35, simple message recording processing similar to that of the above described step S24 is carried out. If this simple message recording processing is completed, camera mode processing of the state 3, the same as before the call, is then started again.

Next, processing for when a call is received during camera mode operation of the above described state 4 will be described with reference to FIG. 13. In this case, first of all, in step S41, incoming call display is performed, including display to the main display 28. As a result, as well as display to the main display 28, incoming call display is performed by emitting a beep from the guidance speaker 32, etc.

Figure 14:
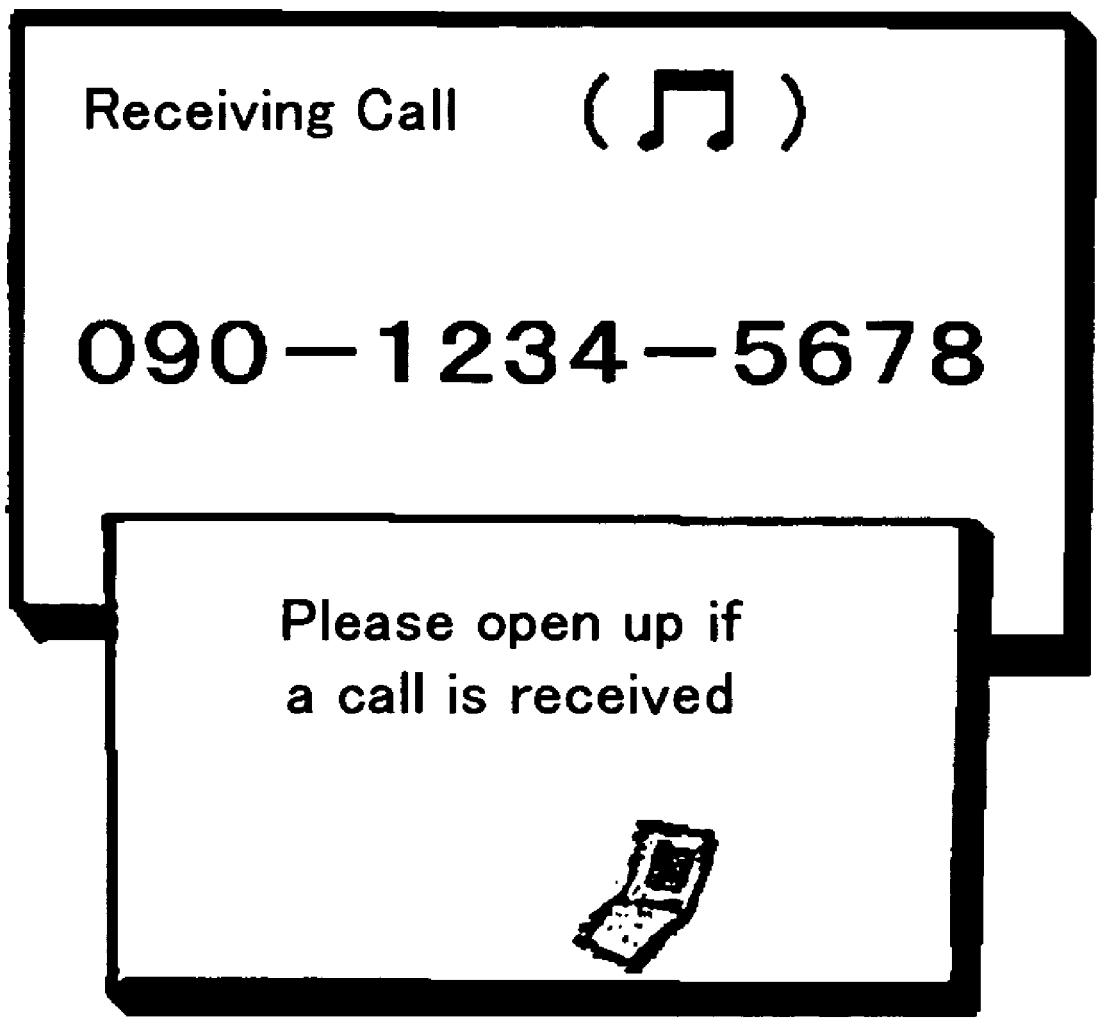
FIG. 14 is a drawing showing a display example at the time of call receipt of the state 4 camera mode of the first embodiment of the present invention.

Continuing on, in step S42, in addition to the above described incoming call display, first stage guidance for the call processing is displayed on the main display 28. This first stage guidance display, as shown in FIG. 14, shows the necessity of opening up the mobile telephone to pick up the call together with the other party telephone number. This guidance display is displayed transparently on the viewfinder image which uses the full range of the display screen of the main display 28.

Next, in step S43, it is determined whether the state has changed to the state 3 by opening up the mobile telephone. While this determination is negative, processing of step S43 is repeated. Then, once determination in step S43 is affirmative, the processing transfers to step S44.

Continuing on, in step S44, in addition to the above described incoming call display, second stage guidance for the call processing is displayed on the main display 28. This second stage guidance display, similarly to the above-described step S32, as shown in FIG. 12, shows the necessity of rotation of the display section for picking up the call together with the other party telephone number.

Next, in step S45, it is determined whether it is the state 1*a* where the display section 16 has rotated by 180 degrees with respect to the base section 15 by the user, that is, whether or not the user is making a call. If this determination is negative processing transfers to step S46. In step S46, it is determined whether or not a simple message recording is instructed as a result of the user pressing down the end call/power supply key for a short time. If this determination is negative, processing transfers to step S45. Then, the processing of step S45 and step S46 is repeated until an affirmative determination in step S45 or step S46.

If determination in step S45 is affirmative, processing transfers to step S36. In step 36, being the incoming processing of the state 1*a*, the user selects call processing or simple message recording, and either call processing or simple message recording processing is executed, as described above in FIG. 11B. If this processing is completed step S36 is completed, and the situation is the communication mode of the state 1*a* in FIG. 13.

On the other hand, if determination in step S46 is affirmative, processing transfers to step S47. In this step S47, simple message recording processing similar to that of the above described step S24 or step S35 is carried out. If this simple message recording processing is completed, a transfer to the camera mode of the state 3 is achieved.

Next, a description will be given of processing related to incoming email started by email receipt processing of each state.

Figure 15:
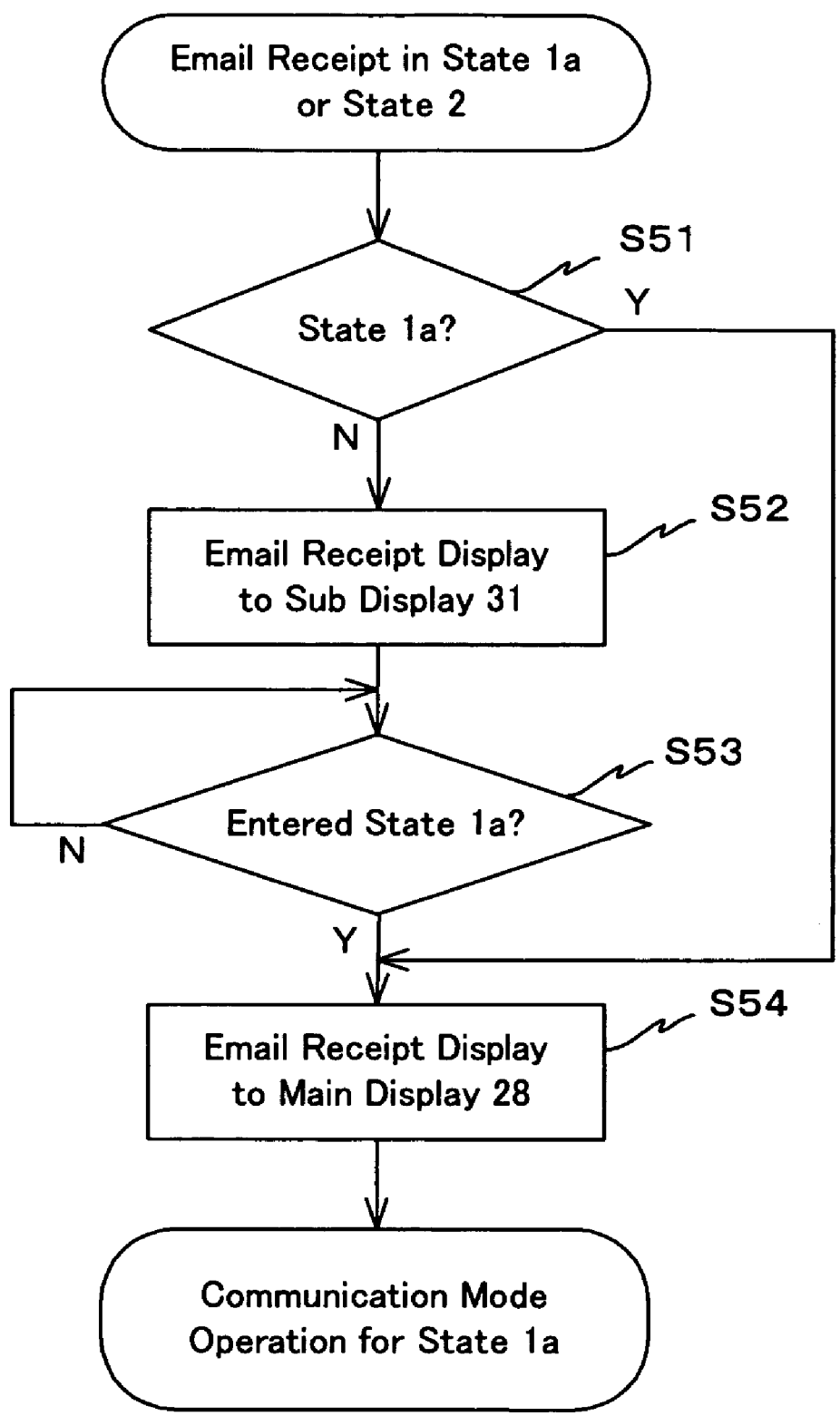
FIG. 15 is a flowchart for describing processing for email receipt for communication mode, which is a non-camera mode, of the first embodiment of the present invention.

Processing for when email is received during communication mode operation of the above described state 1*a* or state 2 will be described with reference to FIG. 15. First of all, in step S51, it is determined whether or not the current state is the state 1*a*. If this determination is affirmative, processing transfers to step S54.

On the other hand, if the current state is the state 2, and the determination of step S51 is negative, processing transfers to step S52. In this step S52, received email display is performed to the sub-display 31.

Continuing on, in step S53, it is determined whether or not the state has changed from the state 2 to the state 1*a* by opening up the second section 12 with respect to the first section 11. While this determination is negative, processing of step S53 is repeated. Then, once determination in step S53 is affirmative, the processing transfers to step S54.

In step S54, the main display 28 displays a received email display. It is possible to display received email as a result of operation of the communication operation section by the user while looking at the main display 28 which displays the received email display in the state 1*a*.

Figure 16:
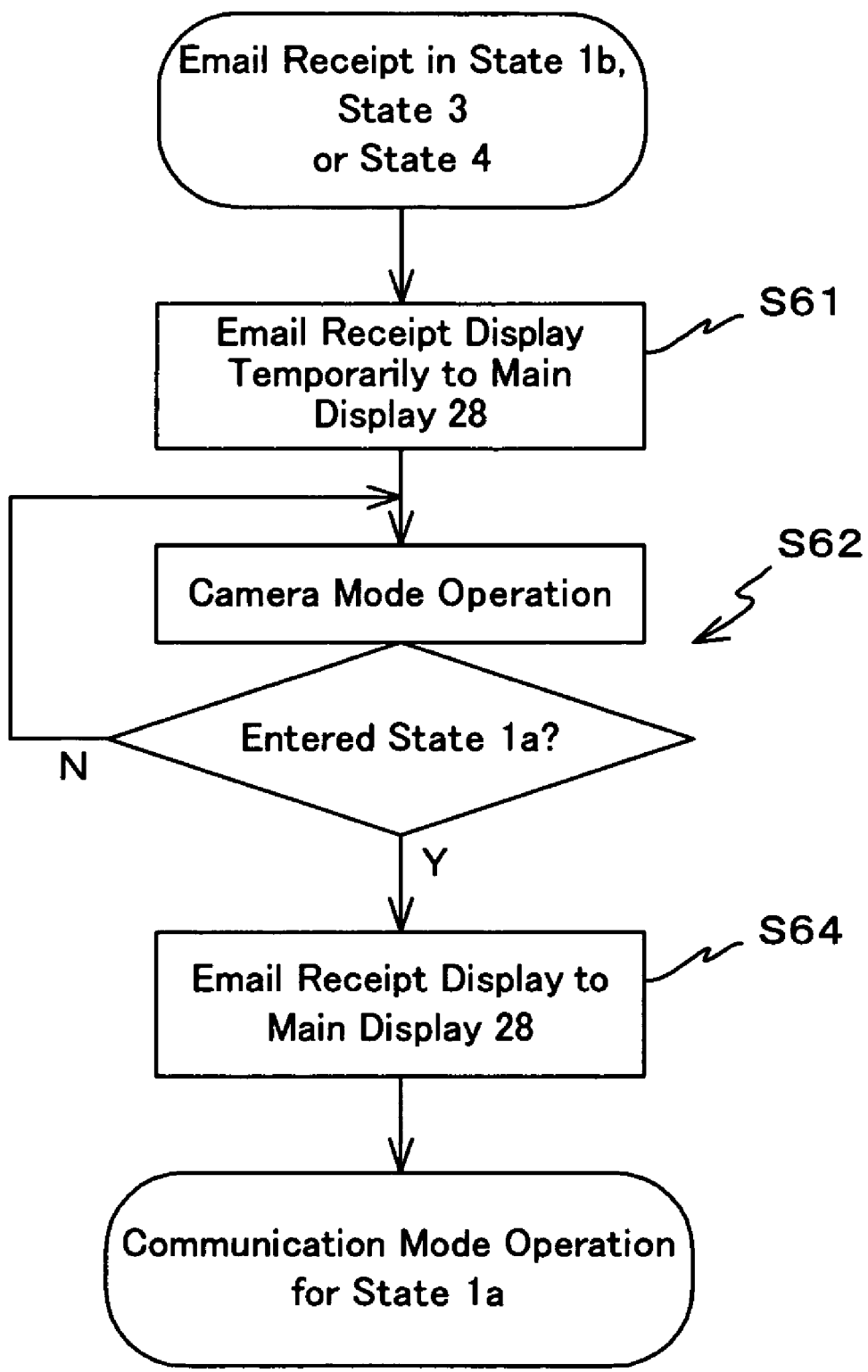
FIG. 16 is a flowchart for describing processing for email receipt for camera mode of the first embodiment of the present invention.

Processing for when email is received during camera mode operation of the above described state 1*a*, state 3 or state 4 will be described. In this case, as shown in FIG. 16, first of all in step S61 email receipt display to the main display 28 is carried out temporarily to notify the user that email has been received. This email receipt display is displayed transparently on the viewfinder image using the full range of the display screen of the main display 28.

When this temporary email receipt display to the main display 28 is completed, in step S62 processing appropriate to each state is restarted. In this step S62, in parallel with processing for each state, it is determined whether or not the state has changed to the state 1*a*. While this determination is negative, processing of step S62 is repeated. Then, processing of step 62 is repeated until an affirmative determination relating to a transition to the state 1*a* in step S62. If the state has changed to a different state (except the state 1*a*) while the processing of step S62 is being repeated, the operation mode after the change is carried out in step S62.

Then, if the state of the operation mode becomes the state 1*a* and the determination, relating to a transition to the state 1*a* in step S62, is affirmative, the processing transfers to step S64. In this step S64, the received email display is performed to the main display 28, similar to the case of step S54 described above. It is possible to display received email or to obtain received email from a mail server as a result of operation of the communication operation section by the user while looking at the main display 28 which displays the received email display in the state 1*a*. Then, in accordance with operation of the communication operation section 21 by the user while looking at the main display 28, received email display or acquisition of received email from a mail server are carried out.

As has been described above, with the first embodiment, with a combination of two states respectively relating to two types of rotation, one being rotation of the second section 12 about the axis AX1 with respect to the first section 11 and the another being rotation of the display section 16 about the second axis AX2 with respect to the base section 15 of the second section 12, as well as realizing four structural states, it is possible to detect these four structural states. In these respective four states, while considering transition between states, as operating modes it is essentially possible to automatically allocate a communication mode and a camera mode, or appropriately change the operating mode as required, which makes it possible to keep the operation mode setting to be performed by a user to a minimum.

Also, in the above described state 2, optical components are not arranged on a surface opposite to the display surface of the display section 16, nor on the surface of the base section 15 on the same side as this surface. Therefore, when the mobile telephone 10 is placed on a desk and the aforementioned surfaces come into contact with the desk surface, it is possible to prevent attachment of dirt or dust to parts for the optical system or for display, or protective parts for these components, due to contact with the desk surface.

Also, all operation keys for communication are arranged on the communication section 21 of the first section 11. Therefore, since operation keys are not arranged divided across the first section 11 and the second section 12, as with a revolving type device, it is possible to maintain the operability at the time of communication operations for a normal portable communication terminal of the related art.

Also the first section 11 and the second section 12 can be folded, as a so-called clamshell type device. Therefore, since it is possible to realize the above described state 2 where the main display 28 does not constitute the outer surface, it is possible to ensure confidential information, such as information relating to communication and a wallpaper design set according to the individual taste of a user, which is personal information, to the same degree as the case of a normal mobile telephone of the related art.

Also, even when camera mode is set as the operating mode, when an incoming call or received email is detected, the event is notified to the user, which means that the user can immediately take appropriate action for the event.

Also, when camera mode is set as the operating mode, it is possible to use the entire display surface of the main display 28 of the display section as a viewfinder, and in addition the viewfinder display image is not significantly impaired, and it is possible to display guidance it is desired to convey to the user on the main display 28.

Also, the second section 12 is connected to the first section 11 in at at least two places on both outer sides along the first axis AX1 of the first section 11, which means that a section of second section 12 for connection to the first section 11 can be made of sufficient width in the first axis AX1 direction, and it is possible to maintain sufficient strength of the second section 12.

Also, by storing the camera optical system in a projecting section of the first section 11 it is possible to provide higher performance camera functions.

With the above described first embodiment, in processing related to incoming calls in the state 3 (or state 4), if the state 1a is determined in step S33 of FIG. 1A (or FIG. 13) processing transfers to the call processing of step S36 after the transmission key etc. has been pressed to generate a call instruction. It is also possible to transfer processing directly to call processing after the state 1a has been determined.

Figure 10:
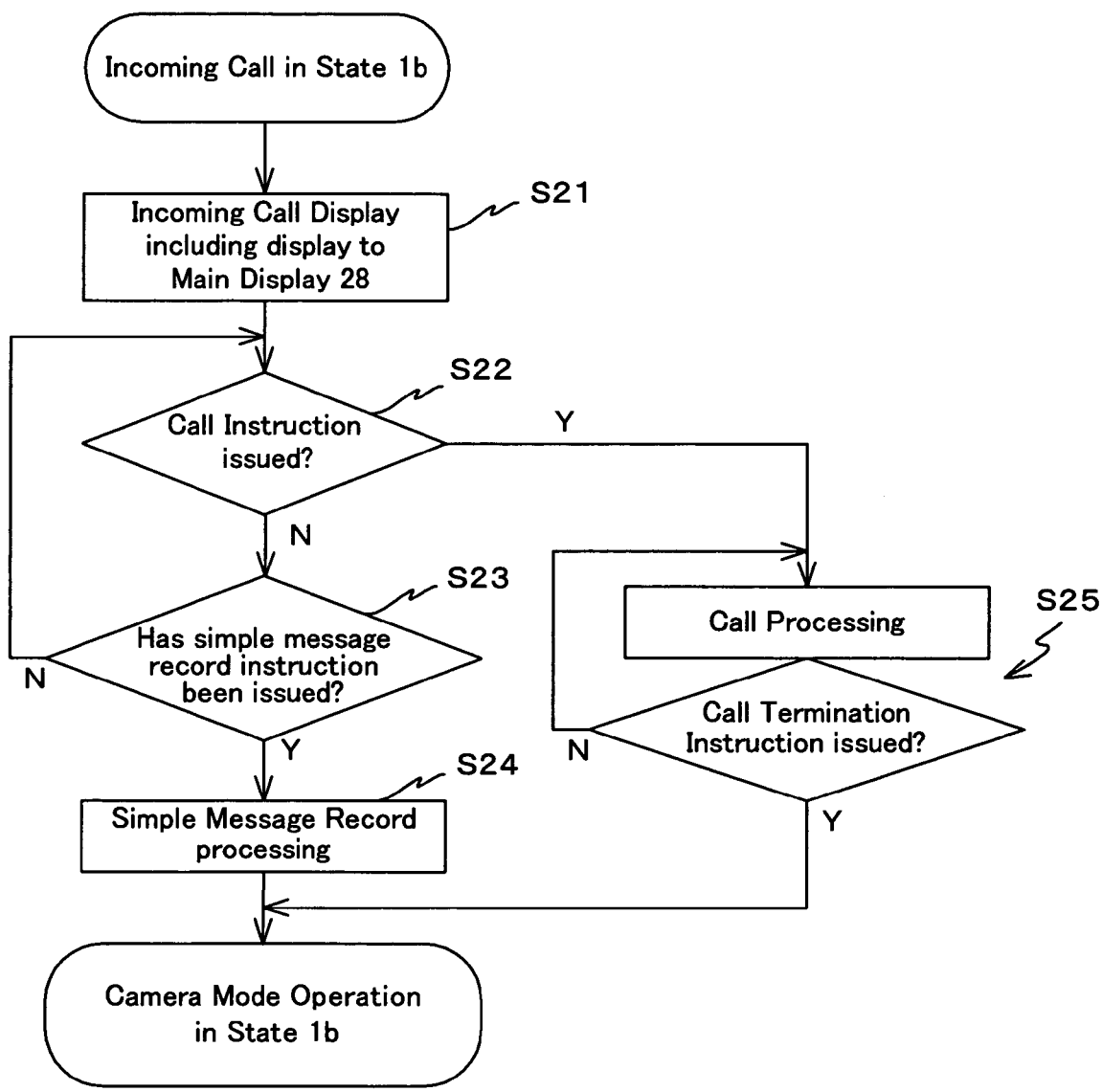
FIG. 10 is a flowchart for describing processing for call receipt of the state 1 camera mode of the first embodiment of the present invention.
Figure 11A:
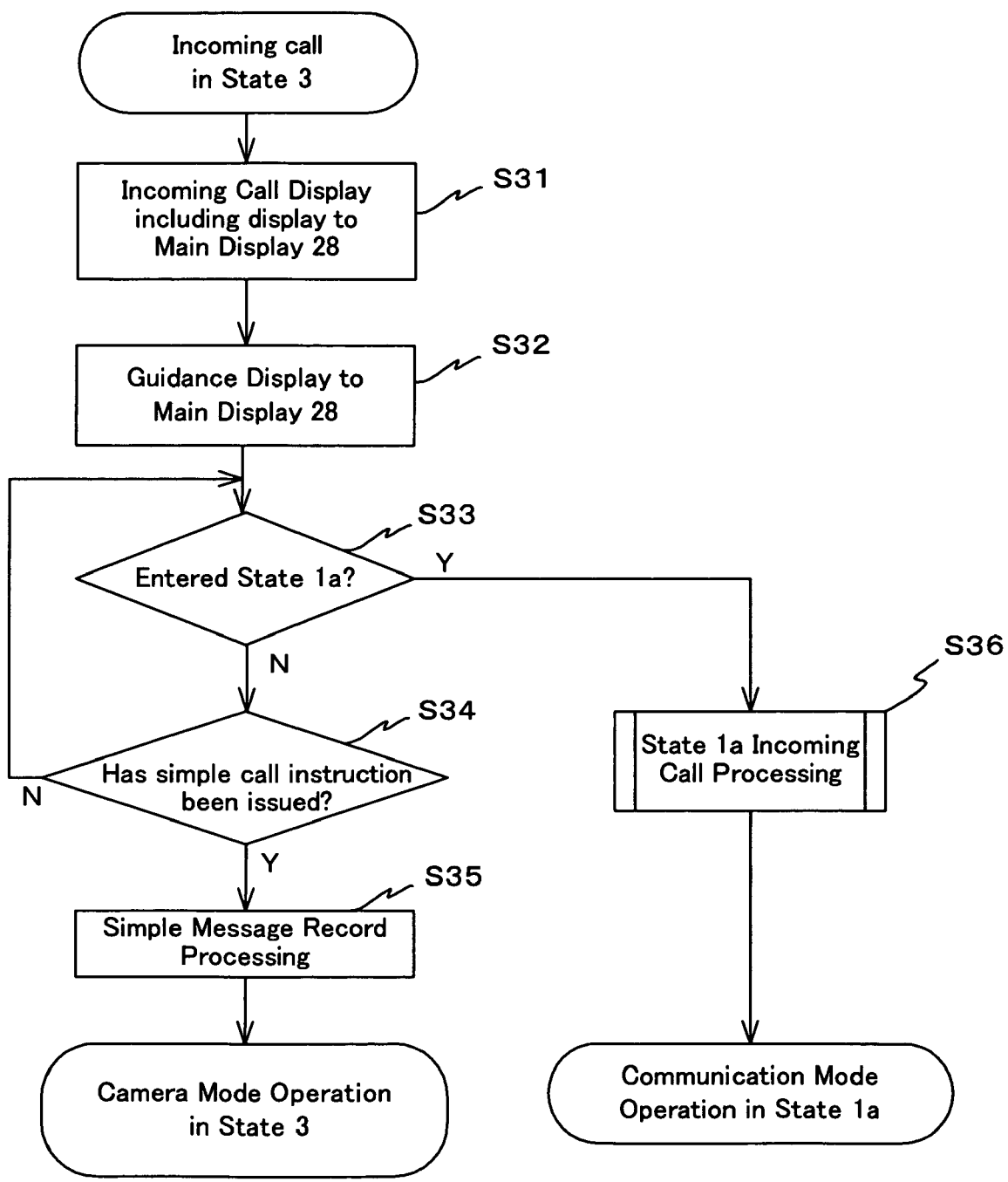
FIG. 11A is a flowchart for describing processing for call receipt of the state 3 camera mode of the first embodiment of the present invention.
Figure 13:
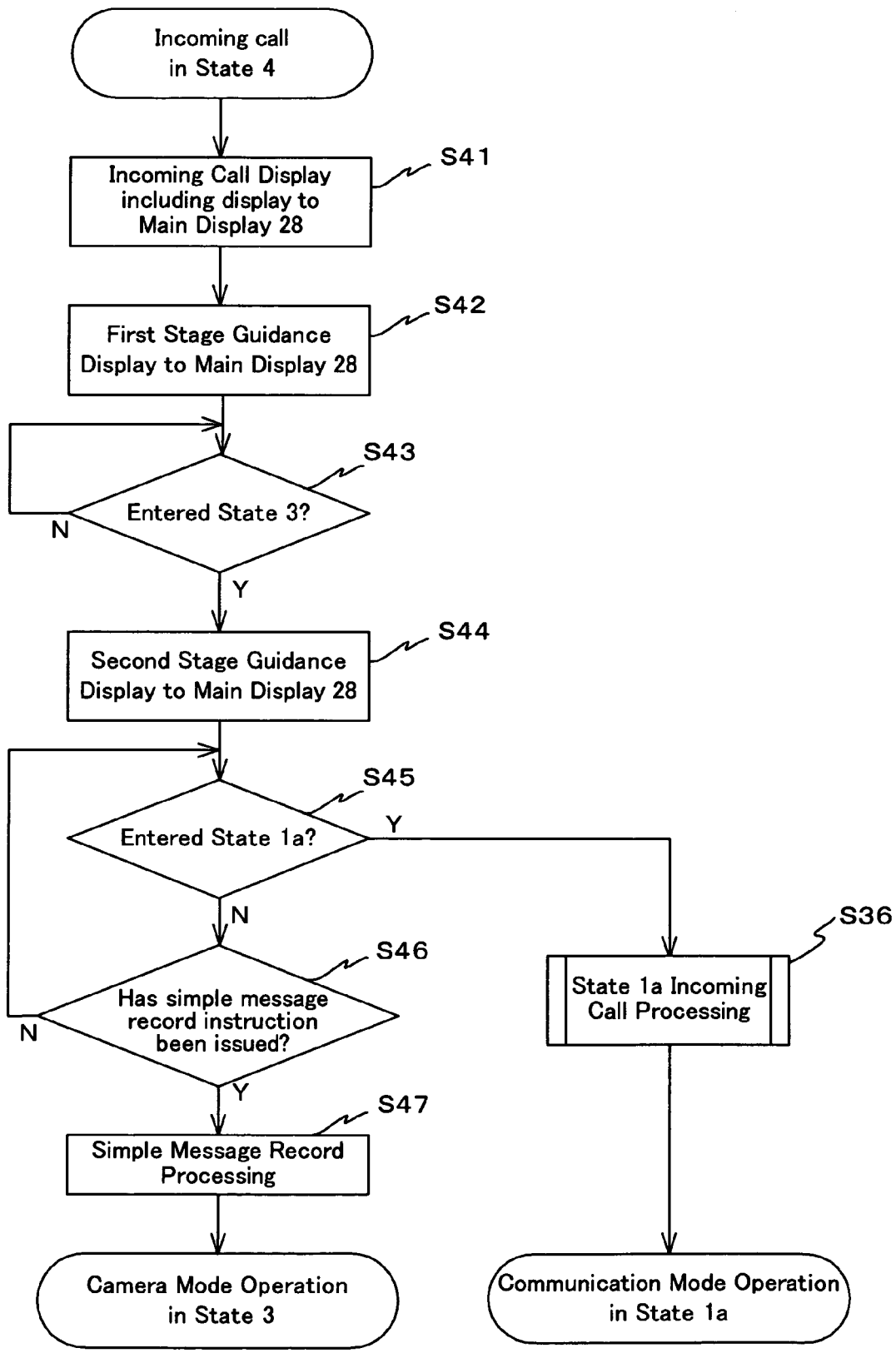
FIG. 13 is a flowchart for describing processing for call receipt of the state 4 camera mode of the first embodiment of the present invention.

Also with the above described first embodiment, in processing related to incoming calls in the state 1b (or state 3 or state 4), a message recording processing is supposed to be instructed when the terminate call/power supply key is pressed in step S23 (or step S34 or step S46) of FIG. 10 (or FIG. 11A or FIG. 13). It is also possible to instruct for message recording processing if any operation key of the communication operation section 21 is pressed down.

Also with above described first embodiment, when a call arrives in the state 4, simple message recording processing S47 is carried out after changing the state to the state 3, but it is also possible to carry out simple message recording by operating a specified key of the camera operation section etc. staying in the structural state 4.

Figure 11B:
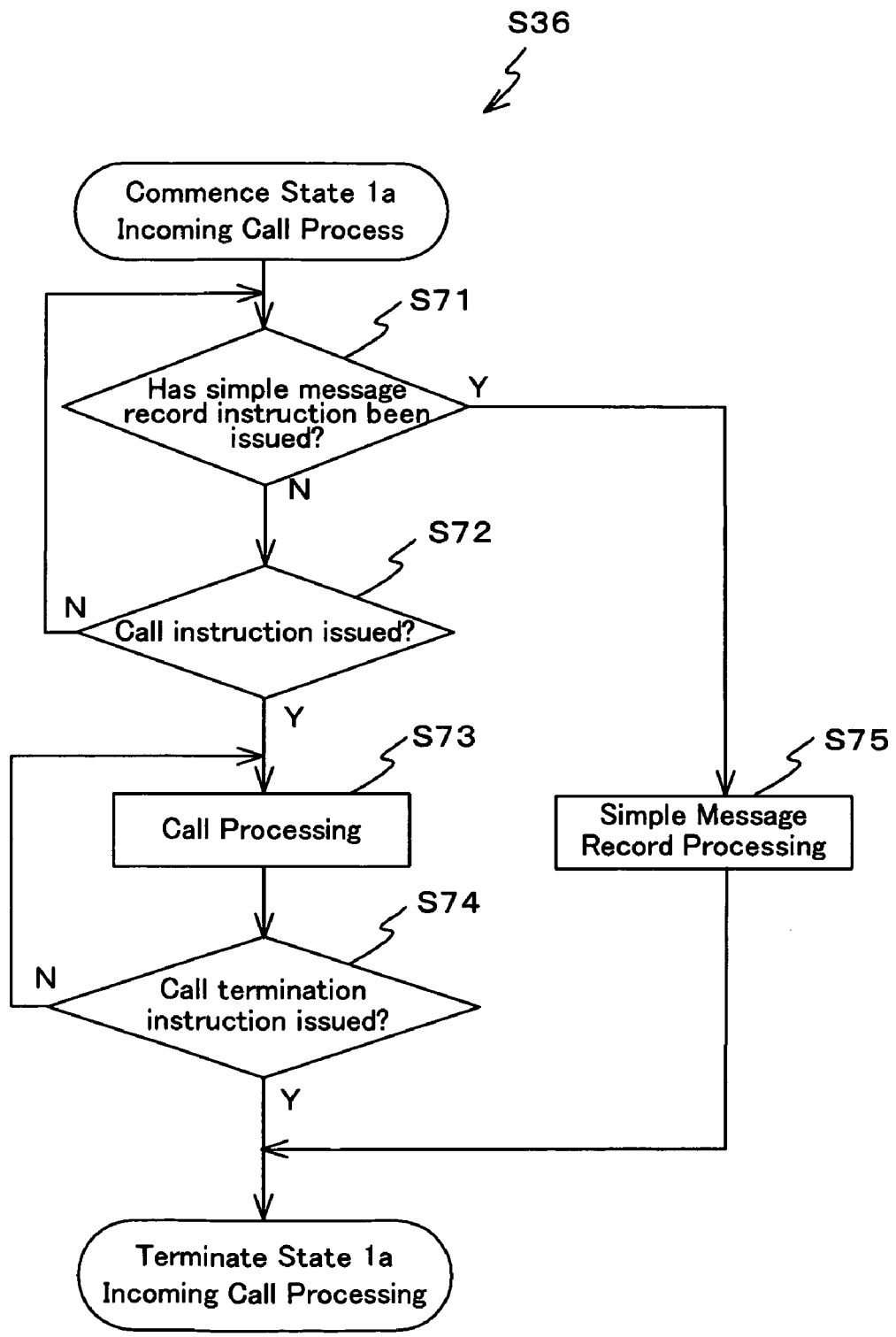
FIG. 11B is a flowchart for describing processing for call receipt of the state 1 communication mode of the first embodiment of the present invention.
Figure 17A:
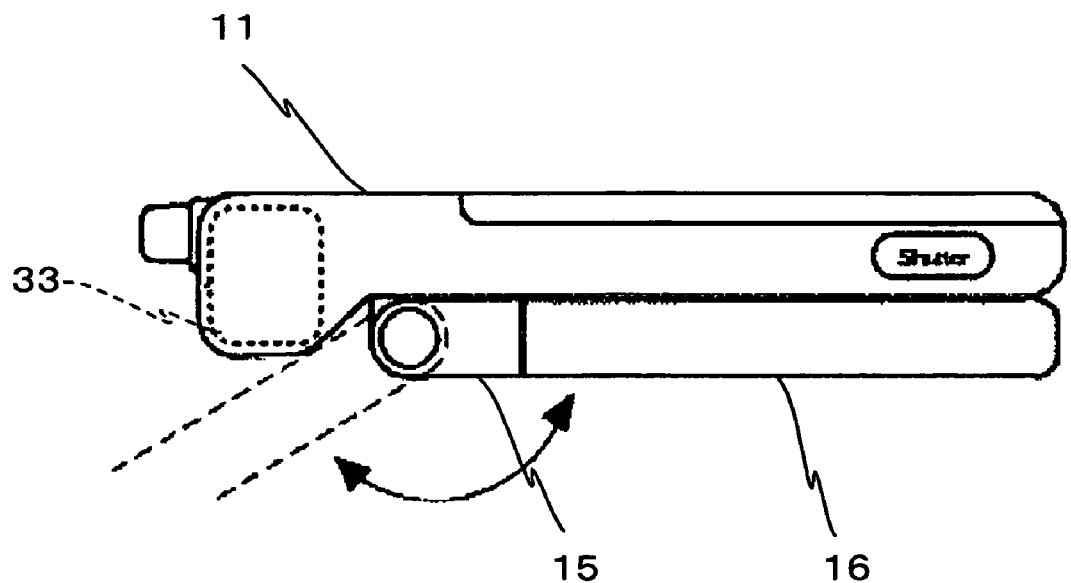
FIG. 17A and FIG. 17B are drawings showing a first modified example of position of a projection section of a first section.
Figure 17B:
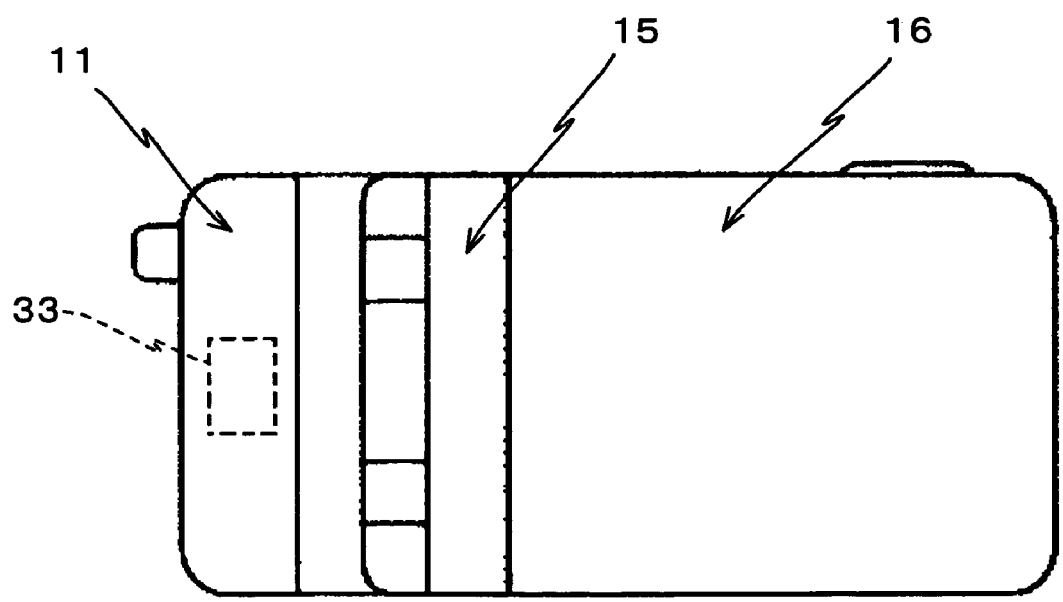
Figure 18A:
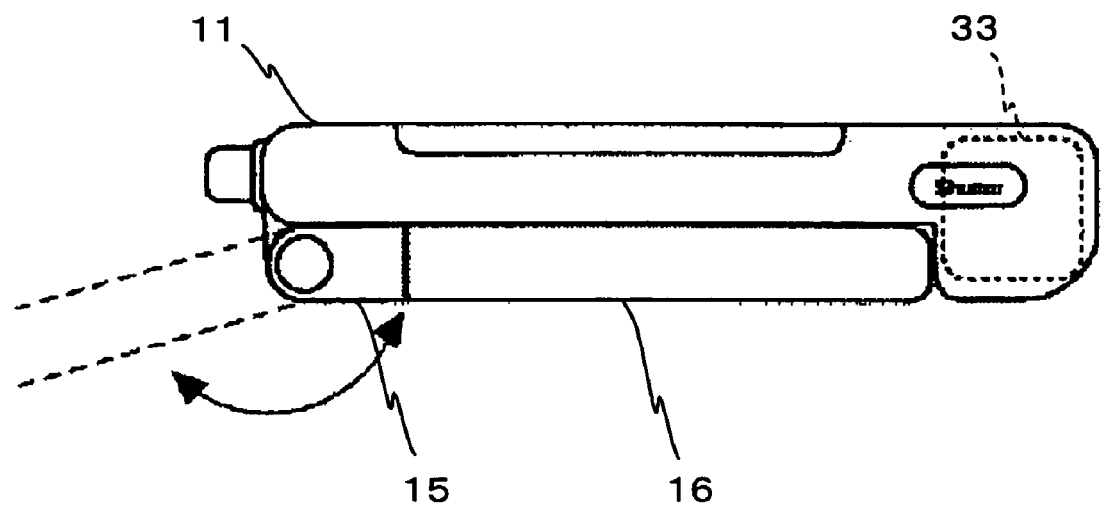
FIG. 18A and FIG. 18B are drawings showing a second modified example of a position of a projection section of a first section.
Figure 18B:
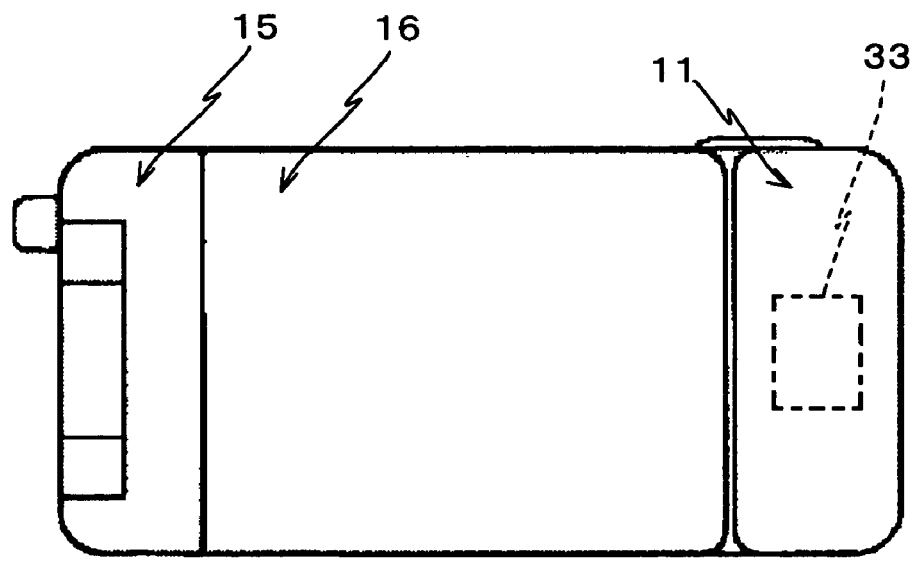

Also, with the above described first embodiment, a projection section is provided in a part of the first section 11 that connects to the second section 12, but the projection section can also be provided in a part that does not overlap when the mobile telephone is folded up. For example, on the base section 15 side of the second section in the first section 11 as shown in FIG. 17A and FIG. 17B, or on the display section 16 side of the second section in the first section 11 as shown in FIG. 11A and FIG. 11B.

Figure 19:
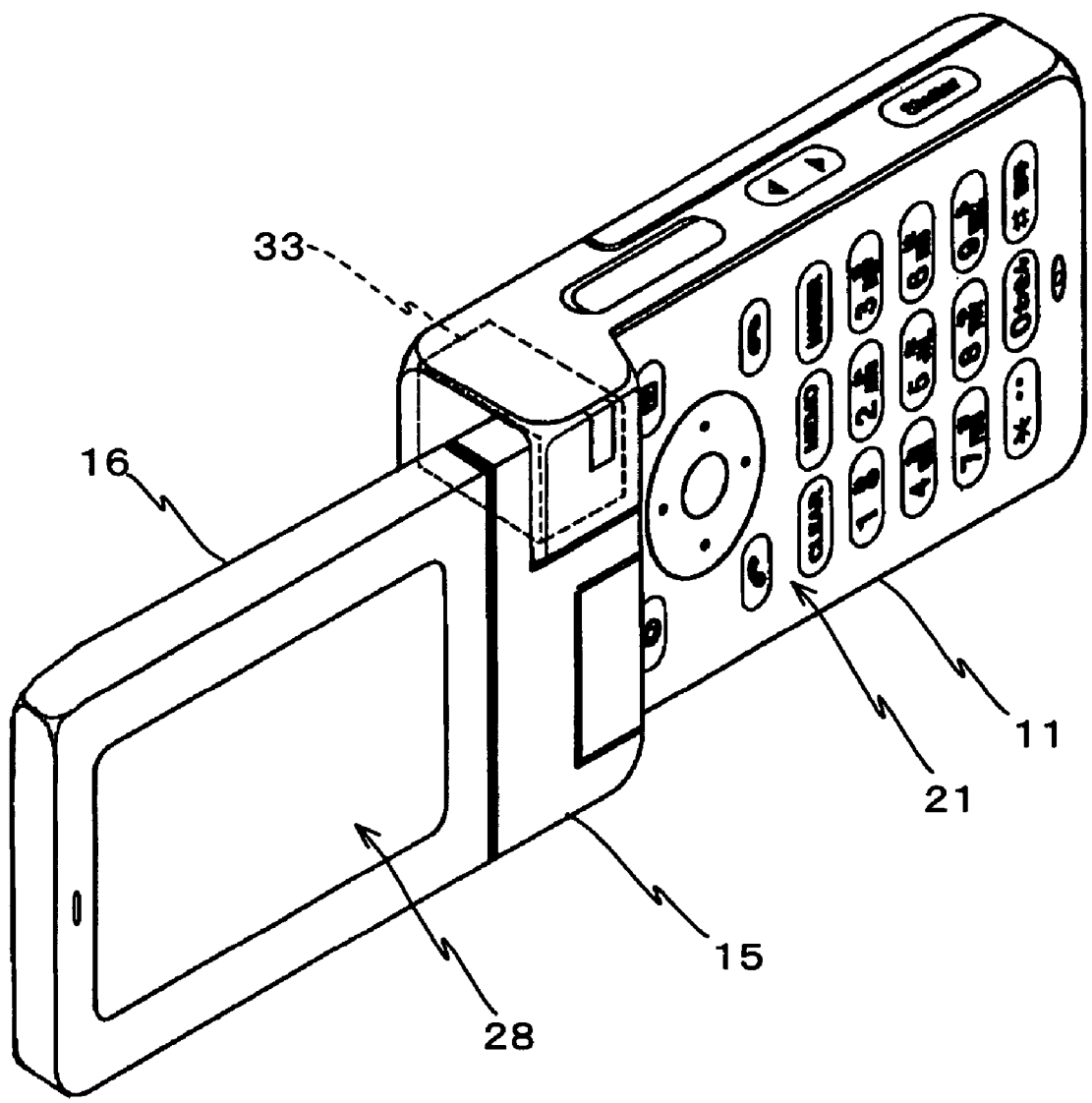
FIG. 19 is a drawing showing a third modified example of position of a projection section of a first section.

Also with the above described first embodiment, an imaging section 33 is housed in a central part of the projecting section of the first section 11, but it is also possible to house a camera optical system in an end section of the projecting section, as shown in FIG. 19.

Figure 20A:
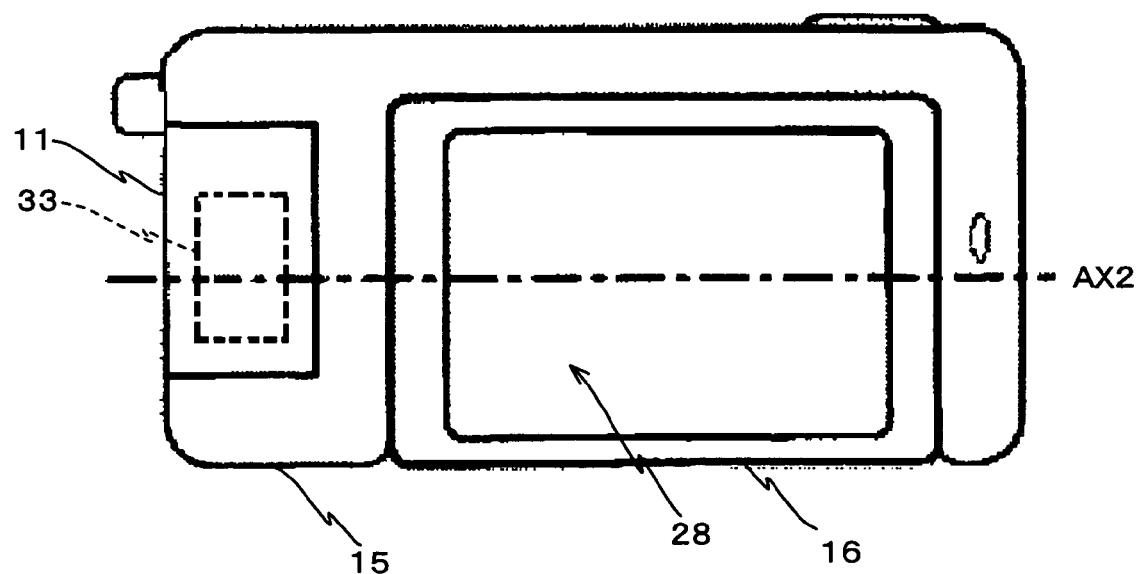
FIG. 20A and FIG. 20B are drawings showing a first modified example of a state 4 when a second axis is perpendicular to a first axis.
Figure 20B:
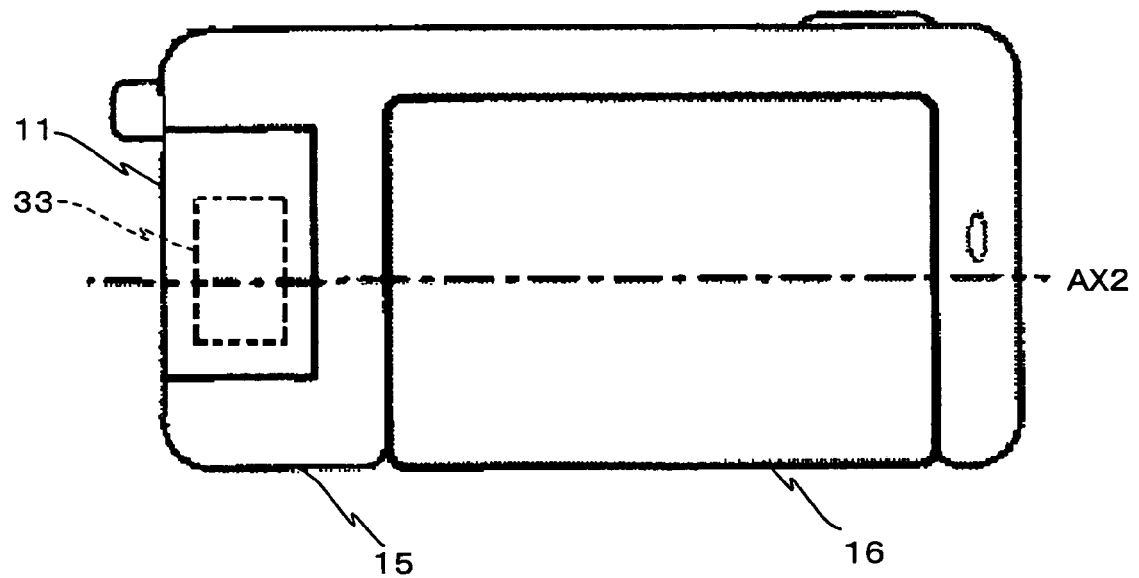
Figure 21A:
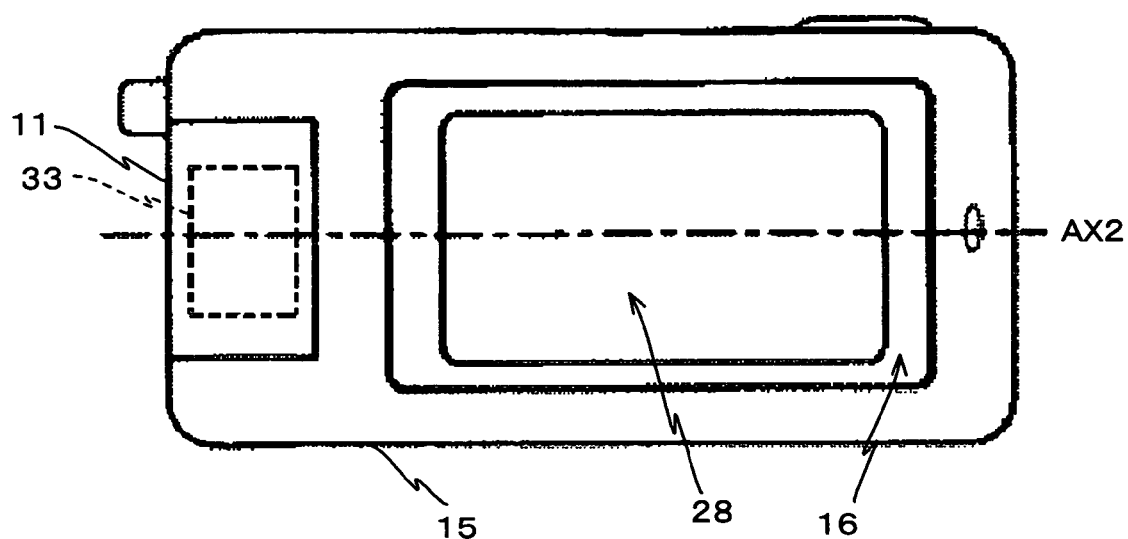
FIG. 21A and FIG. 21B are drawings showing a second modified example of a state 4 when a second axis is perpendicular to a first axis.
Figure 21B:
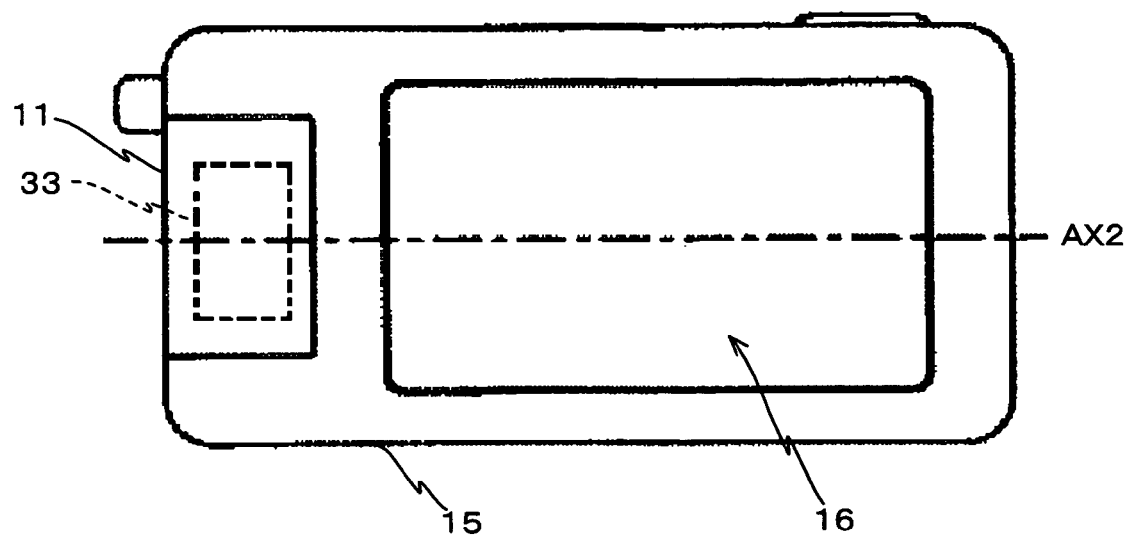

Also, with the above described first embodiment, there is one point of connection between the base section 15 and the display section 16 on the axis AX2, but it is also possible, as shown in FIGS. 20A and 20B, to make the shape of the base section 15 so as to surround part of the display section 16, so as to surround the whole of the display section 16, as shown in FIGS. 21A and 21B, or to have a structure where the base section 15 and the display section 16 are connected at two points on the axis AX2.

Figure 22A:
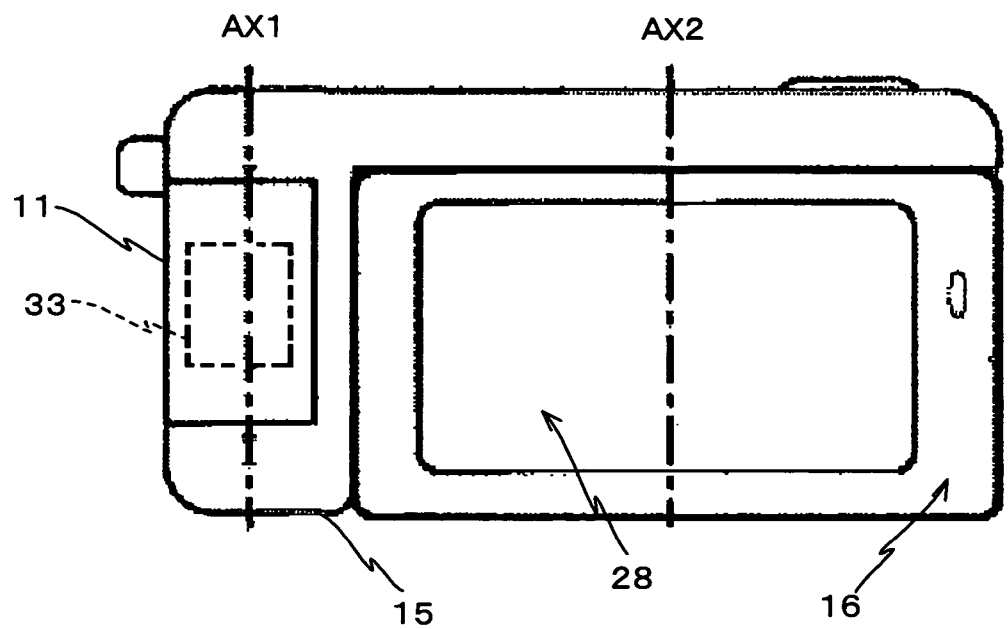
FIG. 22A and FIG. 22B are drawings showing a first modified example of a state 4 when a second axis is parallel to a first axis.
Figure 22B:
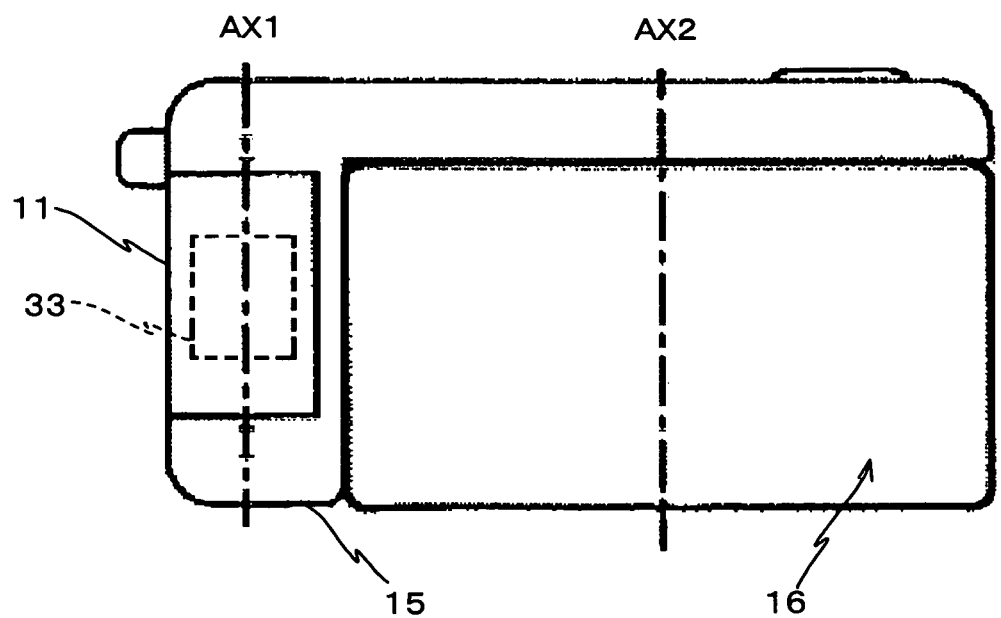
Figure 23A:
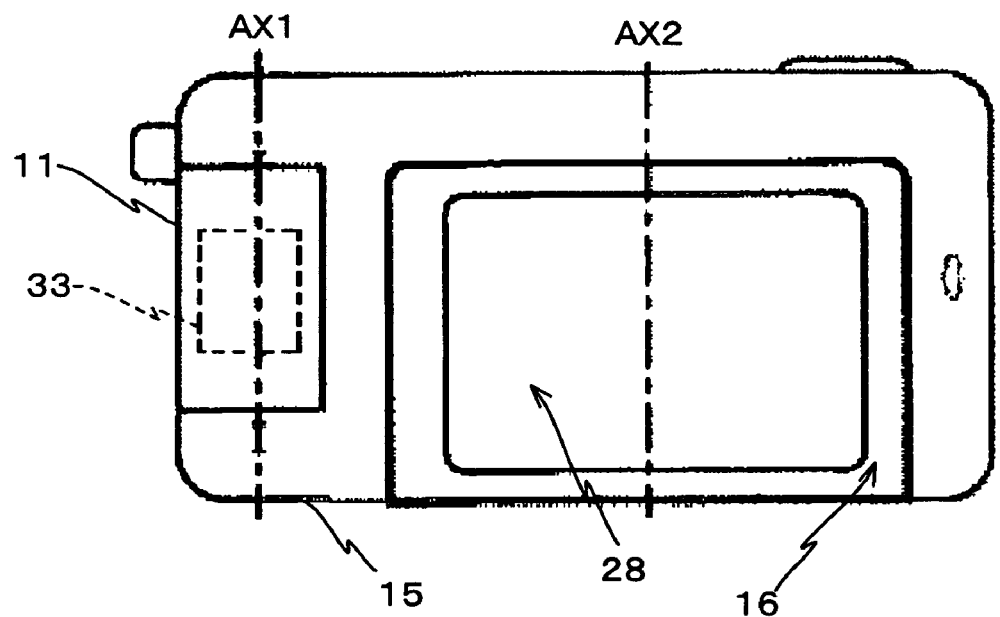
FIG. 23A and FIG. 23B are drawings showing a second modified example of a state 4 when a second axis is parallel to a first axis.
Figure 23B:
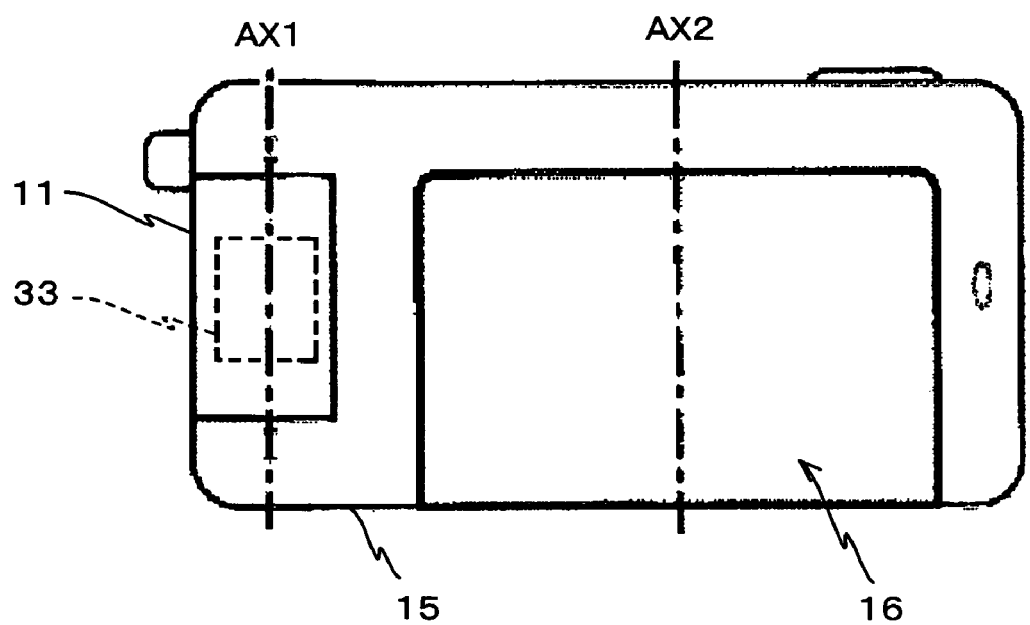
Figure 24A:
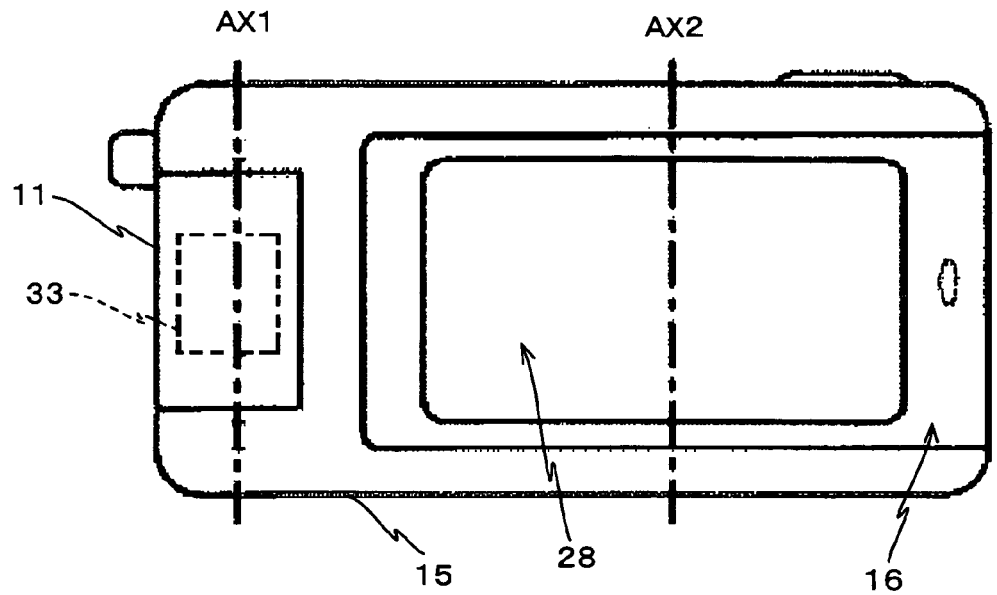
FIG. 24A and FIG. 24B are drawings showing a third modified example of a state 4 when a second axis is parallel to a first axis.
Figure 24B:
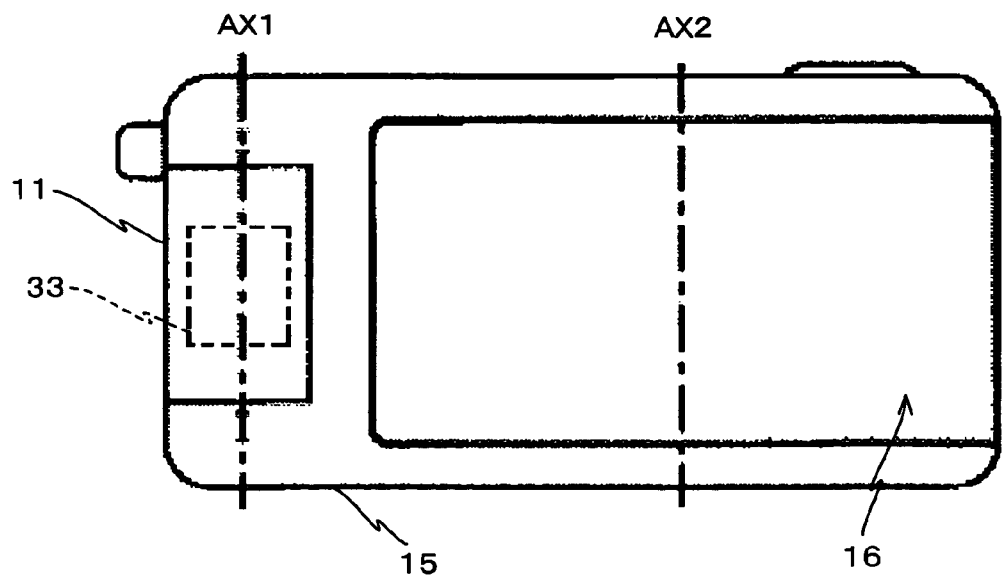
Figure 25A:
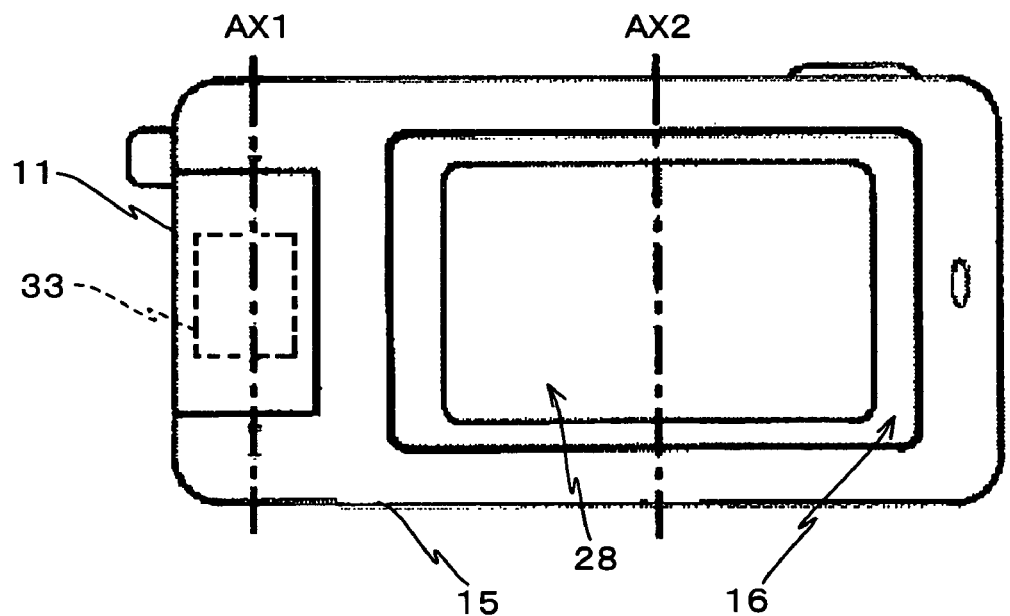
FIG. 25A and FIG. 25B are drawings showing a fourth modified example of a state 4 when a second axis is parallel to a first axis.
Figure 25B:
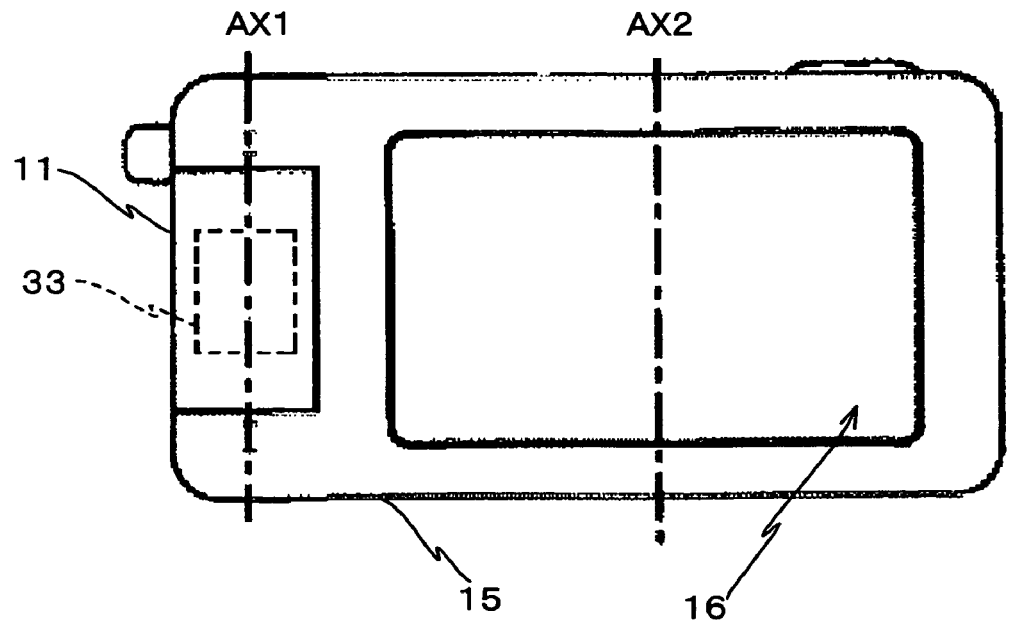

Also, with the above-described first embodiment, the axis AX2 is orthogonal to the axis AX1, but it is also possible for the axis AX2 to be parallel to the axis AX1. For example, with a structure where there is one point of contact between the base section 15 and the display section 16, it is possible to make the base section 15 in an L-shape, as shown in FIGS. 22A and 22B, or to shape the base section 15 so as to surround the display section 16 as shown in FIG. 23A and FIG. 23B. Also, with a structure where the are two points of contact between the base section 15 and the display section 16, it is possible to shape the base section 15 so as to surround part of the display section 16, as shown in FIGS. 24A and 24B, or to shape the base section 15 so as to surround the entire display section 16 as shown in FIG. 25A and FIG. 25B.

With the above described first embodiment, the optical axis of the camera optical system is parallel to the operation surface, but it is possible to be orthogonal to the operation surface, as shown in FIG. 26A and FIG. 26B. Also, with the above-described first embodiment, the second section 12 is connected in a rotatable manner to the first section 11 at two places of the first section 11 on both sides along the axis AX1, but it is also possible to provide a connection location at other than the two sides.

With the above-described first embodiment, the present invention has been applied to a mobile telephone, but naturally it is also possible to apply the present invention to a mobile communication terminal other than a mobile telephone.

Second Embodiment

The following is a description with reference to FIG. 27A to FIG. 38 of a second embodiment of the present invention.

Here elements that are the same as in the first embodiment have the same reference numerals assigned and duplicate description is omitted.

Figure 28:
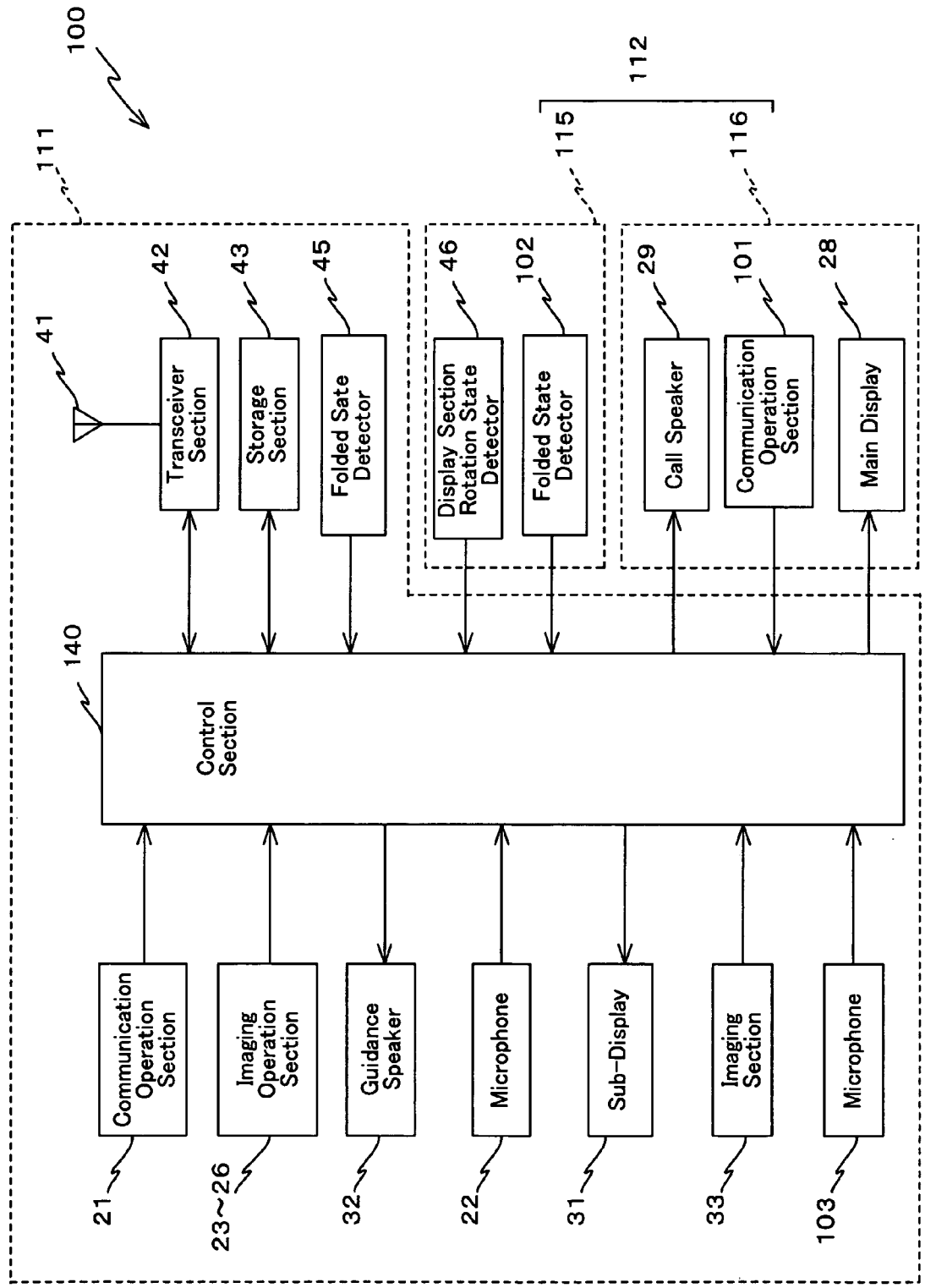
FIG. 28 is a functional block diagram of a mobile telephone of the second embodiment of the present invention.
Figure 30A:
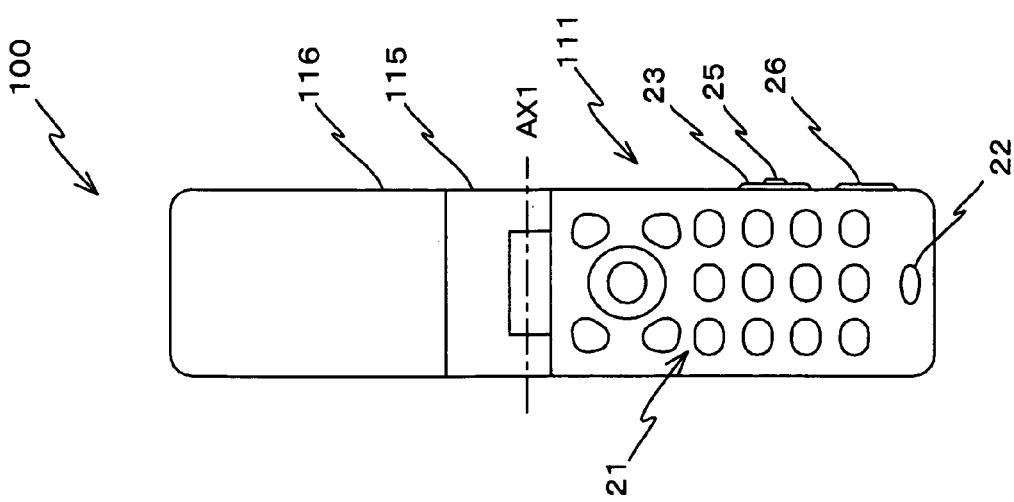
FIG. 30A-FIG. 30C are drawings schematically showing the external structure of a state 3 of a mobile telephone of the second embodiment of the present invention.
Figure 30B:
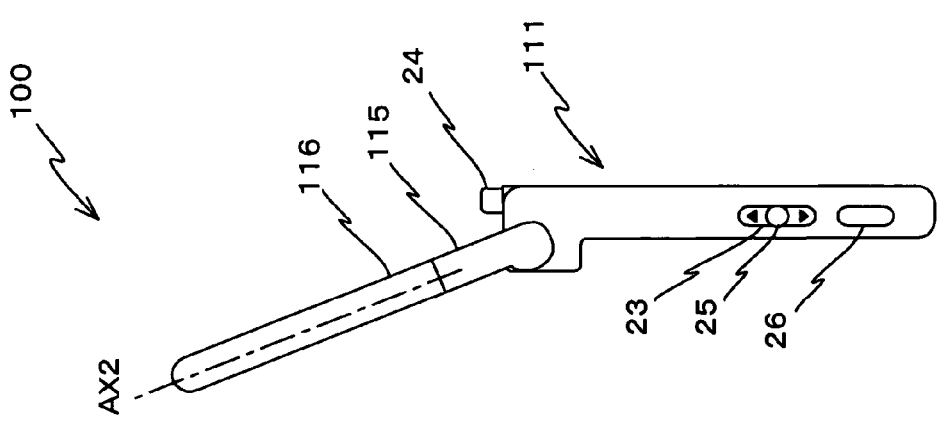
Figure 30C:
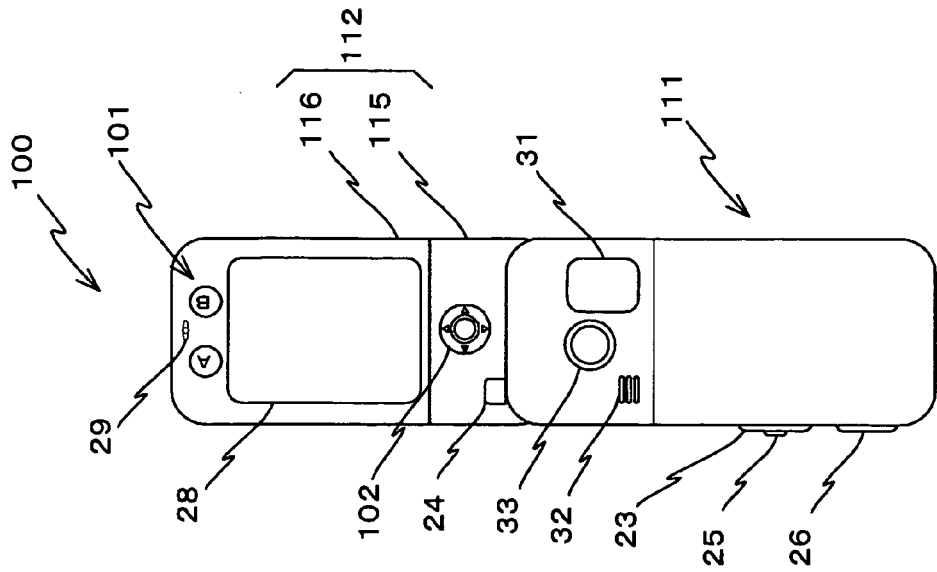

FIG. 27A-FIG. 28 schematically show the structure of a mobile telephone 100, being a mobile communication terminal of the second embodiment. FIG. 27A-FIG. 27C show the external structure of a structural state 1, with an external front view of the mobile telephone 100 being shown in FIG. 27A, a right side view being shown in FIG. 27B, and a rear view being shown in FIG. 27C. Also, a functional block diagram of the mobile telephone 100 is shown in FIG. 28.

Similarly to the case of the mobile telephone 10 of the first embodiment, the mobile telephone 100 is provided with a first section 111, and a second section 112 capable of rotating with respect to the first section 111 with axis AX1, as a rotational axis. Also, the second section 112 is connected in a rotatable manner to the first section 111 at two places of the first section 111 on both sides along the axis AX1. The second section 112 has a base section 115 arranged at the first section 111 side, and a display section 116 capable of rotating with respect to the base section 115 on an axis AX2 as a rotational axis. It is therefore possible to have transition between a structural state 1 similar to that of the first embodiment, a state 2 shown in FIG. 29A-FIG. 29C, a state 3 shown in FIG. 30A-FIG. 30C, and a state 4 shown in FIG. 31A-FIG. 31C.

As shown in FIG. 27A-FIG. 27C and FIG. 28, the first section 111, similarly to the case of the first embodiment, comprises a communication operation section 21, a microphone 22, a camera vertical direction key 23, a camera horizontal direction dial 24, a camera determination key 25, a shutter 26, a sub-display 31, a guidance speaker 32, an imaging section 33, an antenna 41, a transceiver section 42, a storage section 43 and a folded state detector 45. The first section 111 is further provided with (a) a microphone 103 (refer to FIG. 29A) for use in calls in the state 4, and (b) a control section 140 (refer to FIG. 28) with a control algorithm that is different to the control section 40 of the first embodiment.

The control section 140 carries out control similar to that of the control section 49 of the above-described first embodiment in guidance display direction control and display of photography results using the camera optical system.

Also, as shown in FIG. 27A, the display section 116 is provided with a main display 28 having the same functions as that of the first embodiment, and a call speaker 29, and is also provided with a display surface operation section 101 made up of button A and button B used when using game functions etc.

As shown in FIG. 28, the base section 115 is provided with a display section rotation state detector 46, the same as the first embodiment. A folded operation section 102 that is a arrow key capable of detecting user input at a total of 5 places, being top, bottom, left, right and center, and used mainly in operation in the folded state is provided at a rear surface side facing the first section 111 when the base sections 115 is folded.

Figure 32A:
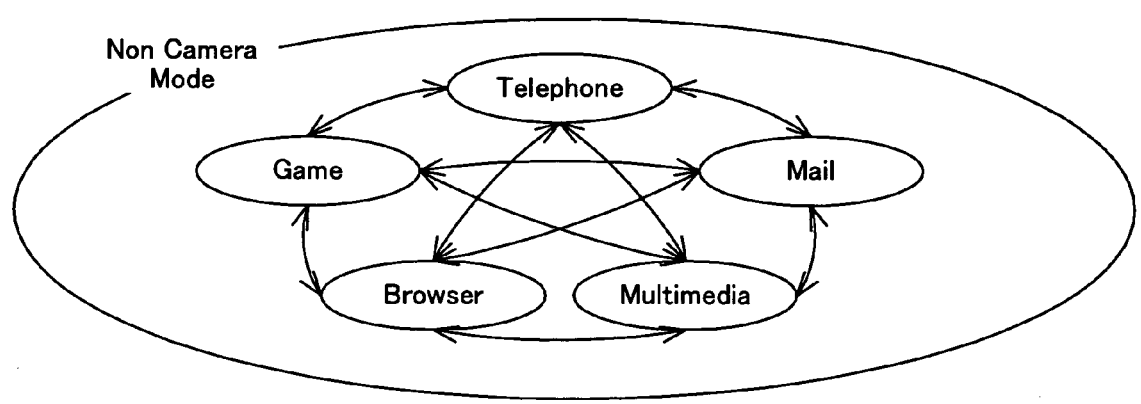
FIG. 32A is a drawing for describing transition between states within non-camera mode of the second embodiment of the present invention.
Figure 32B:
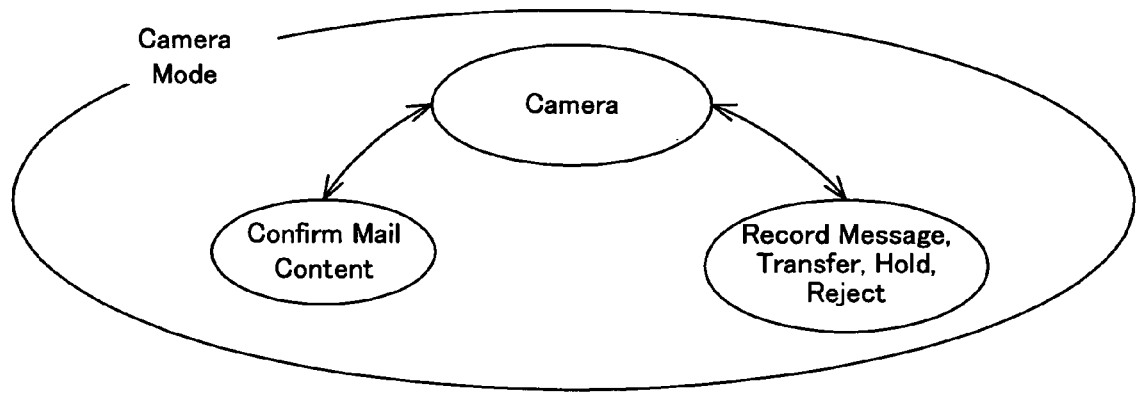
FIG. 32B is a drawing for describing transition between states within camera mode of the second embodiment of the present invention.

As well as a telephone function and a camera function, as shown in FIG. 32A, in non-camera mode, the mobile telephone 100 also includes a mail function, a multimedia function for playback of music and video, a browser function for acquiring information by connecting to the Internet, and game functions. What function is used is selected and switched by user instruction. Also, the camera function, as shown in FIG. 32B, includes a message recording function for executing an answer phone function when receiving a voice call, and a mail content confirmation function for confirming content of received mail at the time of mail receipt. Here, each function is switched by user operation in accordance with guidance display when receiving a voice call or mail.

Figure 33:
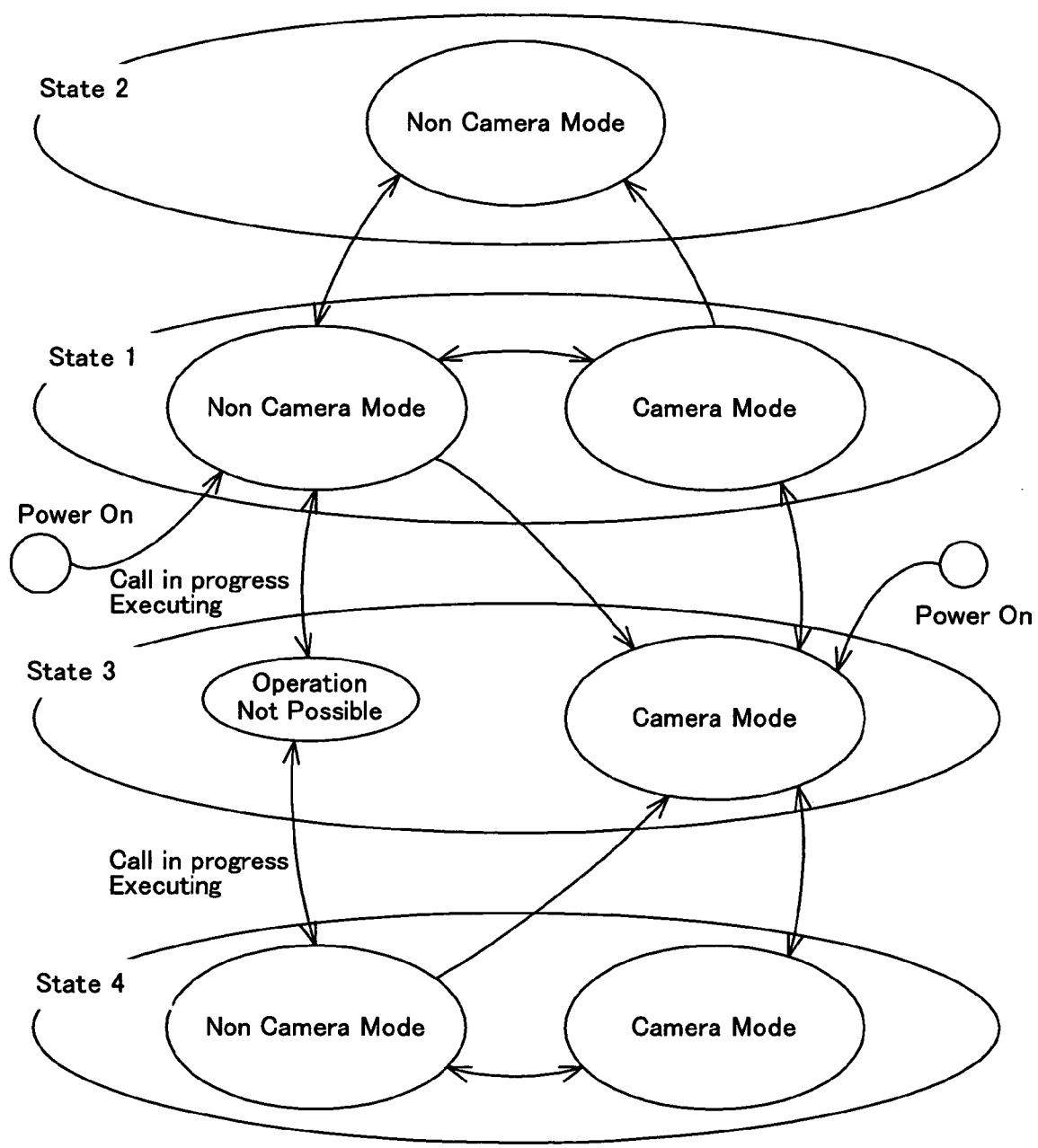
FIG. 33 is a drawing for describing transition among the states of the second embodiment of the present invention.

Next, state transition controlled by the control section 140 will be described with reference to FIG. 33.

In the above described structural state 1 (refer to FIG. 27A-FIG. 27C), when transferring from the structural state 2 to the state 1, and when the power supply is tuned ON in the state 1, similarly to the first embodiment operation mode is set to non-camera mode. Also, when transferring from camera mode of the structural state 3 to the state 1 camera mode is set, the same as with the first embodiment. Non-camera mode and camera mode in the state 1 can be shifted between by operation of the communication operation section 21. Also, in non-camera mode of the state 1, as shown in FIG. 32A, it is possible to use a telephone function, a mail function, a multimedia function, a browser function and a game function. These functions are executed by the user operating the communication operation section 21.

In the above-described structural state 2 (refer to FIG. 29A-FIG. 29C), as with the first embodiment, the operation mode is set to non-camera mode. In this case, the operation mode is non-camera mode, but since the main display 28 is folded up inside and can not be seen, it is not possible to use functions like making a call. The same as the first embodiment, in the second section 112, since a surface on which components having an optical function are never arranged constitutes an outer surface (refer to FIG. 29A), even if this surface is placed on a desk that would come into contact with this surface, dirt does not stick to members of the mobile telephone 100 that have an optical function, and they do not become dirty.

Also, in the above-described structural state 3 (refer to FIG. 30A-FIG. 30C), as with the first embodiment, the operation mode is set to camera mode. However, as will be described later, in exceptional circumstances in the state 1 or state 4, when transferring to the state 3 while still executing an application or making a call, it is possible to enter the state 3 staying in non-camera mode. In this case, further, operation is not possible until transferring to the state 4 or state 1.

Also, in the above-described structural state 4 (refer to FIG. 31A-FIG. 31C), as with the first embodiment, the operation mode is set to camera mode when changing from the state 3 to the state 4. However, as shown in FIG. 31A, not only the main display 28, but also the display operation section 101 and the folding operation section 102 are exposed on the surface, and so can be operated. For this reason, the user can operate the arrow key of the folded operation section 102 to transfer to non-camera mode, and also, as shown in FIG. 32A, it is possible to use the telephone function, mail function, multimedia function, browser function and game function.

With the telephone function of the state 4, when receiving a call, the caller's telephone number is confirmed using the main display 28, and the call can be answered by pressing down the center of the arrow key of the folded operation section 102. A call is carried out using the call speaker 29 and the microphone 103. Also, when making a call, it is possible to refer to an outgoing call history or an incoming call history by pressing the top and bottom of the arrow key of the folded operating section 102, and it is possible to reference an address book by pressing down the center of the arrow key of the folded operating section 102. The user can make a call by selecting from the referenced telephone numbers. When a user desires to input a new telephone number, the user changes to the state 1 and inputs it by using the numeric key pad of the communication operation section 21.

With the mail function of the state 4, the main display 28 and the arrow key of the folded operation section 102 are used. The user selects received mail saved in the storage section 43 of the mobile telephone by operating the arrow key, and confirms the content of the selected received mail by means of the main display 28. When creating a mail with new content, the format of the mobile telephone 100 is changed to the state 1, and it is necessary to create the mail using the numeric key pad of the communication operation section, but an operation to only send an already created mail carried out without using the numeric key pad can be carried out while staying in the state 4.

With the multimedia function of the state 4, there is a function for playing back music files and video files that have been saved in the storage section 43 of the mobile telephone 100, and the main display 28 and arrow key of the folded operation section 102 are used. The user selects music files and video files that have been saved in the storage section 43 of the mobile telephone 100 by operating the arrow key, and instructs playback. In the case of operations requiring the numeric key pad, such as changing the name of a music file or video file, it is necessary to change to the state 1 and operate the numeric key pad of the communication operation section 21.

With the browser function of the state 4, as with the multimedia function, the main display 28 and the arrow key of the folded operation section 102 are used. After launching the browser, a cursor is aligned on a character string representing a link destination displayed in an image by repeatedly pressing down appropriate parts of the left, right, top and bottom of the arrow key, and that link destination is jumped to by pressing down the center of the arrow key. When input using the numeric key pad is required, such as such as inputting a character string, it is necessary to change to the state 1 and operate the numeric key pad of the communication operation section 21.

With the game function of the state 4, the main display 28, the arrow key of the folded operation section 102 and the A button and B button of the display operation section 101 are used. If a game application stored in the storage section 43 of the mobile telephone 100 is executed, the functions of the arrow key and the A button and the B button are assigned by the game application. The user operates the assigned function keys or buttons in order to cause desired operation in the game application.

Here, with the mobile telephone 100, since it is possible to enter non-camera mode in the state 4, the user may desire to use the numeric key pad of the communication operation section while executing a game application or making a call in the state 4. In order to provide the user with convenience, as shown in FIG. 33, it is possible to shift from the state 4 to the state 1 by way of the state 3 when executing a game application or making a call. In this case, when transferring to the state 3 while still executing an application or making a call, the state during application execution or during the call is maintained, and operation in the state 3 is not possible. Also, conversely, after playing back music in the state 1, since there are also cases where it is desired to watch in a state where the device is folded up small, as in the state 4, it is also possible to shift from the state 1 to the state 4 by way of the state 3 when executing an application or making a call.

Next, the case where a call is received while the mobile telephone 100 is operating in camera mode will be described.

Figure 34:
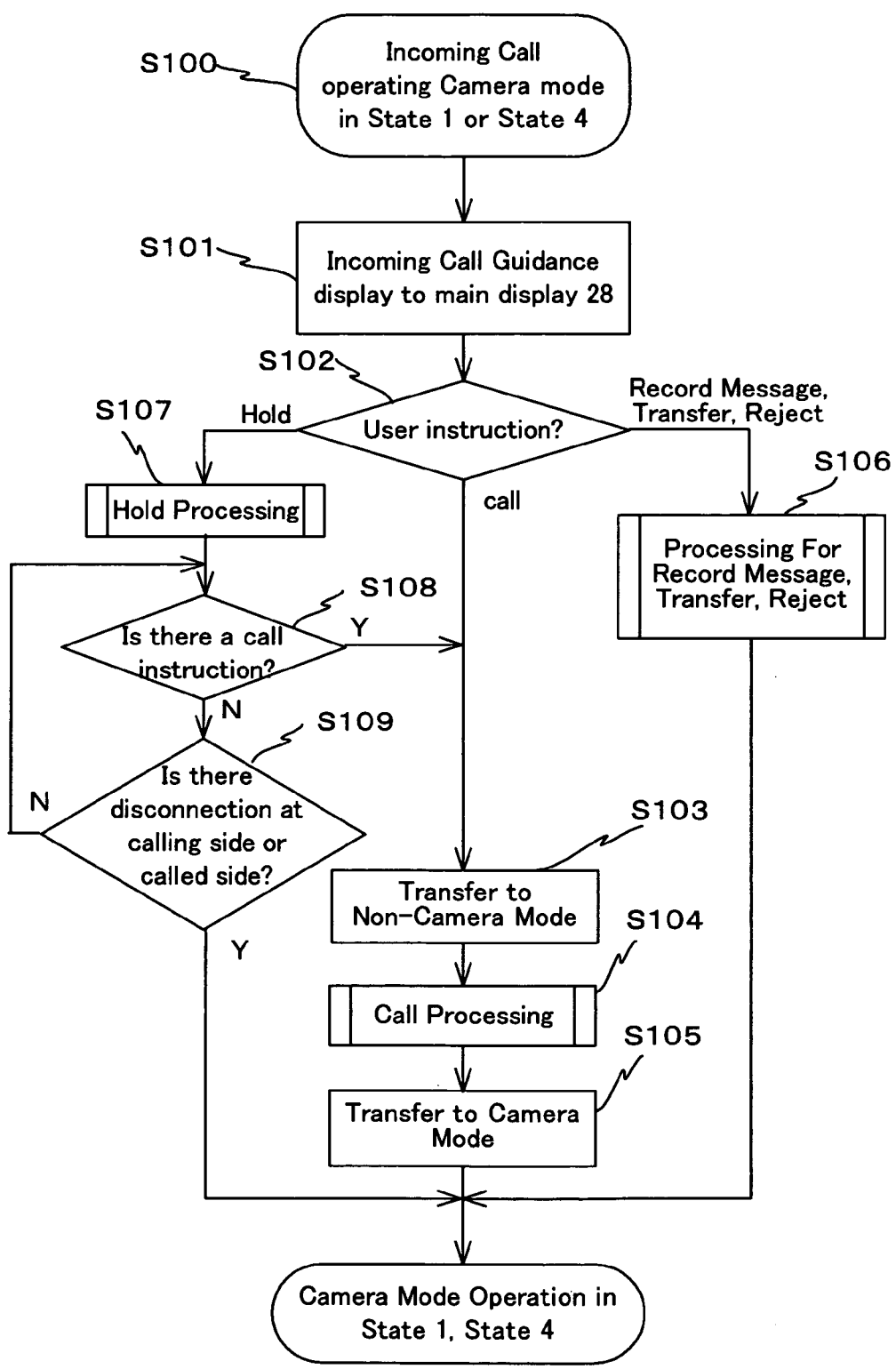
FIG. 34 is a flowchart for describing processing for call receipt of state 1 or state 4 camera mode of the second embodiment of the present invention.
Figure 35A:
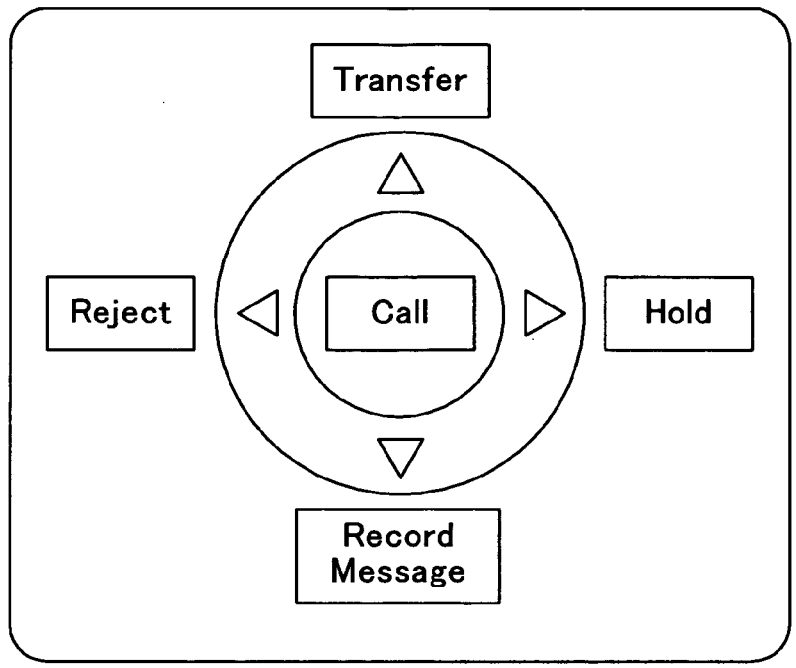
FIG. 35A is a drawing showing a display example at the time of call receipt of the state 1 or state 4 camera mode of the second embodiment of the present invention.

First of all, the case of receiving a call in camera mode of the state 1 or state 4 will be described according to the flowchart of FIG. 34. If a call is received in camera mode of the state 1 or state 4, call receive guidance is displayed on the main display 28 in step S101. As shown in FIG. 35A, this guidance display shows commands, namely call, transfer, reject, hold and record message, that can be selected using the arrow key of the folded operation section 102. Returning to FIG. 34, in step S102, if the user has selected call, then in step S103 the control section 102 transfers the operating mode to non-camera mode. Continuing on, in step S104 the control section 140 carries out call processing to execute incoming call answer, making the call, and up to disconnect. If the call is completed and disconnected, in step S105 the control section 140 transfers to camera mode and returns to the original state.

On the other hand, in step S102, if transfer, reject or record message are selected, then respective processing for transfer, reject or record message is carried out in step S106. In this case, the transfer to non-camera mode is not performed. Also, in step S102, if hold has been selected the control section 140 carries out hold processing in step S107. The user is in a state capable of making a call, and in step S108 it is determined whether or not a call instruction was carried out. If the result of this determination is affirmative the processing of step S103 to step S105 is carried out.

Also, if the determination result from step S108 is negative, processing transfers to step S109, and it is determined whether or not any of the following cases exist, namely, if the call is disconnected from the calling side, that is, if a notification to disconnect a call that was held at the mobile telephone 100 via a communication network is received from the side making the call to the mobile telephone 100, and if the called side has disconnected, that is, if the call held at the mobile telephone 100 has been disconnected. In the case of an affirmative determination in step S109, the camera mode of the state 1, state 4, being the original state, is transferred to. On the other hand, if the result of this determination is negative, the processing of step S108 and step S109 is repeated.

Figure 35B:
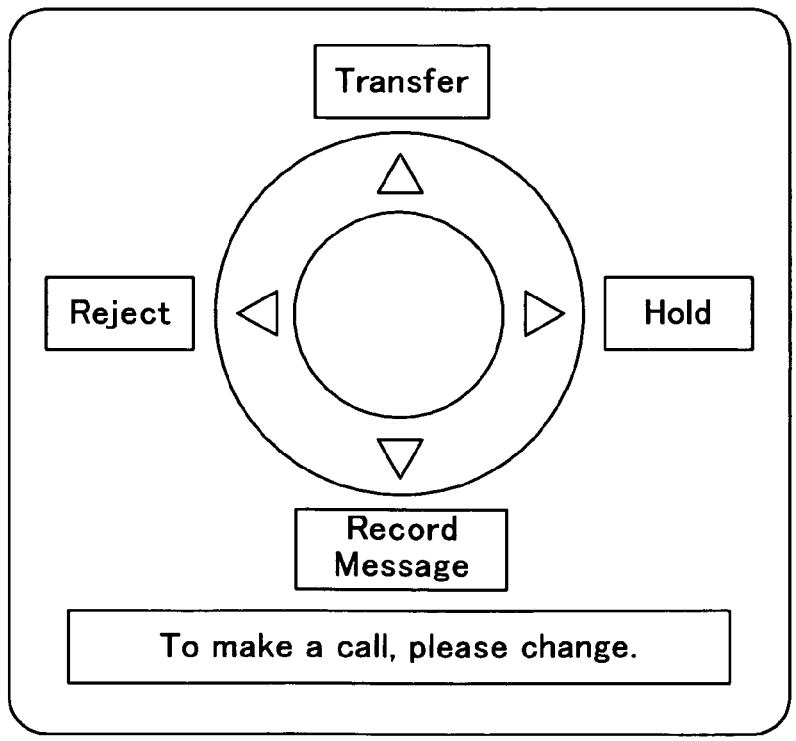
FIG. 35B is a drawing showing a display example at the time of call receipt of the state 3 of the second embodiment of the present invention.
Figure 36:
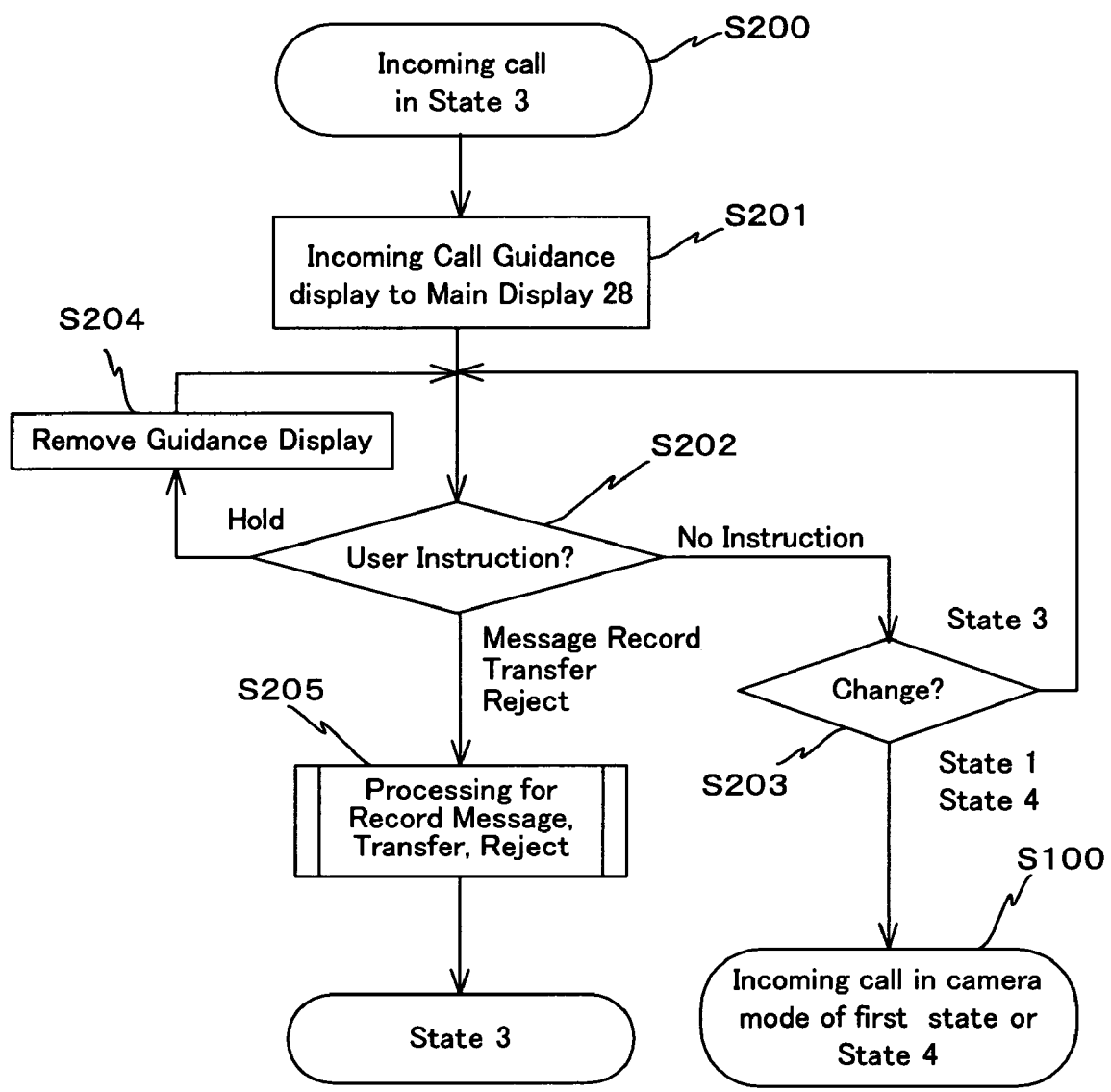
FIG. 36 is a flowchart for describing processing for call receipt of the state 3 of the second embodiment of the present invention.

Next, the case of receiving a call in camera mode of the state 3 will be described according to the flowchart of FIG. 36. If a call is received in camera mode of the state 3, the control section 140 displays call receive guidance on the main display 28 in step S101. As shown in FIG. 35B, with this guidance display the fact that commands, namely call, transfer, reject, hold and record message, can be selected using the arrow key of the folded operation section 102, and the fact that it is necessary to change the format in the event of a call, are shown.

Continuing on, in step S202, if the user has selected transfer, reject or record message, then the control section 140 carries out respective processing for transfer, reject or record message in step S205. Also, in step S202, if nothing is instructed, the control section 140 confirms the format of the mobile telephone 100 in step S203. In the event that the user changes the mobile telephone 100 and enters the state 1 or the state 4, the control section 140 carries out the same processing as "incoming call for camera mode of state 1 or state 4", which is step S100 in FIG. 34. If the state 3 is maintained without change, the processing of step S202 and S203 is repeated.

Also, in step S202, if hold has been selected, the control section 140 removes the guidance display from the main display 28, and the processing of step S202 and step S203 is repeated. In a state where the user can make a call, by changing the format, it is made possible for the control section 140 to make a call by carrying out the processing for "incoming call for camera mode of state 1 or state 4" which is step S100 in FIG. 34.

Figure 37:
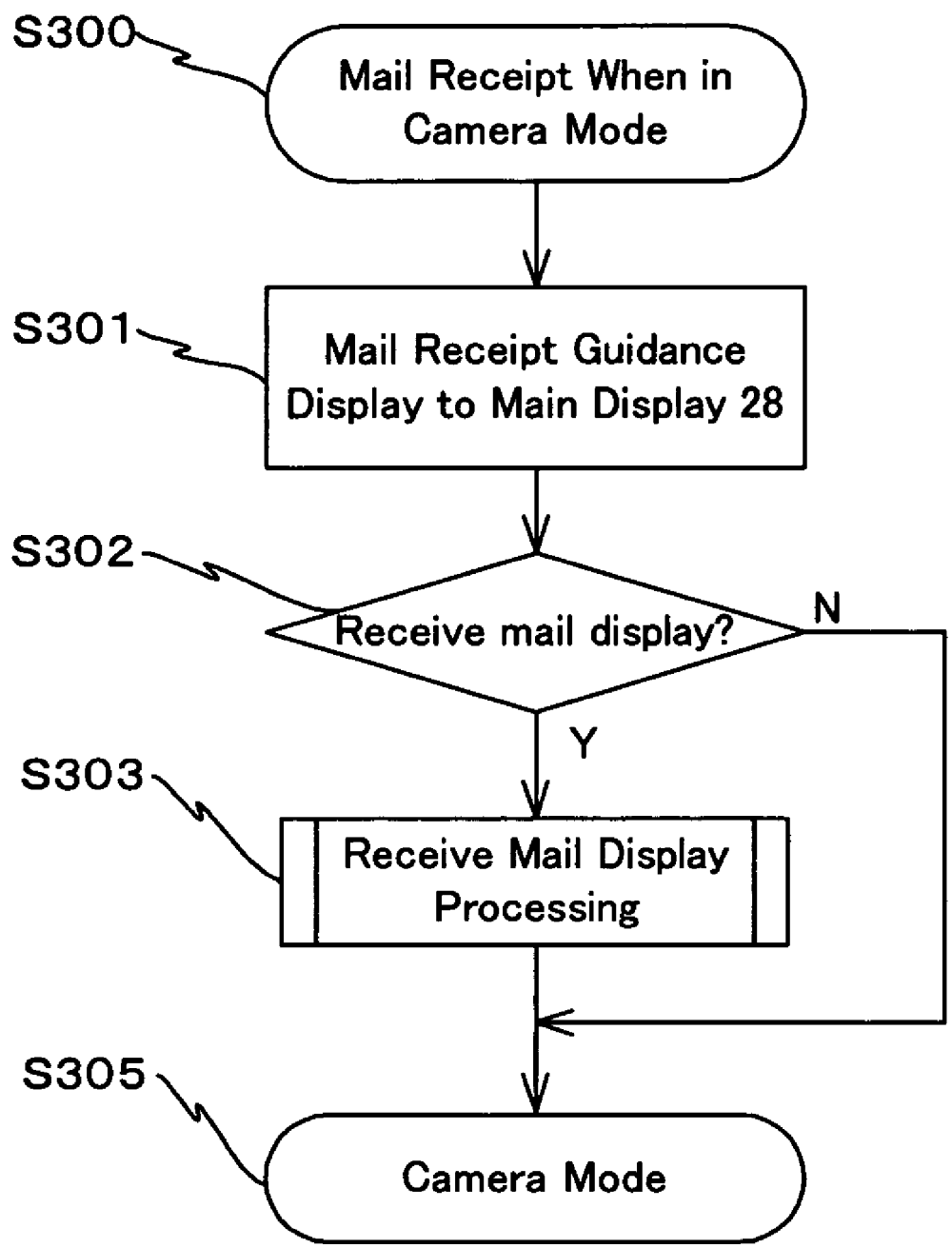
FIG. 37 is a flowchart for describing processing for mail receipt at the time of camera mode of the second embodiment of the present invention.
Figure 38:
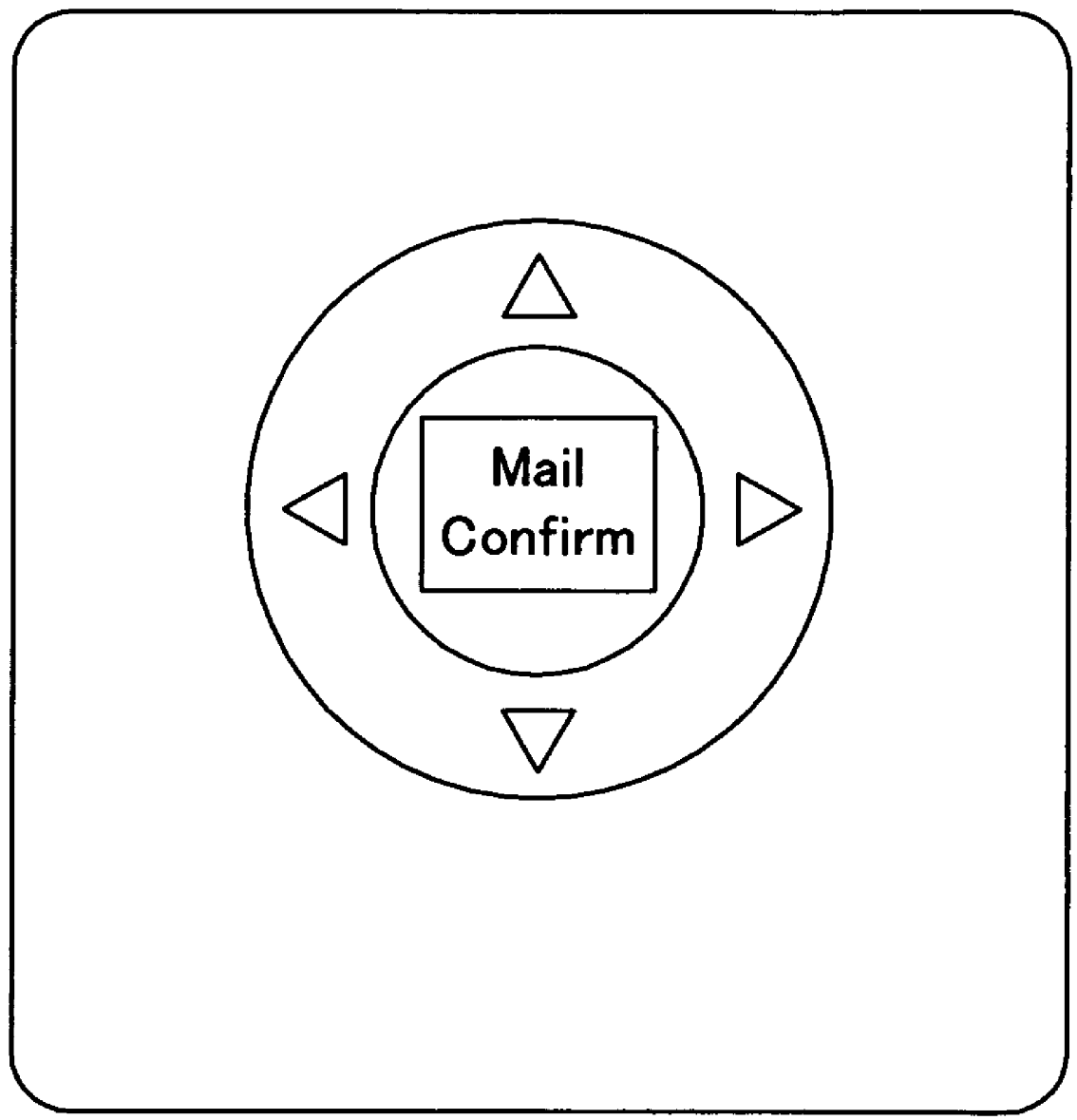
FIG. 38 is a drawing showing a display example at the time of mail receipt at the time of camera mode of the second embodiment of the present invention.

Next, processing in the case where mail is received while operating in camera mode will be described in accordance with FIG. 37. The control section 140 displays mail receive guidance on the main display 28 in step S301. As shown in FIG. 38, with this guidance display the fact that it is possible to select whether or not to execute received mail display by pressing down the center of the arrow key of the folded operation section 102 is shown. Here, the user selects whether or not to display received mail in step S302. If the result of this selection is affirmative, the control section 140 carries out received mail display processing in step S303. In the case of negative selection, received mail display processing is not carried out and processing at the time of receiving mail is completed.

As has been described above, with the second embodiment, the same effects as with the first embodiment are obtained. Further, with the second embodiment, even when operating in camera mode, when receiving mail, that fact is notified to the user and it is possible for the user to confirm the content of the received mail without changing the format of the mobile telephone, which means that the user can easily take appropriate action for the received mail.

Also, even when operating in camera mode, when an incoming call is received, since the user carries out measures such as disconnect or message record without changing the format of the mobile telephone, and also since it is possible to make a call even if in the state 1 or the state 4, it is possible for the user to carry out appropriate processing for the received call with a simpler operation.

Also, because the second section 112 is connected to the first section 111 at two places of the first section 111 on both sides along the axis AX1, it is possible for sections of the second section 112 for connection to the first section 111 to be made sufficiently wide in the first axis AX1 direction. In this way, it is possible to keep sufficient strength in the second section 112, and it is also possible to provide more functions in the second section 112.

In the above described second embodiment, the displayed incoming call guidance and mail receive guidance is simply displayed on the main display 28, but it is also possible to carry out transparent display as with the first embodiment.

Also, with the above-described second embodiment, the display operation section is only used in a game function, but it can also be used in other functions.

Also with the above described second embodiment, the folded operation section and the display surface operation section are respectively implemented as a arrow key and buttons, but it is also possible to use input devices having other formats and other functions.

With the above described second embodiment, it is not possible to make a call in the state 2 or the state 3, but it is possible to enable calls even in the state 2 and the state 3.

Also with the above-described second embodiment, it is possible to appropriately modify examples that are the same as the modified examples for the above described first embodiment.

The present invention has been illustrated and described using typical embodiments, but it is not intended for the present invention to be limited to the disclosed details. Further modified inventions and equivalent inventions may occur to persons skilled in the art, but all such modified inventions and equivalent inventions are believed to be incorporated within the spirit and scope of the present invention. Accordingly, the purpose and scope of the present invention is only limited by the following claim language.

The invention claimed is:

1. A mobile communication terminal including a camera, a first pivot having a first axis, a first section, and a second section capable of folding up to the first section around the first axis as a rotational axis;
the first section further comprising:
a camera optical system of the camera; and
an operation input section, having an operation surface, and
the second section further comprising:
a second pivot having a second axis;
a base section connecting to the first section in a rotatable manner about the first axis;
a display section, including a display device, connecting to the base section so as to be capable of rotation through at least 180 degrees with respect to the base section around the second axis, the display device having a display surface;
whereby the first section and the second section are deployable into four states, including
an unfolded first state with the display surface facing toward the operation surface,
a folded second state reached from the first state by rotating the second section around the first axis so that the display surface moves up to the operation surface and covers the operation surface facing thereto,
an unfolded third state with the display surface facing away from the operation surface, and
a folded fourth state, reached from the third state by rotating the second section around the first axis, wherein the operation surface is covered and the display surface is not covered, and the operation surface and the display surface face in a same direction;
wherein the mobile communication terminal further comprises:
a display section rotation state detector for detecting a rotation state of the display section with respect to the base section around the second axis; and
a control section that sets an operation mode to a camera mode when the display section rotation state detector detects a change to the third state from the first state, and that sets the operation mode to the camera mode in the fourth state; the camera mode comprising a scene imaged by the digital camera being displayed on the display surface; and
wherein the camera optical axis is orthogonal to the operation surface.

2. The mobile communication terminal of claim 1, wherein the second axis is orthogonal to the first axis.

3. The mobile communication terminal of claim 1, wherein the first section further comprises a projection section for housing the camera optical system, wherein the projection section projects in a direction perpendicular to the operation surface.

4. The mobile communication terminal of claim 1, further comprising:
a folded state detector for detecting a folded state with the first axis as a rotational axis, or an opened tip state where the device is opened up.

5. The mobile communication terminal of claim 4, wherein the control section, while operating in camera mode, implements a guidance display transparently on the display device, whereby the entire display device acts as a camera viewfinder and a viewfinder display image is not significantly impaired, and wherein
the guidance display is performed with a direction perpendicular to the first axis as a vertical direction when the folded state detector detects the third state,
the guidance display is performed with a direction perpendicular to the first axis as a horizontal direction when the folded state detector detects the fourth state, and
the control section changes a direction perpendicular to the first axis as the vertical direction or the horizontal direction of the guidance display in response to a user command.

6. The mobile communication terminal of claim 5, wherein the control section notifies the user of the fact that a mail has been received while operating in camera mode, and displays contents of the mail in response to a user instruction.

7. The mobile communication terminal of claim 5, wherein the control section notifies the user of an incoming call when the call is received while operating in camera mode.

8. The mobile communication terminal of claim 4, wherein the control section sets the operating mode to non-camera mode when the power supply is turned on and the mobile communication terminal is in the first state.

9. The mobile communication terminal of claim 4, wherein the control section displays an image that is reversed in a left-right direction when operating in camera mode in the third state.

10. The mobile communication terminal of claim 4, wherein the control section sets the operation mode to non-camera mode when the folded state detector detects a change to the second state from the first state.

11. The mobile communication terminal of claim 10, wherein the control section sets the operation mode to non-camera mode when the folded state detector detects a change from the first state to the second state and the mobile communication terminal has been in the non-camera state.

12. The mobile communication terminal of claim 4, further comprising:
a folded operation section for carrying out operations when the mobile communication terminal is folded, the folded operation section being provided at a rear surface of the base section, wherein the rear surface is opposite to a surface of the base section facing the operation surface when the mobile communication terminal is folded up.

13. The mobile communication terminal of claim 12, wherein the control section caries out control of voice communication in response to user commands via the folded operation section while in the fourth state such that a user can make a call while the mobile communication terminal is folded.

14. The mobile communication terminal of claim 12, comprising:
a display surface operation section being on a display surface side of the display section, and
wherein the control section executes a game function in response to a user command via at least one of the folded operation section and the display surface operation section when in the fourth state.

15. The mobile communication terminal of claim 4, wherein the control section maintains the camera mode when the display section rotation state detector detects a change from the third state to the first state.

16. The mobile communication terminal of claim 15, wherein the control section performs guidance display with a direction perpendicular to the first axis as the vertical direction in a event of a change to the first state camera mode, and
the control section changes the direction perpendicular to the first axis to the horizontal direction of the guidance display in response to a user command while in camera mode of the first state.

17. The mobile communication terminal of claim 15, wherein the control section sets operation mode to camera mode when a call processing has been completed in non-camera mode which has been changed from camera mode for communication process of a incoming call,
wherein the incoming call is received in camera mode in the first state.

18. The mobile communication terminal of claim 1, wherein the second section is connected in a rotatable manner to the first section at at least two places of the first section on both sides along the first axis.

19. The mobile communication terminal of claim 1, wherein, in each of the four states, the mobile communication terminal sets either the camera mode or a non-camera mode and, while considering transition between the four states, automatically allocates a camera mode and a non-camera mode, whereby operation mode setting by a user is minimized.

* * * * *

UNITED STATES PATENT AND TRADEMARK OFFICE
CERTIFICATE OF CORRECTION

PATENT NO.         : 7,450,977 B2
APPLICATION NO.    : 10/978416
DATED              : November 11, 2008
INVENTOR(S)        : Yutaka Oe et al.

It is certified that error appears in the above-identified patent and that said Letters Patent is hereby corrected as shown below:

On the Title page:

Item "(73)" "Vodafone K.K., Tokyo, Japan"

Should read:

Item "(73)" --VODAFONE GROUP PLC, BERKSHIRE, UNITED KINGDOM--

Signed and Sealed this

Twenty-fifth Day of August, 2009

David J. Kappos
*Director of the United States Patent and Trademark Office*